US010894870B2

(12) United States Patent
Chen et al.

(10) Patent No.: US 10,894,870 B2
(45) Date of Patent: Jan. 19, 2021

(54) METHOD OF CONVERTING PLASTIC WASTE INTO USEFUL STOCK

(71) Applicant: Purdue Research Foundation, West Lafayette, IN (US)

(72) Inventors: Wan-Ting Chen, Lowell, MA (US); Nien-hwa L Wang, West Lafayette, IN (US); Kai Jin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 39 days.

(21) Appl. No.: 16/389,855

(22) Filed: Apr. 19, 2019

(65) Prior Publication Data

US 2019/0322832 A1 Oct. 24, 2019

Related U.S. Application Data

(60) Provisional application No. 62/659,763, filed on Apr. 19, 2018.

(51) Int. Cl.
| | |
|---|---|
| C08J 11/08 | (2006.01) |
| B01D 15/18 | (2006.01) |
| B01D 15/02 | (2006.01) |
| B01D 11/02 | (2006.01) |
| B01D 17/02 | (2006.01) |
| B01D 17/04 | (2006.01) |
| C10G 1/10 | (2006.01) |

(52) U.S. Cl.
CPC .......... *C08J 11/08* (2013.01); *B01D 11/0203* (2013.01); *B01D 11/0288* (2013.01); *B01D 15/02* (2013.01); *B01D 15/1828* (2013.01); *B01D 17/0208* (2013.01); *B01D 17/0217* (2013.01); *B01D 17/042* (2013.01); *C10G 1/10* (2013.01); *C08J 2323/06* (2013.01); *C08J 2323/12* (2013.01); *C08J 2423/06* (2013.01); *C08J 2423/12* (2013.01); *C08J 2425/06* (2013.01)

(58) Field of Classification Search
USPC .......................................................... 521/47
See application file for complete search history.

(56) References Cited

U.S. PATENT DOCUMENTS

| | | | | |
|---|---|---|---|---|
| 2,638,999 | A * | 5/1953 | Berg | B01D 53/08 95/14 |
| 5,569,801 | A * | 10/1996 | de Broqueville | C07C 1/00 423/449.7 |
| 9,512,495 | B2 * | 12/2016 | Eyal | C10L 1/003 |

OTHER PUBLICATIONS

Nabavi-Pelesaraei et al., Modeling of energy consumption and environmental life cycle assessment for incineration and landfill systems of municipal solid waste management—A case study in Tehran Metropolis of Iran, Elsevier Ltd., 0959-6526, 2017.
Kida et al., Cleavage of Side Chains on Thiophenic Compounds by Supercritical Water Treatment of Crude Oil Quantified by Two-Dimensional Gas Chromatography with Sulfur Chemiluminescence Detection, American Chemical Society, Energy Fuels, 28, 6589-6595, 2014.
Caniaz et al., Process intensification for heavy oil upgradingusing supercritical water, The Institution of Chemical Engineers., Published by Elsevier, 0263-8762, 2014.
Chen, PhD Dissertation, University of Illinois at Urbana-Champaign, 2017.
Kunwar et al., Plastics to fuel:a review, Renewable and Sustainable Energy Reviews, Elsevier Ltd., 2015.
Watanabe et al., Polyethylene conversion in supercritical water, Journal of Supercritical Fluids, 13, 247-252, 1988.
Fakhrhoseini et al., Predicting Pyrolysis Products of PE, PP, and PET Using NRTL Activity Coefficient Model, Journal of Chemistry, Hindawi Publishing Corporation, vol. 2013, Article ID 487676, 5 pages, 2013.
Su et al., Investigation on degradation of polyethylene to oils in supercritical water, Fuel Processing Technology, Elsevier Publishing, 85, 1249-1258, 2004.
Sugano et al., Liquefaction process for a hydrothermally treated waste mixture containing plastics, J Mater Cycles Waste Manag, 11:27-31, 2009.
Patwardhan et al., Supercritical Water Desulfurization of Organic Sulfides is Consistent with Free-Radical Kinetics, American Chemical Society, ACS Publications, 27, 6108-6117, 2013.
Peterson et al., Thermochemical biofuel production in hydrothermal media: A review of sub- and supercritical water technologies, Energy & Environmental Science, Jul. 2008.
Weeden Jr. et al., Size-exclusion simulated moving bed for separatingorganophosphorus flame retardants from a polymer, Journal of Chromatography A, 1422, 99-116, 2015.
Zhu et al., Analysis of the Accuracy of Determining Average Molecular Weights of Narrow Polydispersity Polymers by Matrix-Assisted Laser Desorption Ionization Time-of-Flight Mass Spectrometry, J Am Soc Mass Spectrom 9, 275-281, 1998.
Baytekin et al., Retrieving and converting energy from polymers: deployable technologies and emerging concepts, Energy & Environmental Science, 6, 3467, 2013.

(Continued)

*Primary Examiner* — Terressa Boykin
(74) *Attorney, Agent, or Firm* — Piroozi-IP, LLC

(57) ABSTRACT

Methods of recovery of pristine polymers and hydrocarbon mixtures from a sorted waste feedstock or mixtures of waste feedstock, which are with or without organic additives are disclosed. The methods include Sequential Selective Extraction and Adsorption (SSEA), Hydrothermal Processing (HTP), and a combination of SSEA and HTP. Exemplarily, SSEA includes selecting a first solvent (S1), inputting the S1 and a sorted feedstock free of organic additives into an extractor, heating, waiting, and separating insolubles forming a pristine polymer solution. Exemplarily, HTP includes inputting a hydrothermal solvent and a sorted feedstock free of organic additives into a reactor, heating to form subcritical or supercritical $H_2O$, waiting, causing thermal depolymerization to produce a slurry, cooling, venting formed gases and separating the hydrocarbon mixture.

58 Claims, 35 Drawing Sheets

(56) References Cited

OTHER PUBLICATIONS

Rochman et al., Classify plastic waste as hazardous, Nature, Macmillan Publishers Limited., vol. 494, 169-171, 2013.
Rochman, Microplastics research—from sink to source, Science, vol. 360 Issue, 6384, 28-29, Apr. 6, 2018.
Mihelcic et al., Accelerating Innovation that Enhances Resource Recovery in the Wastewater Sector: Advancing a National Testbed Network, ACS Publication, Environ. Sci. Technol., 51, 7749-7758, 2017.
Savage et al., Reactions at Supercritical Conditions: Applications and Fundamentals, AIChE Journal, vol. 41, No. 7, 1723-1778, 1995.
Chua et al., Assimilation of Polybrominated Diphenyl Ethers from Microplastics by the Marine Amphipod, Allorcheste-Compressa, ACS Publication, Environ. Sci. Technol., 48, 8127-8134, 2014.
Fromme et al., Brominated flame retardants—Exposure and risk assessment for the general population, Elsevier GmbH, 1438-4639, 2015.
Watson et al., Gasification of biowaste: A critical review and outlooks, Elsevier Ltd., 1364-0321, 2017.
Weeden et al., Method for Efficient Recovery of High-Purity Polycarbonates from Electronic Waste, Environ. Sci. Technol., 49, 2425-2433, 2015.
Pedersen et al., Improving the circular economy via hydrothermal processing of highdensity waste, Elsevier Ltd., 0956-053X, 2017.
Horton et al., Microplastics in freshwater and terrestrial environments: Evaluating the current understanding to identify the knowledge gaps and future research priorities, Sci. Total Environ., 2017, 127-141, Vol. 586, Elsevier B.V.
Wang et al., Life-cycle energy and greenhouse gas emission impacts of different corn ethanol plant types, Environ. Res. Lett., 2007, vol. 2, IOP Publishing Ltd.
Copeland et al., Water Infrastructure Needs and Investment: Review and Analysis of Key Issues, Congressional Research Service, 2010.
Weeden Jr. et al., Speedy standing wave design of size-exclusion simulated moving bed: Solvent consumption and sorbent productivity related to material properties and design parameters, Journal of Chromatography A, 2015, 54-76, vol. 1418, Elsevier B.V.
Blackadder et al., Dissolution of polypropylene in organic solvents: 1. Partial dissolution, Polymer, 1976, 387-394, vol. 17.
Blackadder et al., Dissolution of polypropylene inorganic solvents: 2. The steady statedissolution process, Polymer, 1976, 768-776, vol. 17.
Blackadder et al., Dissolution of polypropylene in organic solvents: 3. Effect of molecular weight of polymer, Polymer, 1977, 547-550, vol. 18.
Blackadder et al., Dissolution of polypropylene in organic solvents: 4. Nature of the solvent, Polymer, 1978, 483-488, vol. 19.
David et al., Effect of Open Refuse Dumpsite on the Quality of Underground Water Used for Domestic Purposes in Ado-Ekiti, Nigeria—A Public Health Awareness Study, Journal of Environment and Ecology, 2014, vol. 5, No. 2.
Zhang et al., 5—Hydrothermal liquefaction of protein-containing feedstocks A2—Rosendahl, Lasse, Direct Thermochemical Liquefaction for Energy Applications, 2018, 127-168, Elsevier Ltd.
Calvo et al., Kinetics, Catalysis, and Reaction Engineering: Formation of Organic Acids during the Hydrolysis and Oxidation of Several Wastes in Sub- and Supercritical Water, Ind. Eng. Chem. Res., 2002, 6503-6509, vol. 41, American Chemical Society.
Tzanetis et al., Analysis of biomass hydrothermal liquefaction and biocrude-oil upgrading for renewable jet fuel production: The impact of reaction conditions on production costs and GHG emissions performance, Renew. Energ., 2017, 1388-1398, vol. 113, Elsevier Ltd.
Brown et al., Hydrothermal Liquefaction and Gasification of *Nannochloropsis* sp., Energy Fuels, 2010, 3639-3646, vol. 24, American Chemical Society.
Watson et al., Influence of catalysts on hydrogen production from wastewater generated from the HTL of human feces via catalytic hydrothermal gasification, Int. J. Hydrogen Energy, 2017, 20503-20511, vol. 42, Elsevier Ltd.
Ahmad et al., Pyrolysis Study of Polypropylene and Polyethylene Into Premium Oil Products, Int. J. Green Energy, 2015, 663-671, vol. 12, No. 7, Taylor & Francis.
Genifuel Corporation, Closeout Report for NAABB Program, DE-FOA-0000123, Dec. 21, 2015.
Yu et al., Nutrient Flows and Quality of Bio-crude Oil Produced via Catalytic Hydrothermal Liquefaction of Low-Lipid Microalgae, Bioenerg. Res., May 11, 2014.
Oyler, Hydrothermal Processing of Wet Wastes, Genifuel, Jul. 2014.
Hopewell et al., Plastics recycling: challenges and opportunities, Philos. Trans. Royal Soc. B, 2009, 2115-2126, vol. 364, No. 1526, The Royal Society.
Sakata et al., Degradation of polyethylene and polypropylene into fuel oil by using solid acid and non-acid catalysts, J. Anal. Appl. Pyrolysis, 1999, 135-155, vol. 51, Elsevier Science B.V.
Sinha et al., Pet Waste Management by Chemical Recycling: A Review, J Polym Environ, 2010, Springer Science+Business Media, LLC.
Göröcs et al., The Determination of GC—MS Relative Molar Responses of Some n-Alkanes and their Halogenated Analogs, J. Chromatogr. Sci., 201, 138-145, vol. 51, The Author.
Caniaz et al., Upgrading blends of microalgae feedstocks and heavy oils in supercritical water, J. Supercrit. Fluids, 2018, 674-682, vol. 133, Elsevier B.V.
Kunwar et al., Catalytic and thermal depolymerization of low value post-consumer high density polyethylene plastic, Energy, 2016, 884-892, vol. 111, Elsevier Ltd.
Fu et al., Catalytic hydrothermal deoxygenation of palmitic acid, Energy Environ. Sci., 2010, 311-317, vol. 3, The Royal Society of Chemistry.
Duan et al., Catalytic hydrothermal hydrodenitrogenation of pyridine, Appl. Catal. B, 2011, 54-60, vol. 108, Elsevier B.V.
Duan et al., Catalytic treatment of crude algal bio-oil in supercritical water: optimization studies, Energy Environ. Sci., 2011, 1447-1456, vol. 4, The Royal Society of Chemistry.
Moriya et al., Characteristics of polyethylene cracking in supercritical water compared to thermal cracking, Polym. Degrad. Stab., 1999, 373-386, vol. 65, Elsevier Science Ltd.
Akiya et al., Roles of Water for Chemical Reactions in High-Temperature Water, Chem. Rev., 2002, 2725-2750, vol. 102, American Chemical Society.
Achilias et al., Chemical recycling of plastic wastes made from polyethylene (LDPE and HDPE) and polypropylene (PP), J. Hazard. Mater., 2007, 536-542, vol. 149, Elsevier B.V.
Motonobu Goto, Chemical recycling of plastics using sub- and supercritical fluids, J. of Supercritical Fluids, 2009, 500-507, vol. 47, Elsevier B.V.
Chung et al., Surface tension behavior of aqueous solutions of a propoxylated surfactant and interfacial tension behavior against a crude oil, Colloids and Surfaces A, 2018, 163-172, vol. 537, Elsevier B.V.
Shen et al., Co-liquefaction of coal and polypropylene or polystyrene in hot compressed water at 360-430° C, Fuel Process. Technol., 2012, 281-286, vol. 104, Elsevier B.V.
Wu et al., Co-liquefaction of microalgae and polypropylene in sub-/super-critical water, RSC Adv., 2017, 13768-13776, vol. 7, The Royal Society of Chemistry.
Wang et al., Degradation of brominated flame retardant in computer housing plastic by supercritical fluids, J. Hazard. Mater., 2012, 153-163, vol. 205-206, Elsevier B.V.
Ragaert et al., Mechanical and chemical recycling of solid plastic waste, Waste Manag., 2017, 24-58, vol. 69, Elsevier Ltd.
Anthony Andrady, Microplastics in the marine environment, Marine Pollution Bulletin, 2011, 1596-1605, vol. 62, Elsevier Ltd.
Waldner et al., Renewable Production of Methane from Woody Biomass by Catalytic Hydrothermal Gasification, Ind. Eng. Chem. Res., 2005, 4543-4551, vol. 44, No. 13, American Chemical Society.
Jambeck et al., Plastic waste inputs from land into the ocean, Science, 2015, 768-771, vol. 347, No. 6223, American Association for the Advancement of Science.
John Carey, On the brink of recycling revolution?, PNAS, 2017, 612-616, vol. 114, No. 4.

(56) References Cited

OTHER PUBLICATIONS

2015 National Post-consumer Plastic Bag & Film Recycling Report, 2017, Moore Recycling Associates Inc.
Ellen MacArthur, Beyond plastic waste, Science, 2017, 843, vol. 358, No. 6543, American Association for the Advancement of Science.
Geyer et al., Production, use, and fate of all plastics ever made, Science Advances, 2017, vol. 3, No. 7, The Authors.
Garcia et al., The future of plastics recycling: Chemical advances areincreasing the proportionof polymer waste that can be recycled, Science, 2017, 870-872, vol. 385, No. 6365, American Association for the Advancement of Science.
Phillip Savage, A perspective on catalysis in sub-and supercritical water, The Journal of Supercritical Fluids, 2009, 407-414, vol. 47, No. 3, Elsevier B.V.
Chen et al., Extract Nitrogen-Containing Compounds in Biocrude Oil Converted from Wet Biowaste via Hydrothermal Liquefaction, ACS Sustain. Chem. Eng., 2016, 2182-2190, vol. 4, ACS Publications.
Kraft et al., Estimation of Binary Diffusion Coefficients in Supercritical Water: Mini Review, Ind. Eng. Chem. Res., 2017, 4847-4855, vol. 56, No. 16, ACS Publications.
Chen et al., Effect of ash on hydrothermal liquefaction of high-ash content algal biomass, Algal Research, 2017, 297-306, vol. 25, Elsevier B.V.
Williams et al., Analysis of products from the pyrolysis and liquefaction of single plastics and waste plastic mixtures, Resour. Conserv. Recycl., 2007, 754-769, vol. 51, No. 4, Elsevier B.V.
Phillip Savage, Mechanisms and kinetics models for hydrocarbon pyrolysis, J. Anal. Appl. Pyrolysis, 2000, 109-126, vol. 54, Elsevier B.V.
Kida et al., Combining experiment and theory to elucidate the role of supercritical water in sulfide decomposition, PCCP, 2014, The Royal Society of Chemistry.
Kreiger et al., Life cycle analysis of distributed recycling of post-consumer high density polyethylene for 3-D printing Filament, J. Clean. Prod., 2014, 90-96, vol. 70, Elsevier Ltd.
Franklin Associates, Inventory of 100% Postconsumer HDPE and PET Recycled Resin from Postconsumer Containers and Packaging, 2011, Kansas: Prairie Village.
Wong et al., Pyrolysis of low density polyethylene waste in subcritical water optimized by response surface methodology, Environ. Technol., 2016, 245-254, vol. 37, No. 2, Taylor&Francis.
Eva Matisova, Quantitative analysis of aromatic hydrocarbons in complex hydrocarbon mixtures by high resolution capillary gas chromatography, Chem. Listy, 1998, vol. 92.
Energy and nutrient recovery efficiencies in biocrude oil produced via hydrothermal liquefaction of Chlorella pyrenoidosa, RSC Adv., 2014, 16958-16967, vol. 4, No. 33, The Royal Society of Chemistry.

\* cited by examiner

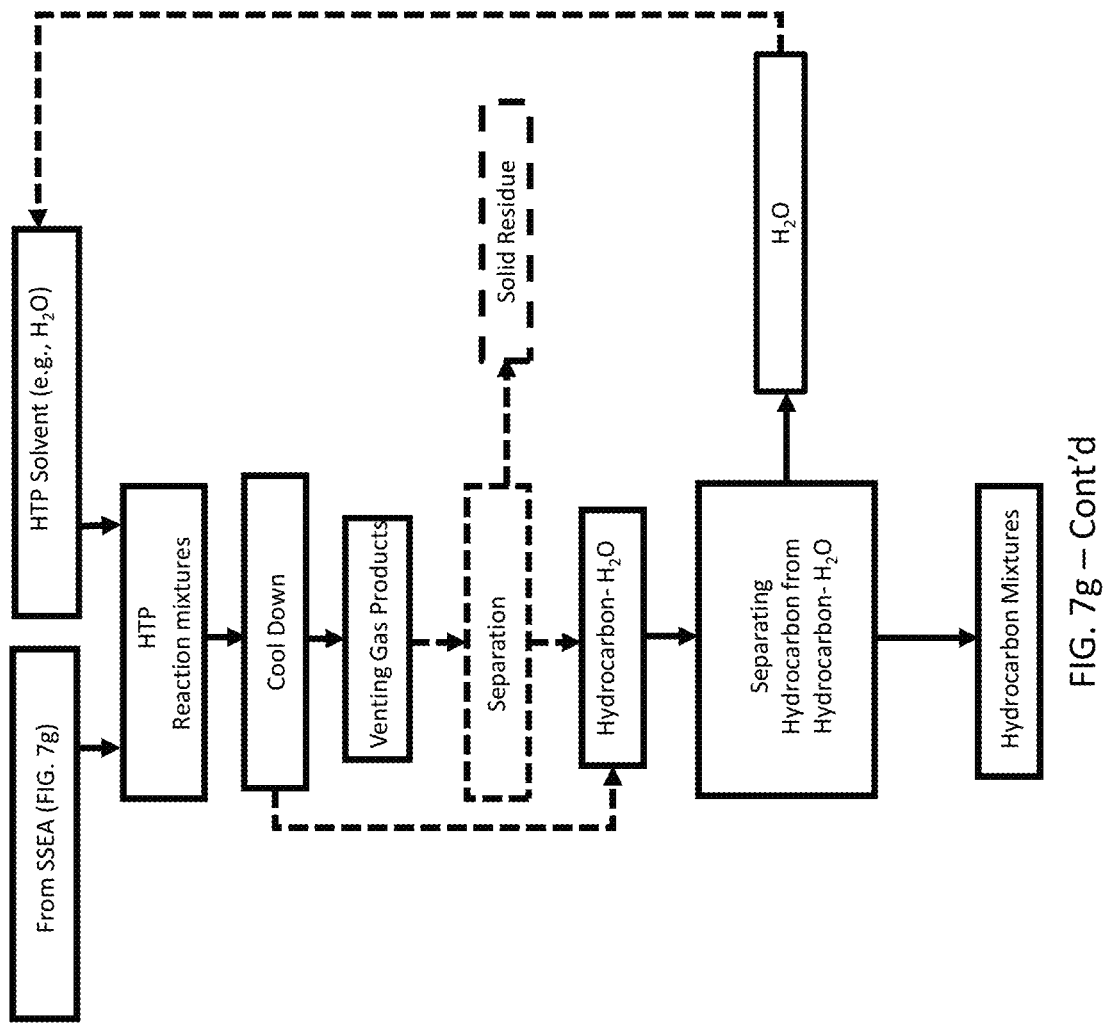
FIG. 7g – Cont'd

US 10,894,870 B2

METHOD OF CONVERTING PLASTIC WASTE INTO USEFUL STOCK

CROSS-REFERENCE TO RELATED APPLICATIONS

The present patent application is related to and claims the priority benefit of U.S. Provisional Application Ser. No. 62/659,763 filed Apr. 19, 2018, the contents of which is hereby incorporated by reference in its entirety into the present disclosure.

STATEMENT REGARDING GOVERNMENT FUNDING

This invention was not made with government support.

TECHNICAL FIELD

The present disclosure generally relates to converting plastic waste, and in particular, to a method of converting plastic waste into hydrocarbon mixture and other useful stock.

BACKGROUND

This section introduces aspects that may help facilitate a better understanding of the disclosure. Accordingly, these statements are to be read in this light and are not to be understood as admissions about what is or is not prior art.

Plastic is a synthetic material made from organic polymers. It can be molded into various shapes while soft and then set into a rigid or slightly elastic form. It has many desirable and useful properties; it has a high strength to weight ratio and low manufacturing costs. Most people depend on plastic products in their daily lives. The production of plastics has grown exponentially over the past 60 years. Most (76%) of the post-consumer plastics are sent to landfills, 12% are incinerated, 3% end up in the oceans, and only 9% are recycled. At the current rate, the planet will have accumulated over 30 billion tons of plastic waste and "more plastics than fish in the oceans" by 2050. Plastics degrade slowly (over 100 years or more), releasing fragments, microplastic particles, and dissolved toxic chemicals into the land, rivers, and oceans. This pollution poses a serious threat to our ecosystems, drinking water, food supply, and eventually human health. The state-of-the-art separation technologies for removing micro-plastics and toxic chemicals from water is about $0.003 per gallon. The oceans have $3.5 \times 10^{20}$ gallons of water. To restore the oceans to the pristine state would cost an enormous amount, about $\$10^{18}$, or 10,000 times the global GDP, which is clearly unaffordable. If the current trends in plastic waste accumulation continue, reducing the impact of plastic pollution will become increasingly beyond reach. This pollution poses even a more urgent threat to life on land and life below water than climate change.

A key reason for the plastic waste accumulation is the lack of cost-effective technologies for converting plastic wastes into useful and profitable products. Incineration causes emissions of green-house gases and toxic pollutants, and is not profitable for industry. The current waste management systems generate mostly complex mixtures of plastics, from which a limited number of products can be made profitably using mechanical recycling. As a result, only 14% of the plastic waste is currently collected for recycle, and only 9% is recycled. Landfilling is currently the least expensive and the preferred method for waste disposal. However, landfilling is not sustainable in the long term, because the plastic degradation products eventually find their way into the groundwater, rivers, and oceans.

Currently, less than 10% of plastic waste is recycled into useful products for two reasons. First, the options for making high-value products using mixed plastic waste are either limited or not cost-effective. Second, sorted plastics could be converted into many useful products, but the costs associated with sorted plastics are high. The current single stream recycling system collects a mixture of Type 1 through Type 7 plastic waste. The prices of sorted plastics are mainly due to sorting costs. To reduce the serious threat to the environment, it is imperative to develop efficient and economical methods for converting mixed plastic waste into useful products, and provide economic incentives for industry to implement the new technologies at large scale to reduce plastic waste accumulation Therefore, there is an unmet need for a novel approach that can convert plastic waste into useful stock including pristine polymers and hydrocarbon mixtures.

SUMMARY

A method of recovery of pristine polymers from a sorted waste feedstock free of organic additive is disclosed. The method begins by selecting a first solvent (S1), wherein the S1 is within a Hansen's sphere with respect to the sorted waste feedstock and wherein the S1 is in a predetermined list of solvents. The method then provides for inputting the S1 into an extractor as well as inputting the feedstock into the extractor, thereby generating a mixture (M). The method then provides for heating the M to a temperature ranging from 5° C. to 180° C. and waiting a predetermined amount of time, thereby forming a polymer solution (PSl). The method then provides for separating insolubles (for example, inorganic additives) from the PSl, forming a pristine polymer solution (PPS). Thereafter, the method provides for separating the pristine polymer (PrP) from the PPS and finally collecting the separated PrP. According to one embodiment, the method makes a special case wherein the step of separating the PrP from the PPS is by evaporating the S1. According to one embodiment, the method makes a special case of recycling the S1. The method further makes a special case wherein the step of separating the PrP from the PPS is by adding a second solvent (S2), wherein Hansen parameters of the mixture of the S1 and S2 are outside the Hansen's sphere for the PrP.

A method of recovery of pristine polymers from a sorted waste feedstock containing organic additive is also disclosed. The method begins by selecting a first solvent (S1), wherein the S1 is within a Hansen's sphere with respect to the sorted waste feedstock and wherein the S1 is in a predetermined list of solvents. The method then provides for inputting the S1 into an extractor, inputting the feedstock into the extractor, thereby generating a mixture M. The method then describes heating the M to a temperature ranging from 5° C. to 180° C. and waiting a predetermined amount of time, thereby forming a polymer solution containing the organic additives (PSlO). Thereafter the method provides separating insolubles from the PSlO, thereby forming a pristine polymer solution with organic additives (PPSlO). Then the method describes adsorbing the PPSlO using one or more adsorbents for the organic additives to thereby remove organic additives forming a pristine polymer solution (PPS). Next, the method provides for separating the pristine polymer (PrP) from the PPS, and then collecting the separated PrP.

A method of recovery of pristine polymers from a mixture of a plurality of waste feedstock of different types of plastics (mixture of plastics) each free of organic additives is also disclosed. This method includes inputting the mixture of plastics into an extractor. The method further includes selecting a solvent mixture (SMi) from a plurality of solvents. Hansen parameters of the selected solvent mixture are within the Hansen's sphere of a target plastic of the mixture of plastics. Each solvent of the plurality is in a predetermined list of solvents. The method also includes inputting the selected SMi into the extractor, thereby generating a mixture ($M_i$). The method also provides selectively heating the $M_i$ to a temperature ranging from 5° C. to 180° C. corresponding to a schedule of temperature vs. known type of plastic, and waiting a predetermined amount of time, thereby forming a polymer solution ($PSl_i$) containing a mixture of solvents and polymers. The method also describes separating insolubles from the $PSl_i$, forming a pristine polymer solution ($PPS_i$), wherein the insolubles are provided to the extractor during a next cycle (i+1). The method also provides, separating the pristine polymer (PrPi) from the $PPS_i$ and collecting the separated PrPi. The method is then repeated for each type of target plastic where the index i corresponds to the number of plastic types in the mixture of plastics, where i=1, . . . M and K corresponds to the number of target plastics, where K≤M.

A method of recovery of pristine polymers from a mixture of a plurality of waste feedstock of different types of plastics (mixture of plastics) each free of organic additives is also disclosed. This method includes inputting the mixture of plastics into an extractor. The method further includes selecting a solvent mixture (SMi) from a plurality of solvents. Hansen parameters of the selected solvent mixture are within the Hansen's sphere of a target plastic of the mixture of plastics. Each solvent of the plurality is in a predetermined list of solvents. The method also includes inputting the selected SMi into the extractor, thereby generating a mixture ($M_i$). The method then provides selectively heating the $M_i$ to a temperature ranging from 5° C. to 180° C. corresponding to a schedule of temperature vs. known type of plastic, and waiting a predetermined amount of time, thereby forming a polymer solution containing the organic additives (PSlOi). The method includes separating insolubles from the PSlOi, forming a pristine polymer solution with organic additives (PPSlOi), treating the PPSlOi using one or more adsorbents for the organic additives to thereby remove organic additives forming a pristine polymer solution (PPSi), and separating the pristine polymer (PrPi) from the PPSi. The method finally includes collecting the separated PrPi, and repeating the aforementioned steps for each type of target plastic where the index i corresponds to the number of plastic types in the mixture of plastics, where i=1, . . . M and K corresponds to the number of target plastics, where K≤M.

A method of recovery of hydrocarbon mixtures from a sorted waste feedstock free of organic additives. The method includes inputting a predetermined volume of a hydrothermal solvent into a reactor, where the hydrothermal solvent includes $H_2O$. The method also includes inputting the feedstock into the reactor, heating the reactor to a temperature ranging from 200° C. to 550° C., forming subcritical or supercritical $H_2O$ within the reactor, and waiting a predetermined amount of time, to allow thermal depolymerization of polymers in the feedstock to produce a slurry. The method next includes cooling the reactor to a predetermined recovery temperature, thereby forming a mixture of gases, hydrocarbons, water, and residual solid mixture, followed by venting the gases forming a hydrocarbon-water-solid mixture. The method then provides for separating the hydrocarbon mixture from the hydrocarbon-water-solid mixture.

A method of recovery of hydrocarbon mixtures from a sorted waste feedstock containing organic additives is provided. The method includes inputting a predetermined volume of a hydrothermal solvent into a reactor, where the hydrothermal solvent comprising $H_2O$, inputting the feedstock into the reactor, heating the reactor to a temperature ranging from 200° C. to 550° C., forming subcritical or supercritical $H_2O$ within the reactor, and waiting a predetermined amount of time, to allow thermal depolymerization of polymers in the feedstock, thereby forming a slurry. Next, the method includes cooling the reactor to a predetermined recovery temperature, thereby forming a mixture of gases, hydrocarbons, additives, water, and solids. Thereafter, the method includes venting the gases and removing the solids to form a mixture of hydrocarbon-water-additives. Treating the hydrocarbon-water-additives mixture using one or more adsorbents for removing the organic additives from the hydrocarbon-water mixture. Finally, the method includes separating the adsorbents from the hydrocarbon-water mixture, and separating the hydrocarbons from the hydrocarbon-water mixture.

A method of a combination of SSEA and HTP processes is shown. The method is directed to recovery of pristine polymers and hydrocarbon mixtures from a mixture of a plurality of waste feedstock of different types of plastics (mixture of plastics) each free of organic additives. The method initially describes the SSEA process steps. This method includes inputting the mixture of plastics into an extractor. The method further includes selecting a solvent mixture (SMi) from a plurality of solvents. Hansen parameters of the selected solvent mixture are within the Hansen's sphere of a target plastic of the mixture of plastics. Each solvent of the plurality is in a predetermined list of solvents. The method also includes inputting the selected SMi into the extractor, thereby generating a mixture ($M_i$). The method then includes selectively heating the $M_i$ to a temperature ranging from 5° C. to 180° C. corresponding to a schedule of temperature vs. known type of plastic, and waiting a predetermined amount of time, thereby forming a polymer solution (PSli) containing a mixture of solvents and polymers. The method of FIG. 7g also describes separating insolubles from the PSli, forming a pristine polymer solution (PPSi), wherein the insolubles are provided to the extractor during a next cycle (i+1), and separating the pristine polymer (PrPi) from the PPSi, followed by collecting the separated PrPi. The aforementioned steps for each type of target plastic where the index i corresponds to the number of plastic types in the mixture of plastics, where i=1, . . . M and K corresponds to the number of target plastics, where K≤M, wherein the insolubles from the last iteration of the loop of steps b through h is provided into a reactor. The method then begins the HTP processing by inputting a predetermined volume of a hydrothermal solvent into the reactor, the hydrothermal solvent includes $H_2O$. The method also includes heating the reactor to a temperature ranging from 200° C. to 550° C., forming subcritical or supercritical $H_2O$ within the reactor, waiting a predetermined amount of time, to allow thermal depolymerization of polymers in the feedstock to produce a mixture of hydrocarbons, and cooling the reactor to a predetermined recovery temperature, thereby forming a mixture of gases, hydrocarbons, water, and solids.

The method also includes venting the gases and removing the solids to form a hydrocarbon-water mixture, and finally separating the hydrocarbons from the hydrocarbon-water mixture.

A method of a combination of SSEA and HTP processes is shown. The method is directed to recovery of pristine polymers and hydrocarbon mixtures from a mixture of a plurality of waste feedstock of different types of plastics (mixture of plastics) each containing organic additives. The method initially describes the SSEA process steps. This method includes inputting the mixture of plastics into an extractor. The method further includes selecting a solvent mixture (SMi) from a plurality of solvents. Hansen parameters of the selected solvent mixture are within the Hansen's sphere of a target plastic of the mixture of plastics. Each solvent of the plurality is in a predetermined list of solvents. The method also includes inputting the selected SMi into the extractor, thereby generating a mixture ($M_i$). The method then provides selectively heating the $M_i$ to a temperature ranging from 5° C. to 180° C. corresponding to a schedule of temperature vs. known type of plastic, and waiting a predetermined amount of time, thereby forming a polymer solution containing the organic additives (PSlOi). The method includes separating insolubles from the PSlOi, forming a pristine polymer solution with organic additives (PPSlOi), treating the PPSlOi using one or more adsorbents to remove the organic additives from the mixture to thereby forming a pristine polymer solution (PPSi), and separating the pristine polymer (PrPi) from the PPSi. The method finally includes collecting the separated PrPi, and repeating the aforementioned steps for each type of target plastic where the index i corresponds to the number of plastic types in the mixture of plastics, where i=1, . . . M and K corresponds to the number of target plastics, where K≤M, wherein the insolubles from the last iteration is fed into a reactor as HTP feedstock. The method then moves to HTP. The method includes inputting a predetermined volume of a hydrothermal solvent into the reactor, where the hydrothermal solvent comprising $H_2O$, heating the reactor to a temperature ranging from 200° C. to 550° C., forming subcritical or supercritical $H_2O$ within the reactor, and waiting a predetermined amount of time, to allow thermal depolymerization of polymers in the HTP feedstock, thereby forming a slurry. Next, the method includes cooling the reactor to a predetermined recovery temperature, thereby forming a mixture of gases, hydrocarbons, additives, water, and solids. Thereafter, the method includes venting the gases and removing the solids to form a hydrocarbon-water-additives mixture, treating the hydrocarbon-water-additives mixture using one or more adsorbents for removing the organic additives to thereby forming a hydrocarbon-water mixture. Finally, the method includes separating the hydrocarbons from the hydrocarbon-water mixture.

DETAILED DESCRIPTION

Figure 1:
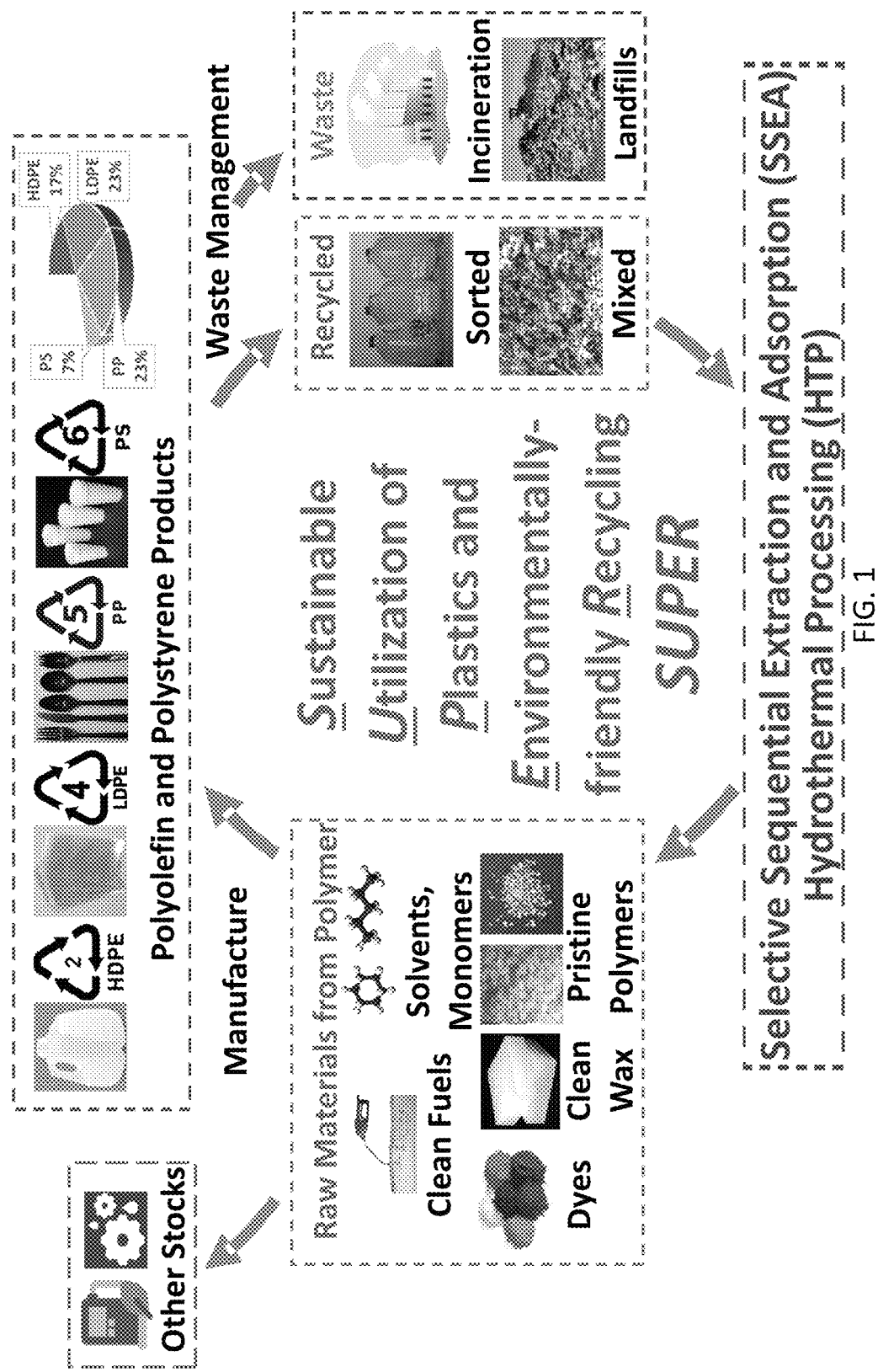
FIG. 1 is a schematic of a high-level process flow for converting plastic waste into useful stock.
Figure 2A:
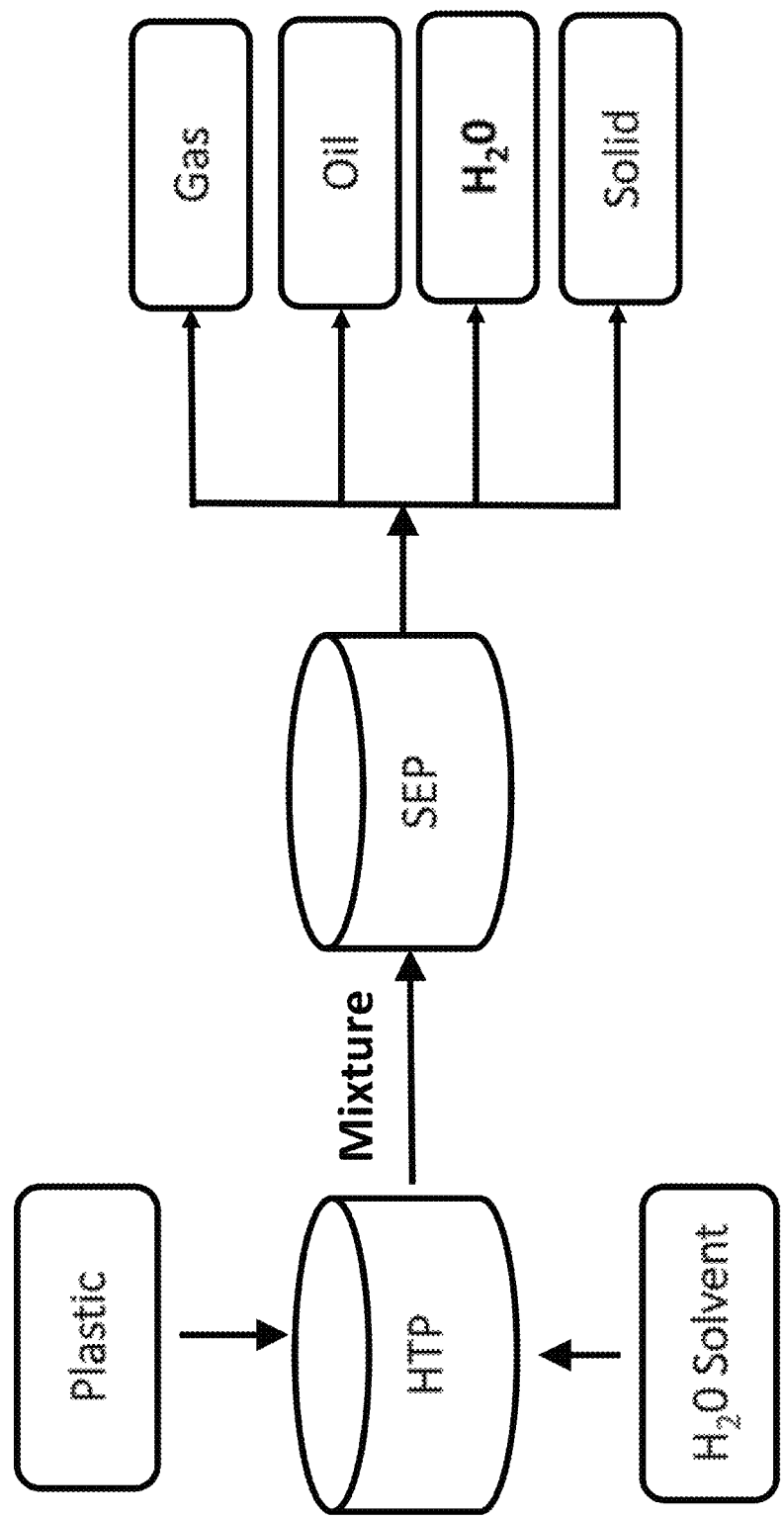
FIG. 2*a* is a high-level process flow for converting plastic waste into useful stock using one of the two main processes (hydrothermal process (HTP)) of the present disclosure.
Figure 2B:
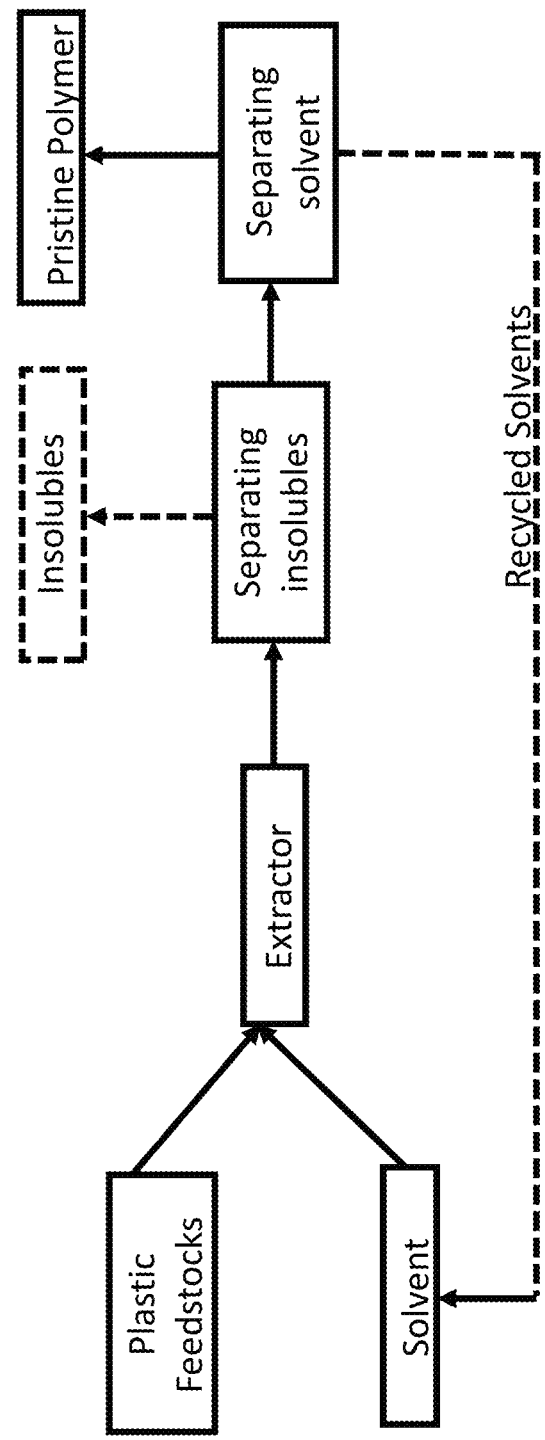
FIG. 2*b* is a high level process flow for converting plastic waste into useful stock using another one of the two main processes Sequential Extraction and Adsorption (SSEA)) of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach that can convert plastic waste into useful stock including pristine polymers and hydrocarbon mixtures is disclosed herein. It should be appreciated that about 350 million tons of plastic waste, classified into seven types, were generated globally in 2015. The majority of the waste (63%, or 220 million tons) was polyolefin; it includes Type 2 HDPE (grocery bags, milk jugs, and pill bottles), Type 4 LDPE (Ziploc bags, and films), and Type 5 PP (food containers and automotive parts). About 7% of the waste (25 million tons) was Type 6 PS (cups and food containers). About 14% (49 million tons) was Type 1 PET (water bottles and containers). About 3% was Type 3 PVC (pipes, toys), and about 13% (46 million tons) was Type 7, which includes polycarbonate, polyurethane, nylons, composites, and others. The method disclosed herein provides a cost-effective solution for converting Types 2, 4, 5, and 6 (about 70% of the plastic waste) into useful products. Referring to FIG. 1, a schematic of plastic life-cycle, including the methods of converting plastic waste into hydrocarbon mixtures and other useful stock, according to the present disclosure is presented. Actual reduction to practice using batch conversion processes have been shown.

The methods of present disclosure include two conversion modalities: (1) Selective Sequential Extraction and Adsorption (SSEA), which can convert (i) sorted, or (ii) mixed plastic waste into pristine polymers; (2) Hydrothermal Processing (HTP), which uses subcritical or supercritical water to depolymerize plastic waste to a wide range of useful products. By varying the HTP temperature, pressure, and reaction time, the polyolefins can be converted into hydrocarbon mixtures including one or more of the following: solid fuels, waxes, naphtha (light crude oil), gasoline-like fuel, diesel-like fuel, or gases. The hydrocarbon mixture can be further separated or converted in conventional refineries to gasoline, diesel, lubricants, light alkanes, olefins, cyclics, aromatics, specialty solvents, or other chemicals.

While the SSEA method has higher energy efficiency and lower processing costs than the HTP method, the HTP method of the present disclosure is a robust and versatile conversion method that can treat wet, dirty, sorted, or mixed plastic waste. A combination of SSEA and HTP methods can provide versatile solutions for converting about 70% of the plastic waste (Types 2, 4, 5, and 6) into various useful products, as shown in FIG. 1. These methods provide the economic advantages that make conversion of plastic, economically viable. In addition, these methods can reduce the amount of petroleum crude oil needed for the production of plastics or fuels; and also owing to being greener than incineration, these methods have the potential to reduce $CO_2$ emissions by 1-6 tons per ton of plastic waste converted.

These methods also recover high-purity polymers and additives from Type 7 plastic waste. We found that single solvents do not have sufficient selectivity to separate one polymer from a polymer blend. However, one can design a solvent mixture to selectively dissolve or precipitate a target polymer for separation. Thus, the methods of the present disclosure provide an efficient approach for selecting the mixed solvents based on the "Hansen solubility parameters." The Hansen theory predicts the solubility of a targeted polymer in a solvent through their polar, hydrogen bonding, and dispersion parameters. If a solvent point is inside the sphere of the polymer, it is expected that the polymer will have solubility in the solvent.

HTP is a thermochemical depolymerization process in an enclosed reactor, in which water serves as an important solvent. HTP requires moderate temperatures (typically 200-550° C.) and moderate pressures (typically 10-35 MPa). As the reaction condition approaches the critical point of water (subcritical or supercritical), its properties such as dielectric constant and ionic strength are changed significantly, enabling water to bring about fast and efficient reactions to convert organic or plastic wastes to crude oil. A recent publication has shown that hydrothermal liquification can convert polystyrene (PS) and polycarbonate (PC) into fuels with high yields (75-99 wt. %). However, there is no detailed investigation on using HTP to produce fuels from polyolefins (high-density polyethylene (HDPE), low-density polyethylene (LDPE), and Polypropylene (PP)), which accounts for the majority (63%) of the plastic waste in this country. Actual reduction to practice of the methods according to the present disclosure provide preliminary results that HTP can convert the polyolefins into oil or gas with 90 to 97% yield.

Thus a goal of the methods of the present disclosure is to develop versatile solutions for converting 70% of the plastic waste into pristine polymers or clean hydrocarbon mixtures, using a (i) SSEA and (ii) HTP, alone or in combination.

Four model polymers (Types 2, 4, 5, and 6), provided in Table 1, and their mixtures (e.g., a melted blend of 50/50 PP/LLDPE) are chosen because they represent 70% of the major plastic waste in this country. Furthermore, Plastic Industry Association recently announced that it is expected to have the feedstock of mixed plastic films, mainly consisting of HDPE, LDPE, and PP, available at a scale of 2 billion pounds per year, at a cost about $0.03/lb. Organophosphorus types of flame retardants are selected as the model additives because they are emerging contaminants which do not degrade in landfills or they generate toxic chemicals during incineration. The solvents used (hexane, heptane, toluene, xylene, petroleum ether, methanol, and acetone) were reagent grade and obtained from FISCHER SCIENTIFIC.

TABLE 1

Characteristics of selected polymers

| | HDPE (Type 2) | LDPE&LLD PE (Type 4) | PP (Type 5) | PS (Type 6) |
|---|---|---|---|---|
| Percentage of Total Plastic Waste (US) | 17% | 23% | 23% | 7% |
| Density (g/cm$^3$) | 0.93-0.97 | 0.90-0.95 | 0.89-0.91 | 0.96-1.04 |
| Melting Temp. (° C.) | 120-180 | 115-130 | 150-170 | 240 |
| Melt Index (g)* | 2-12 | 1 | 4 | 6-9 |
| Molecular Weight ($M_w$) | ~200,000 | ~100,000 | ~300,000 | ~192,000 |

*Melt Index is defined as the weight of melted samples in 10 minutes, following ASTM D1238 Standard Procedure.

Initially the SSEA method is described (the method is described below with respect to FIGS. 7a-7d). The experiments were all structured around the same basic procedure. All experiments started with weighing out about 1 gram ($W_o$) of the plastic pellets for the chosen polymer type and collecting that 1 gram in a 200 mL bottle. Then, 20 mL of a chosen organic solvent mixture (with Hansen parameters inside the Hansen sphere) would be added to the bottle to mix with the pellets. Once the solvent-polymer mixture was ready, a hot water or silicone oil bath was prepared at the desired temperature (5-180° C.) to heat up the mixture. Notably, if the heating temperature is beyond the boiling point of solvents, a condenser was used to avoid solvent lost.

After the mixture bottle was placed in the hot water or silicone oil bath, a predetermined time was allowed for dissolution to occur. Polymer dissolution generally is a slow process. It is suggested to wait for at least 30 minutes. Once the polymer sample begins to dissolve, the polymer is swollen and the solution looks cloudy (at high temperature). When the solution cools down, a gel-like solution would be observed. Typical dissolution time is highly dependent on the sample. In this study, 30 minutes-24 hr dissolution time has been tested.

After the dissolution time period was over, the mixture bottle was removed from the hot bath and brought under a hood to begin separation of the product with or without the assistance of anti-solvents, e.g., methanol or acetone (anti-solvents are solvents that when mixed with the initial solvent mixture would results in Hansen parameters outside of the Hansen sphere). In the case of separating the polymeric product with anti-solvents, the dissolved portion was poured into the anti-solvent. If undissolved solids still remained in the bottle, such as in the case of dissolving the blend of PP and LLDPE, then a stainless screen would be used to catch the solid residuals so only the dissolved polymers were measured in the end. The anti-solvent separation was repeated several times to ensure all recovery of the dissolved polymer from the feedstock. Afterwards, a vacuum filtration system was set up to collect the solid polymer product. The filtration was repeated a couple of times as well to ensure all product was collected. In the case of separating the polymeric product without an anti-solvent, the dissolved portion was passed through a stainless screen so that the undissolved solid residuals can be separated from dissolved polymers. Notably, when no anti-solvents were used, the separation should be conducted in an isothermal environment.

Once the solid product (when anti-solvents were used) or the polymer solution (when no anti-solvents were used) was obtained, it needed to be dried so all the solvent evaporated away. For this reason, the product was placed in an oven set at 80° C. for at least 24 hours. After this time period, the final mass of the polymer product recovered was recorded ($W_p$). In most cases, this would be the end, unless a second dissolution is needed. If that is the case, the experiment would be run through from the beginning again, using the recovered product instead of the 1 gram of solid in the beginning. The dissolution yield (Y) was calculated as $Y=W_p/W_o$. For each condition, at least two independent dissolution tests were conducted and the average value and error were reported.

Figure 7A:
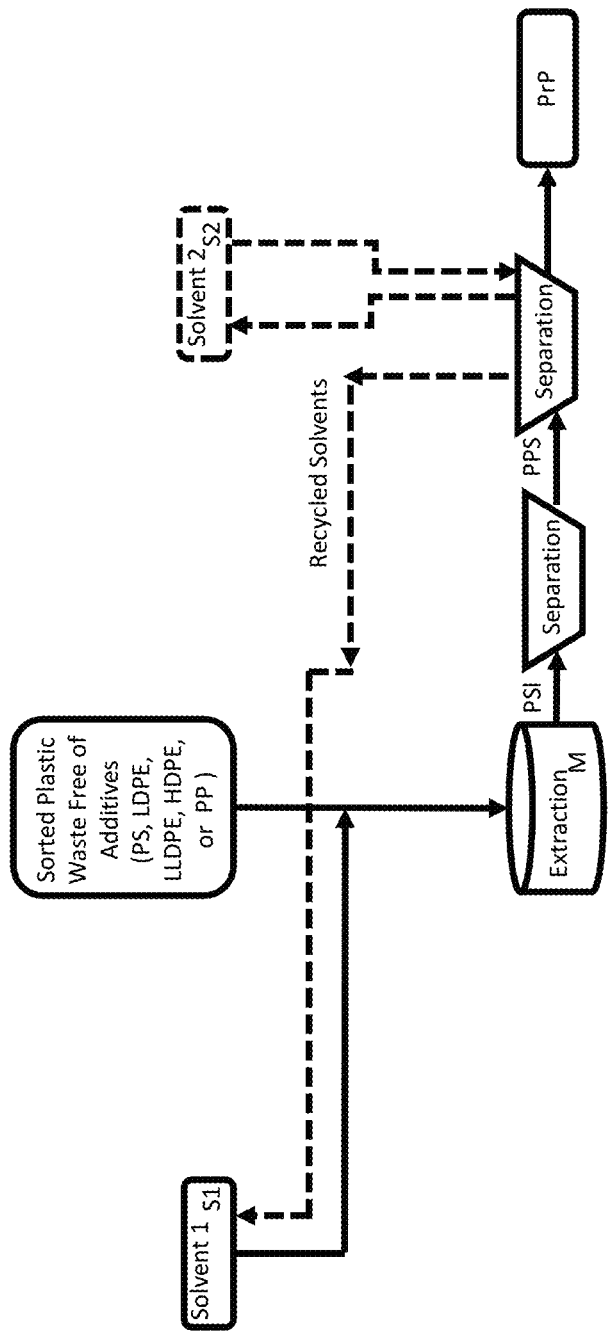
FIG. 7*a* is a process flow showing a method of recovery of a pristine polymer (HDPE, LDPE, PP, or PS) from a sorted waste feedstock free of organic additive.
Figure 7B:
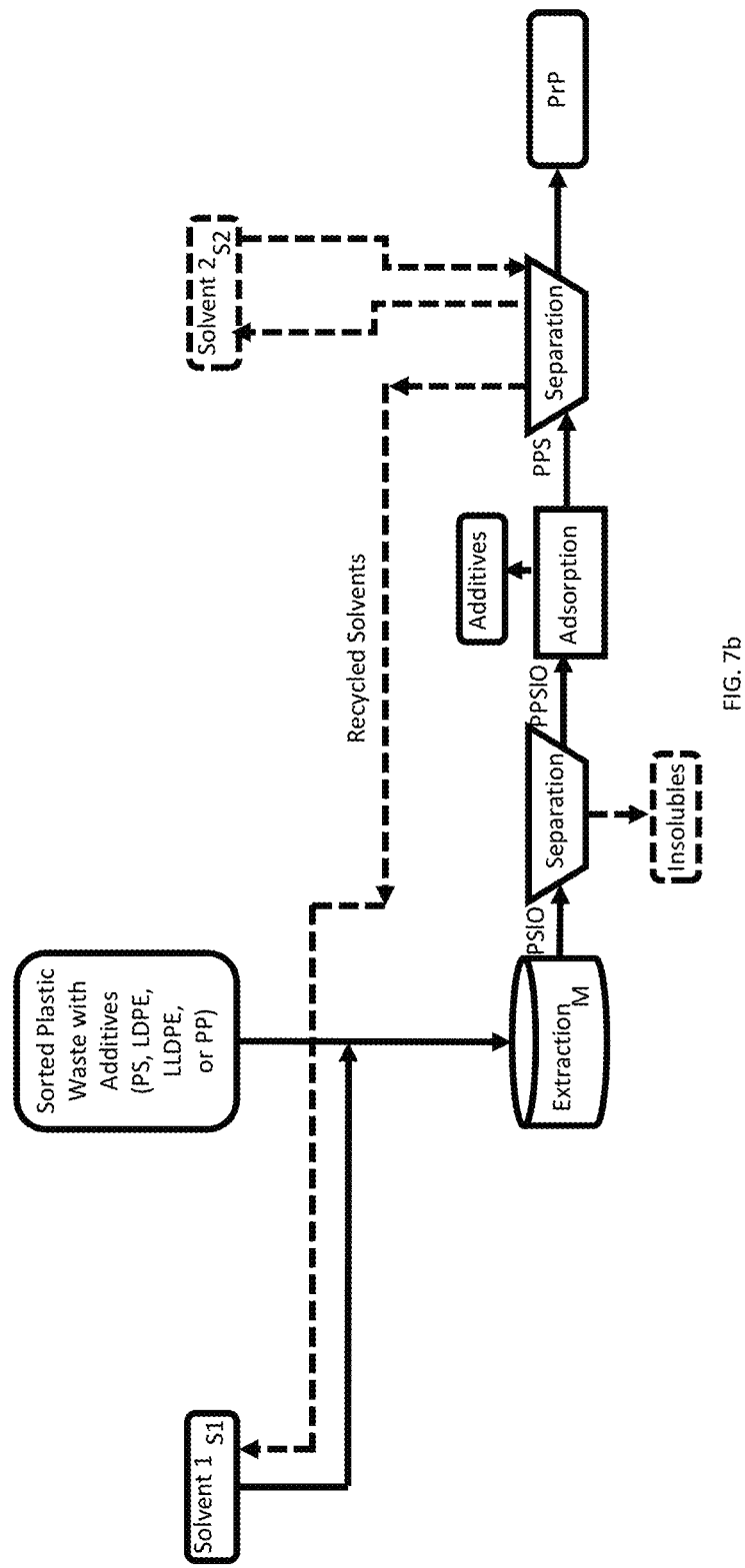
FIG. 7*b* is a process flow showing a method of recovery of a pristine polymer (HDPE, LDPE, PP, or PS) from a sorted waste feedstock containing organic additives.
Figure 7C:
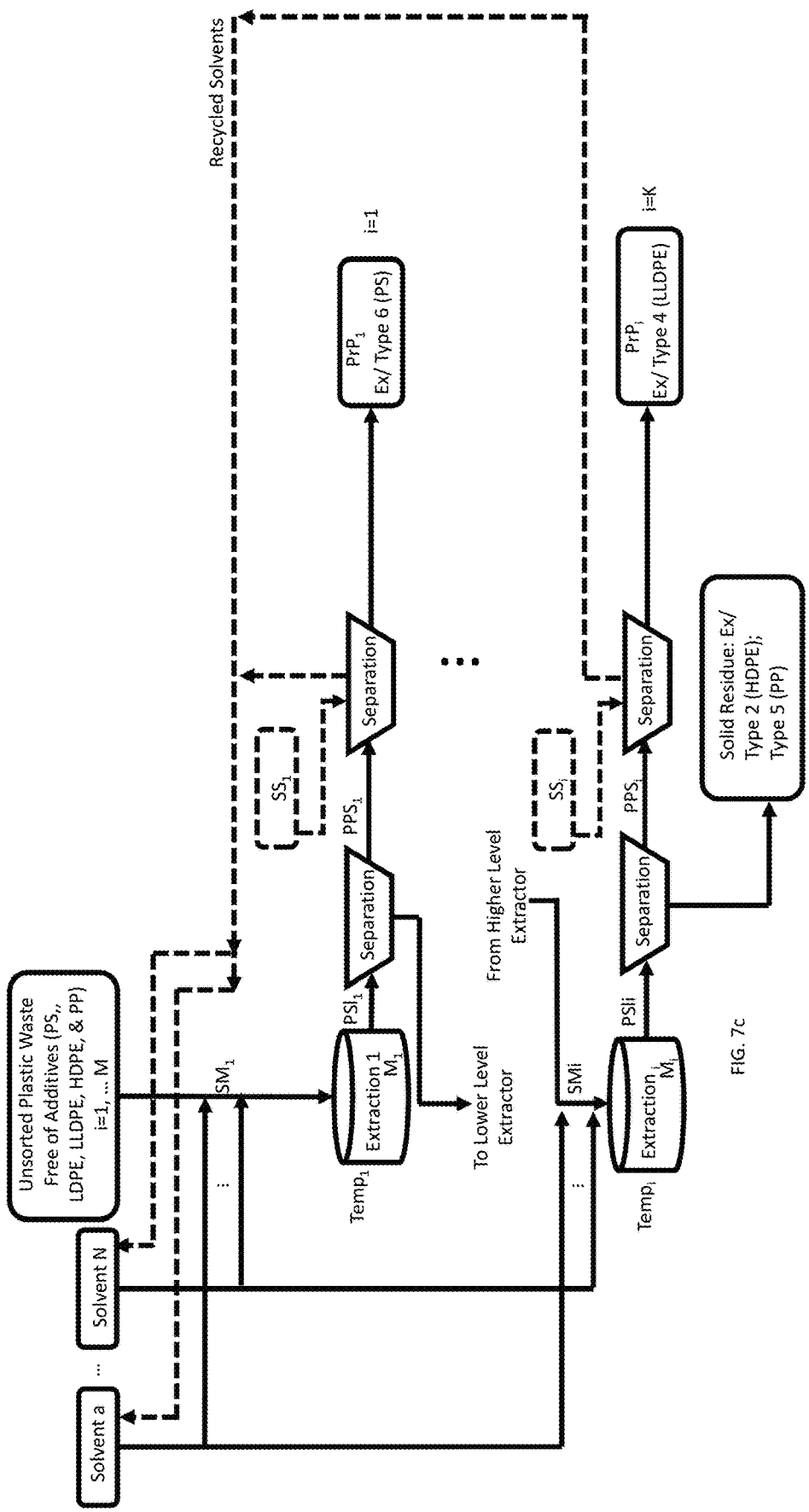
FIG. 7*c* is a process flow showing a method of recovery of three pristine polymers (PS, LDPE, and LLDPE) from a mixture of a plurality of waste feedstock of different types of plastics (PS, LDPE, LLDPE, HDPE, and PP) each free of organic additive. The residual HDPE and PP can be converted using HTP subsequently.
Figure 7D:
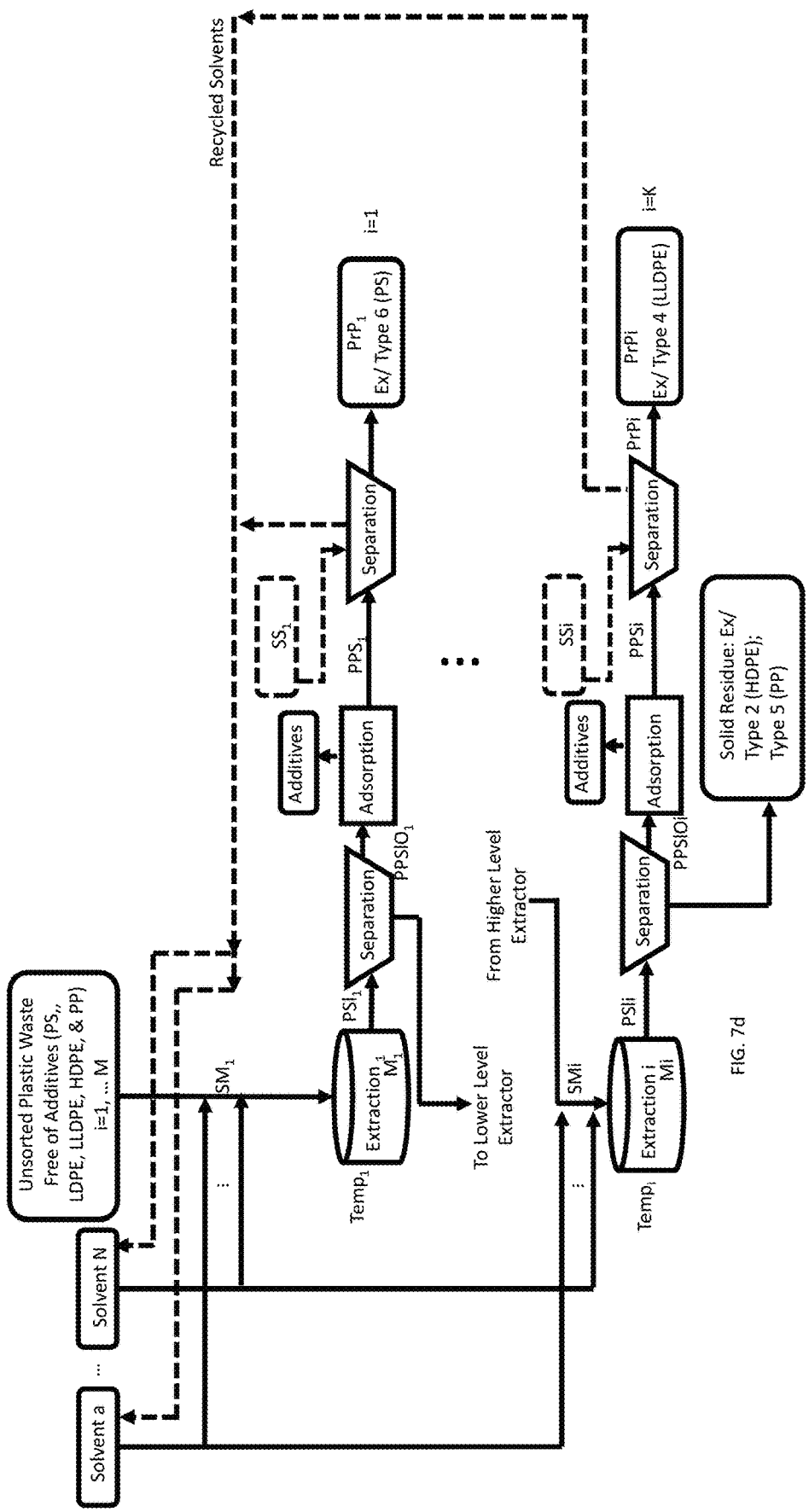
FIG. 7*d* is a process flow showing a method of recovery of three pristine polymers (PS, LDPE, LLDPE) from a mixture of a plurality of waste feedstock of different types of plastics (PS, LDPE, LLDPE, HDPE, and PP) each containing organic additives.
Figure 7E:
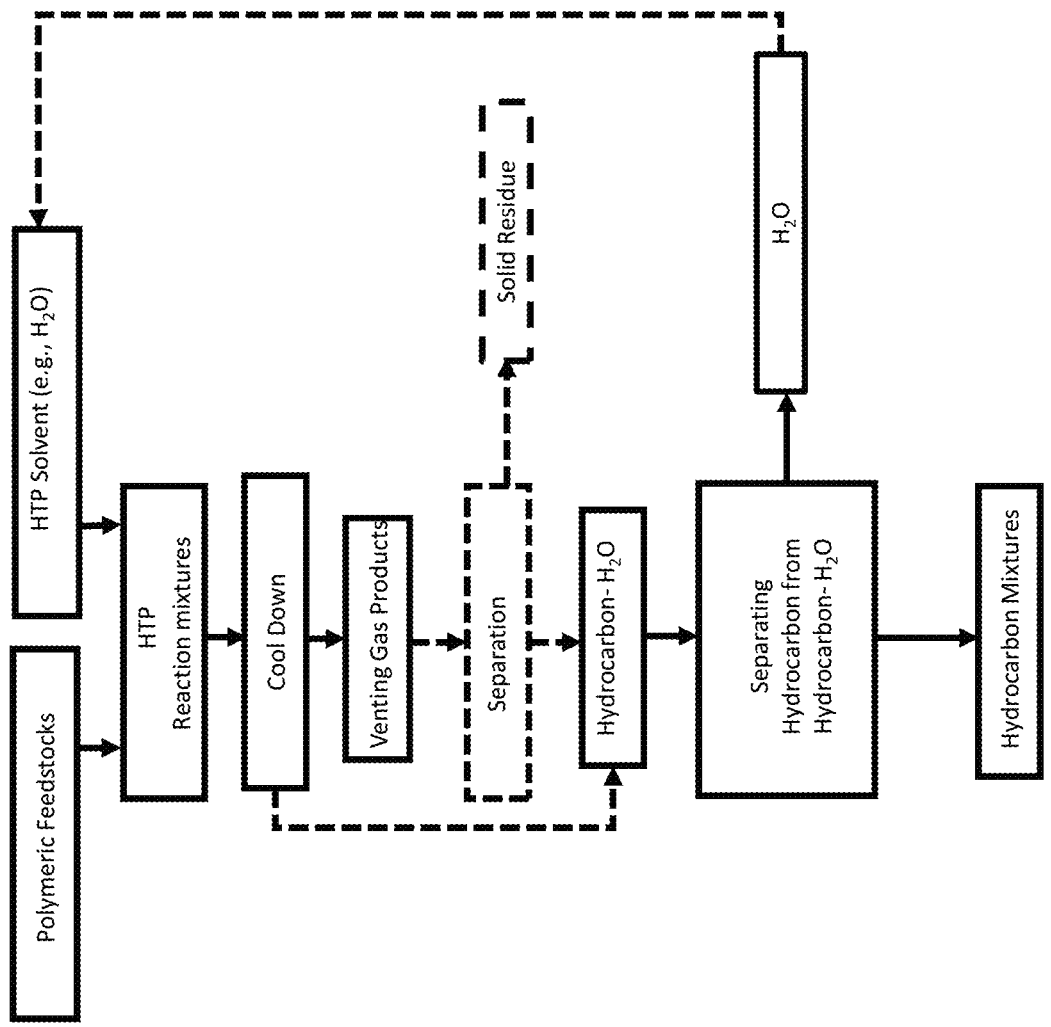
FIG. 7*e* is a process flow showing a method of recovery of hydrocarbon mixtures from a sorted waste feedstock free of organic additives.
Figure 7F:
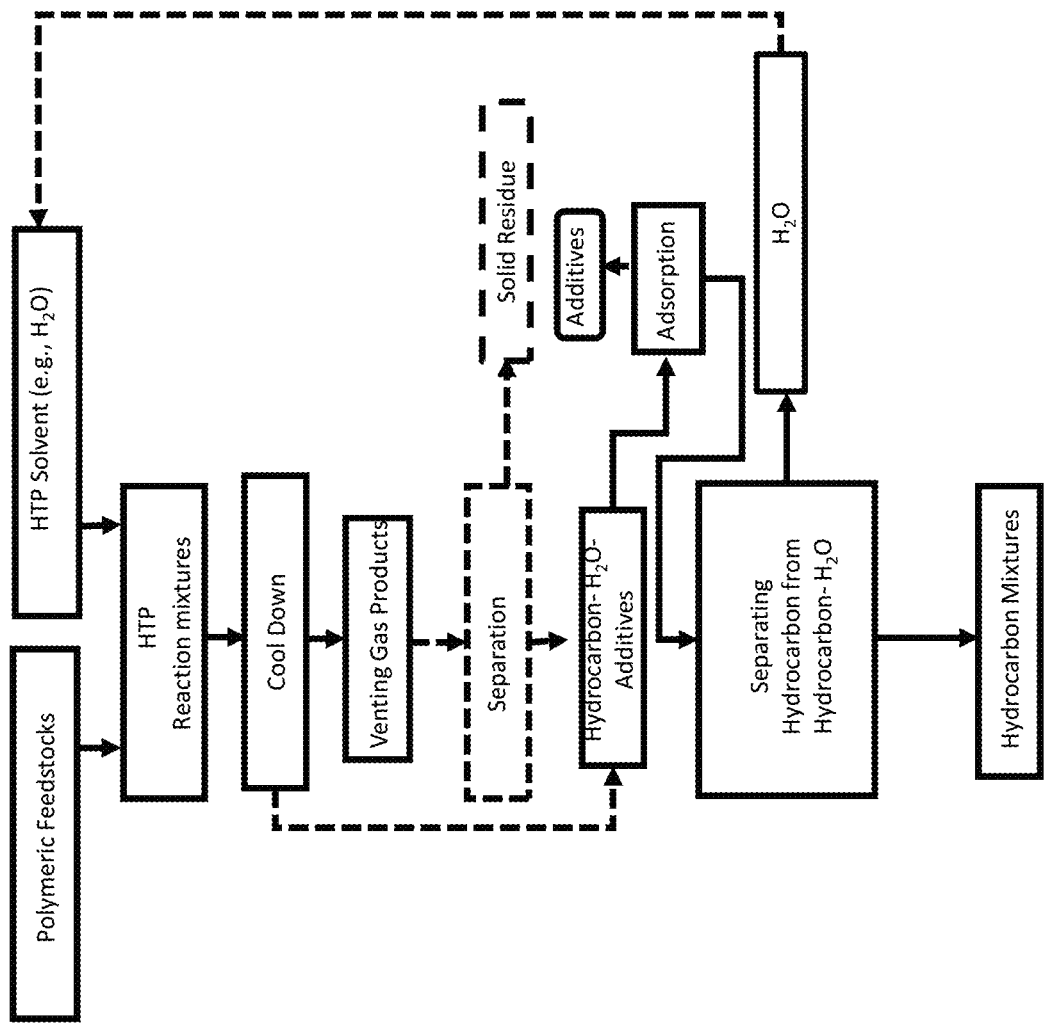
FIG. 7*f* is a process flow showing a method of recovery of pristine polymers and hydrocarbon mixtures from a mixture of a plurality of waste feedstock of different types of plastics each free of organic additives.

The HTP method is described with respect to FIGS. 7e-7f. The hydrothermal research in this study was conducted using a series 4570 benchtop high pressure high temperature reactor system manufactured by Parr Instrument Company. This system included a 500 ml reactor cylinder (2.5" ID and 6.6" inside depth) and a reactor head with magnetic drive, pressure gage (0-5.000 psi), safety rupture disc, gas intel and outlet valve, cooling coil, and thermowell with Type J thermocouple. The rating of this reactor was up to 34.4 MPa at temperature up to 500° C. The head, cylinder, and internal parts were constructed of Alloy C276. Valves and fittings were constructed of stainless steel. An electric heater assembly was used for heating.

HTP reactions were carried out at 400-450° C. with a 0.5-3 hr reaction time for converting HDPE, LDPE, and PP into hydrocarbon mixtures. Each HTP test contains 20-80 grams polymeric feedstock and about 70 grams water. The reactor was subsequently sealed, and the headspace was purged with nitrogen twice to remove any residual air. A 0.69 MPa nitrogen gas was again added to the reactor to build an inert atmosphere. The heating-up process to reach set temperature usually took 40-60 mins and reaction time started when it reaches the set temperature. Initial and final pressures and temperatures were recorded. After the reaction was completed, the reactor was air-cooled. About 15 mins were needed to cool down to 200° C., and 35 mins were needed to cool down to 200° C. When it reached room temperature, gas pressure was first measured, and the gas was collected. The reactor was then opened, and the oil mixed with water, and solid residue was decanted into a flask. Filtration was conducted to separate solid residue from the liquid mixture and liquid-liquid separation was carried out to separate water from oil.

Yields of solid residue, gas, and oil products were determined by:

Solid residue yield (d.w %)=$W_{residue}/W_{feedstock}\times100$

Gas product yield (d.w %)=100−(solid reside+oil).

Oil product yield (d.w %)=$W_{oil}/W_{feedstock}\times100$

The relationship between supercritical water pressure and density (concentration) was obtained from NIST Chemistry WebBook, SRD 69.

Quantitative analysis of the HTP samples was done by two-dimensional gas chromatography with a flame ionization detector (GC×GC-FID). Chromatographic conditions for GC×GC-FID are shown in Table 2. Data were collected and processed using the ChromaTOF software version 4.71 optimized for GC×GC-FID with a signal to noise ratio of 75. Agilent chromatograph 7890B was equipped with non-moving quad-jet dual stage thermal modulator and liquid nitrogen for modulation. Approximately 10 μL of HTP sample was diluted in 1 mL of n-pentane; then 0.5 µL of the sample solution was injected with a 20:1 split ratio.

TABLE 2

Chromatographic Conditions for GC × GC-FID

| parameter | description |
| --- | --- |
| analytical column | primary: DB-17MS Agilent (30 m × 0.25 mm × 0.25 µm)<br>secondary: DB-1 MS Agilent (0.8 m × 0.25 mm × 0.25 µm) |
| carrier gas | UHP helium, 1.5 mL/min |
| oven temperature | isothermal 40° C. for 0.2 min, followed by a linear gradient of 3° C./min to a temperature 260° C. being held isothermally for 20 min |
| modulation period | 2.5 s with 0.42 s hot pulse time |
| offsets | secondary oven: 50° C.<br>modulator: 15° C. |
| temperatures | inlet: 280° C.<br>FID: 300° C. |
| solvent | n-pentane (99.9% pure, Sigma Aldrich), 130 s delay |

A detailed chemical classification on GC×GC-FID was developed in ChromaTOF as described in literature. The classification included carbon numbers between C6 and C31 for all main hydrocarbon classes, such as n-paraffins, iso-paraffins, mono-cycloparaffins, di-cycloparaffins, tri-cycloparaffins, alkylbenzenes, cycloaromatics (indanes, tetralins, etc.), naphthalenes, biphenyls, anthracenes and phenanthrenes, and pyrenes. The weight percent of each group (all compounds with the same carbon number for the same hydrocarbon class) were obtained by dividing the peak area of the group by total peak area of the sample.

Figure 3:
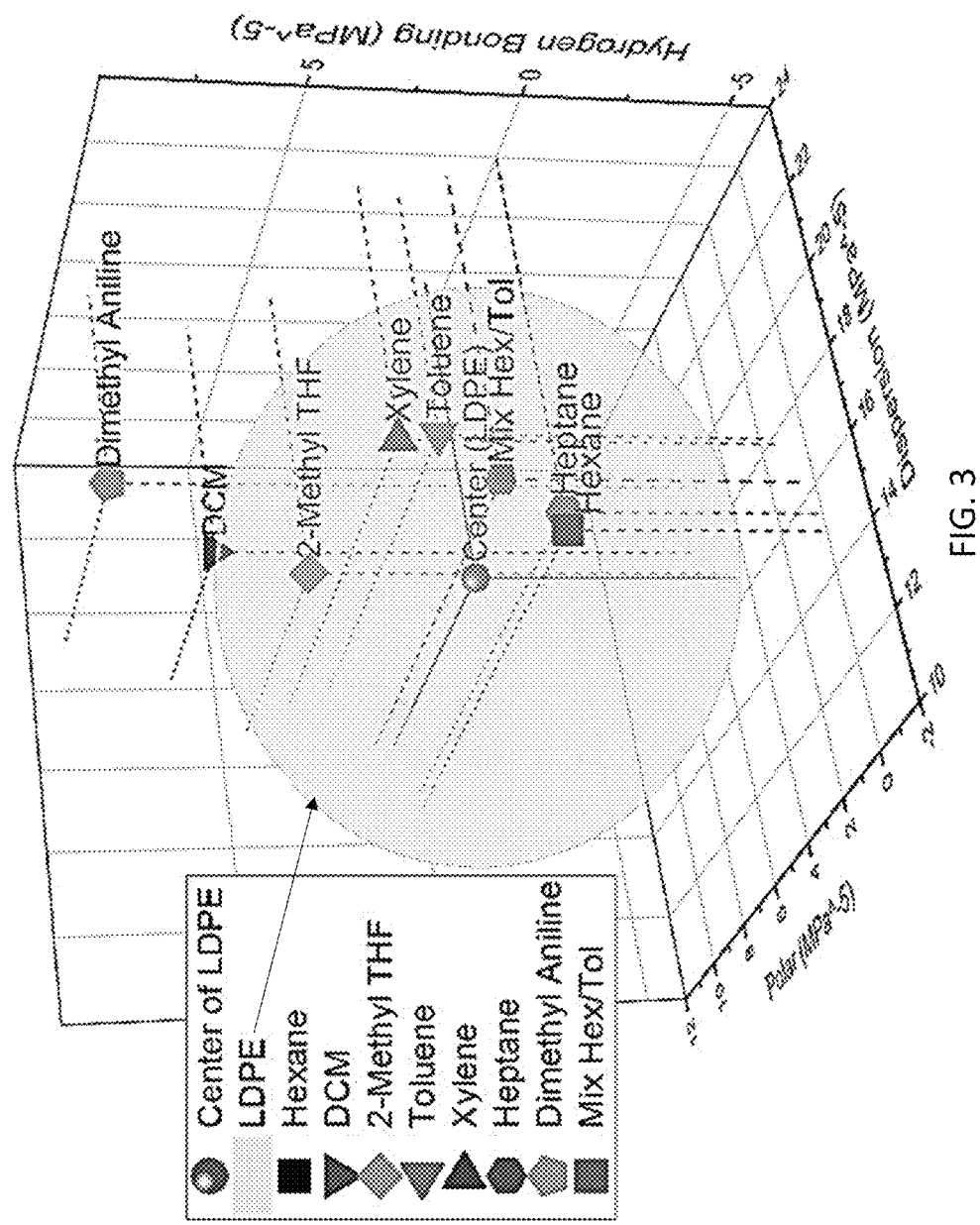
FIG. 3 is a 3-dimensional Hansen graph showing Hansen parameters with respect to different solvents for low-density polyethylene (LDPE).

With respect to the SSEA methodology, according to the present disclosure, solvent mixtures have been identified that are appropriate to selectively dissolve PS, LDPE, LLDPE, and HDPE by using the Hansen solubility parameters. Referring to FIG. 3, the Hansen sphere is shown with respect to Hansen parameters. If a solvent point is inside the sphere of a polymer, it is expected that the polymer will have solubility in the solvent. The closer a solvent point is located near the center of the polymer solubility sphere, the higher the solubility of the polymer in the solvent. Although toluene and hexane are not near the center of the LDPE solubility sphere, mixing equal volume of these two solvents will give a mixture point close to the center of LDPE.

Figure 4A:
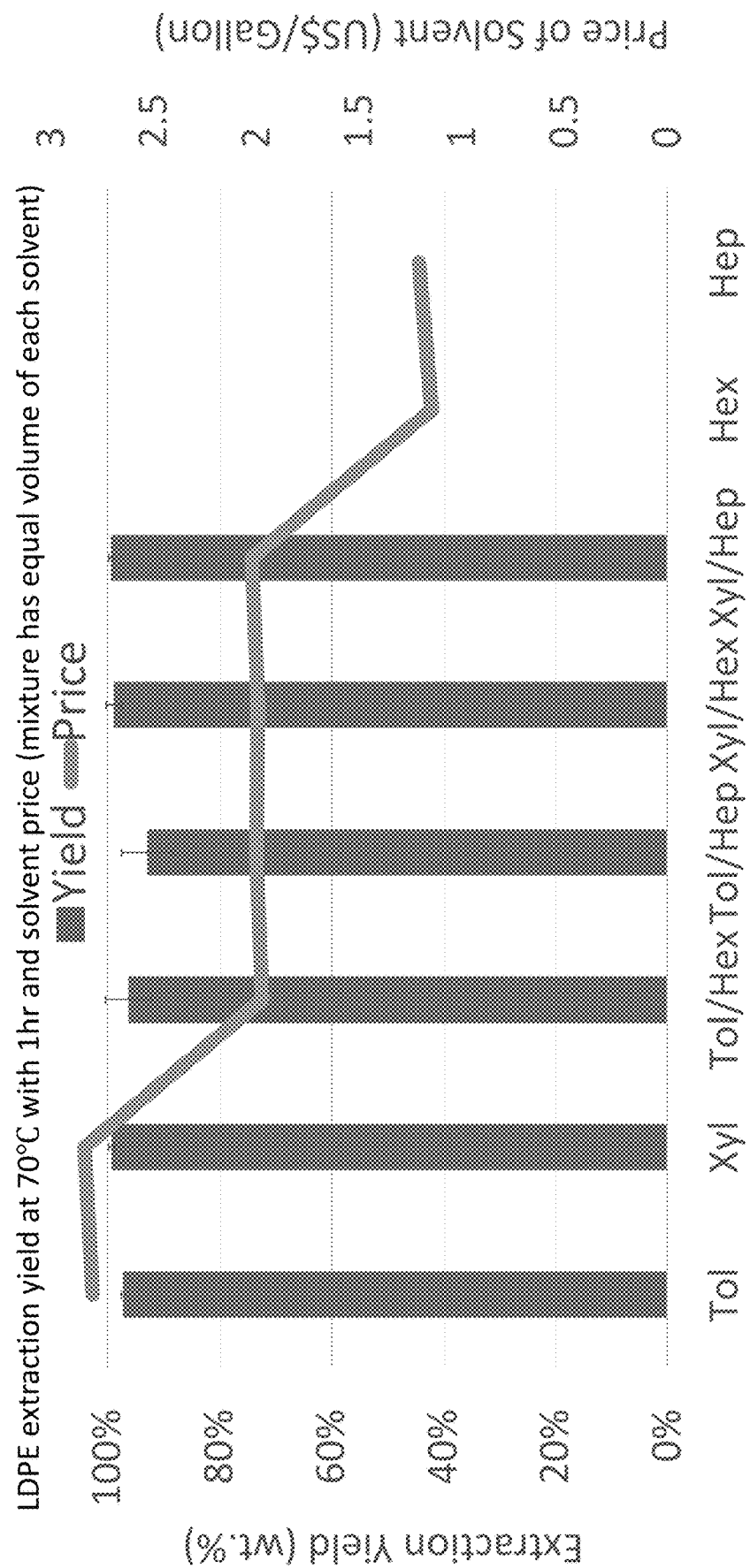
FIG. 4*a* is a bar graph of extraction yield vs. solvent for LDPE, also showing relative solvent pricing.
Figure 4B:
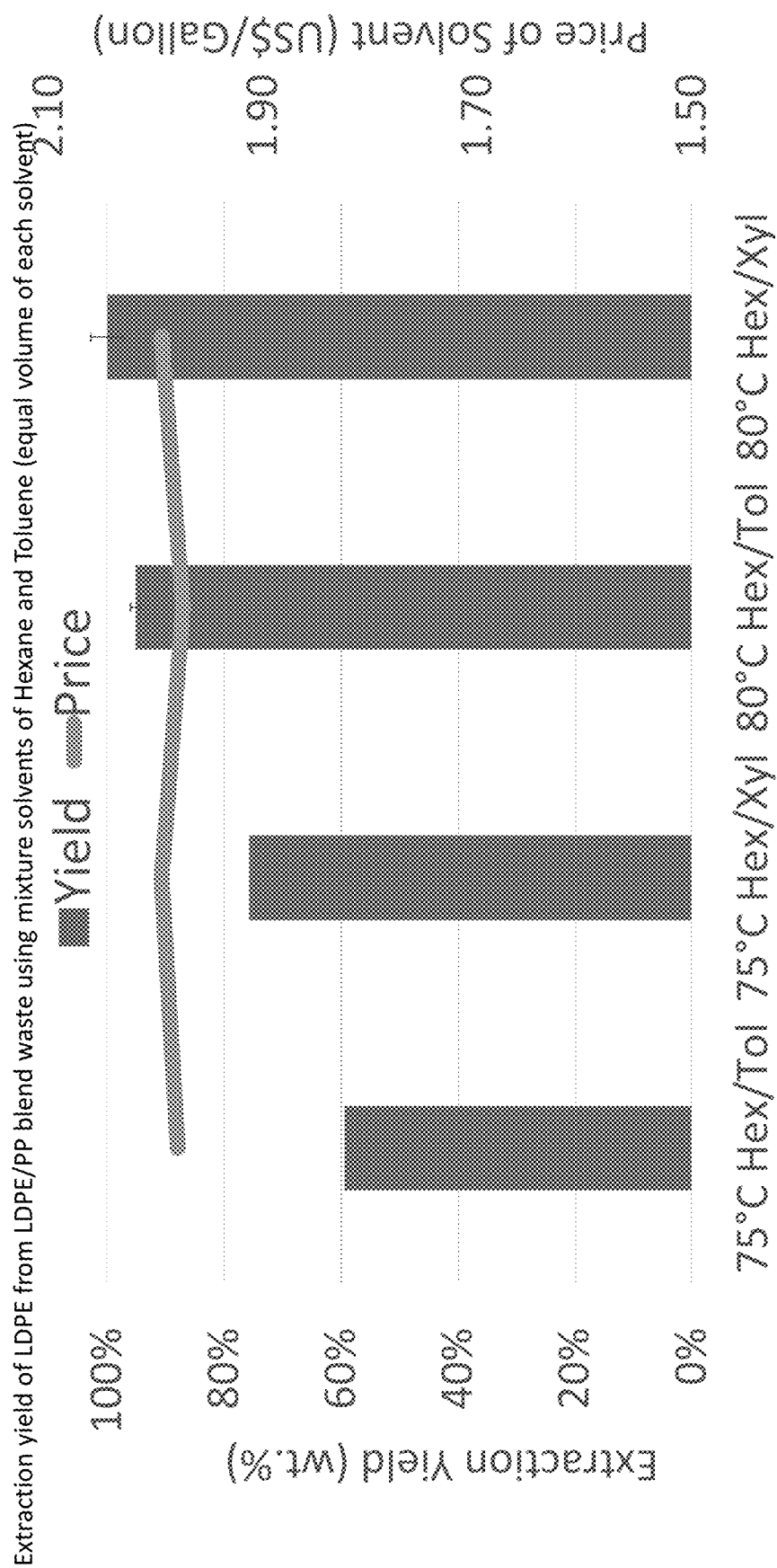
FIG. 4*b* is bar graph of extraction yield vs. solvent for linear low-density polyethylene (LLDPE), also showing relative solvent pricing.
Figure 4C:
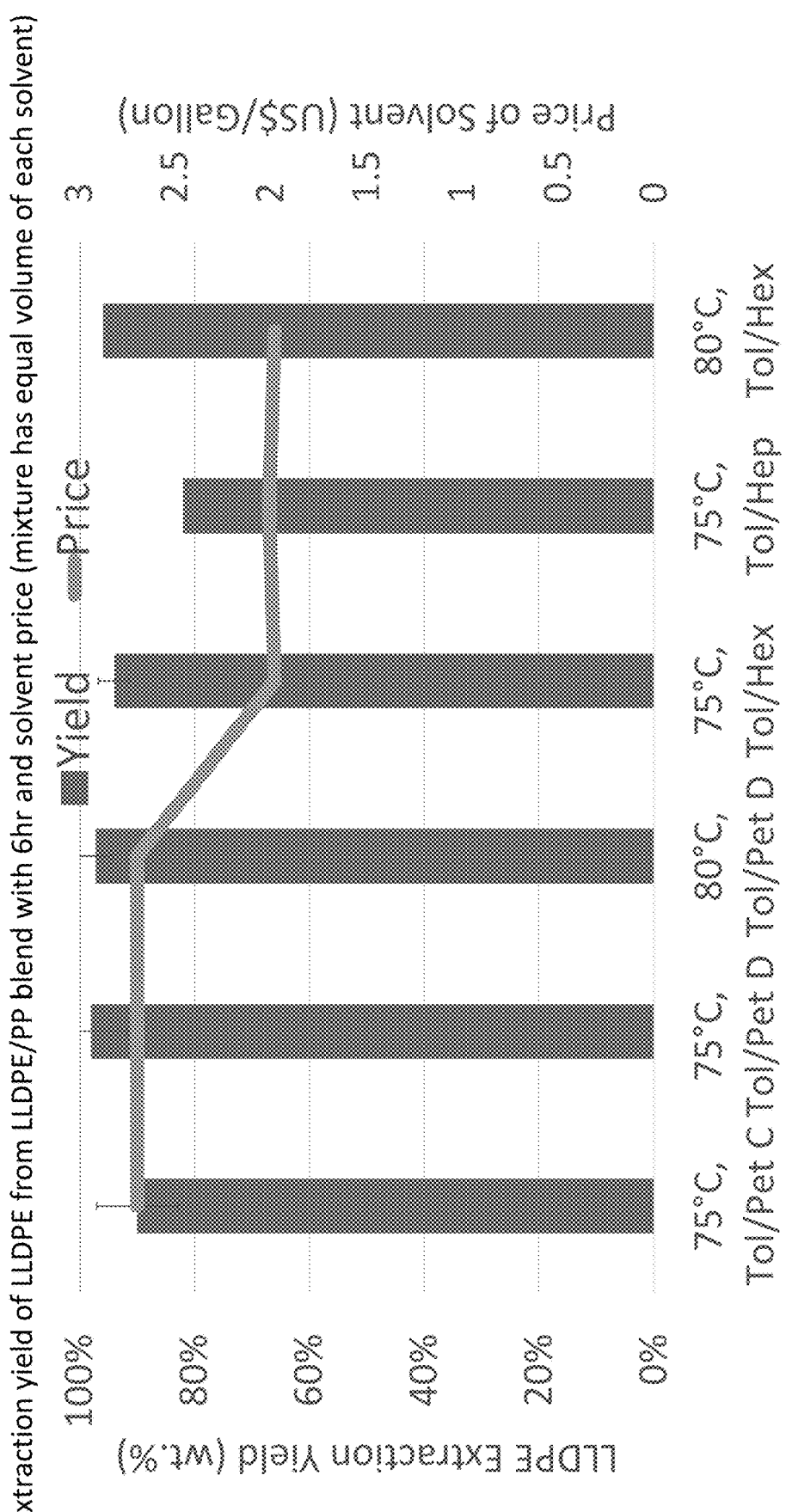
FIG. 4*c* is another bar graph of extraction yield vs. solvent for linear low-density polyethylene (LLDPE), also showing relative solvent pricing.
Figure 4D:
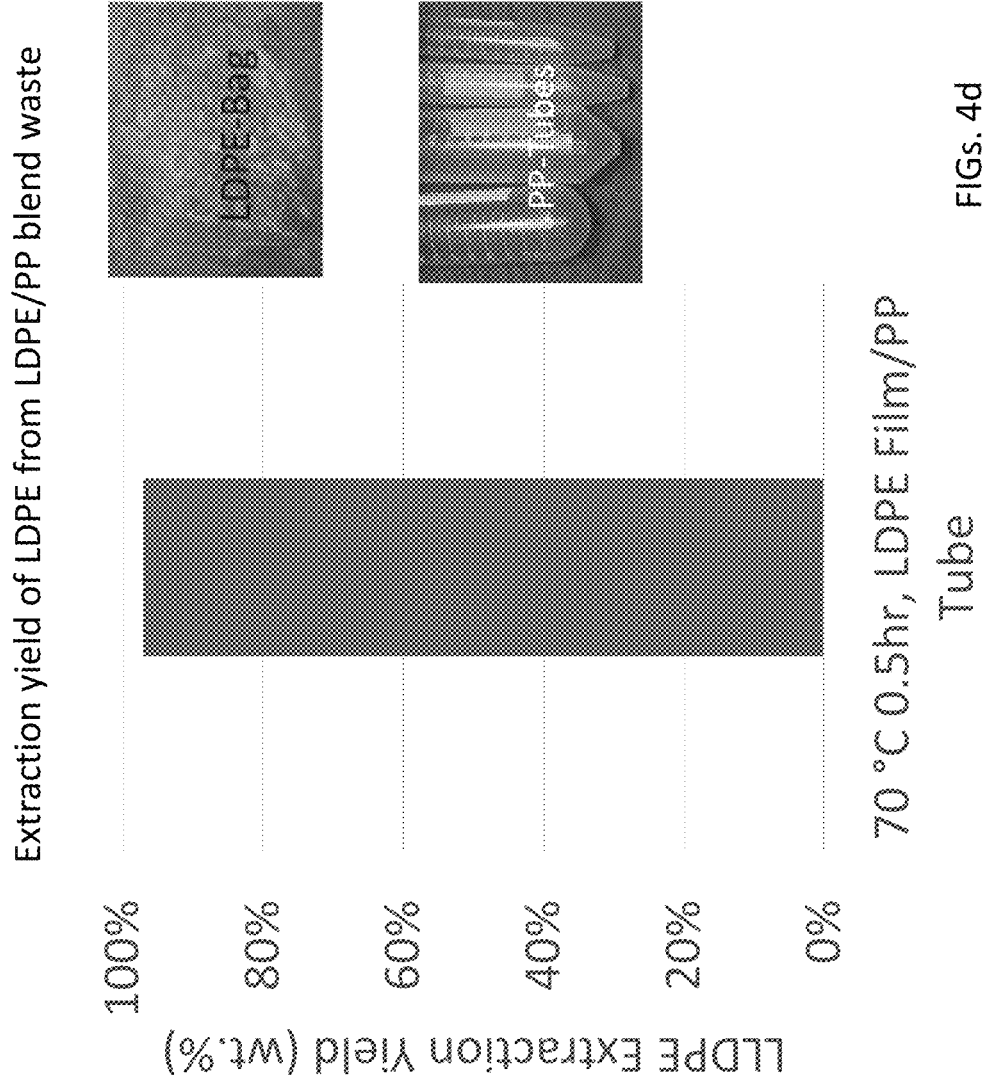
FIG. 4*d* is another bar graph of extraction yield vs. solvent for extracting LDPE film from a mixed waste of LDPE film and PP tube.

This prediction was verified in the actual reduction to practice. Referring to FIGS. 4a and 4b, dissolution yield of LDPE and LLDPE in different solvents are shown: FIG. 4a shows dissolution yields of LDPE pellets (70° C./1 hr), FIG. 4b shows dissolution yields of LDPE pellets (2 hr extraction time), FIG. 4c shows dissolution yields of LLDPE from LLDPE/PP blend, and FIG. 4d shows dissolution yields of commercial sorted polyolefin waste (Tol/Hex). The results in FIGS. 4a-4d show that a mixture of toluene and hexane can dissolve more LDPE and LLDPE than using hexane alone. In addition, a 50:50 vol. % mixture of xylene and hexane, xylene and heptane, and toluene and petroleum ether (Pet C and Pet D) also can dissolve LLDPE.

Figure 5:
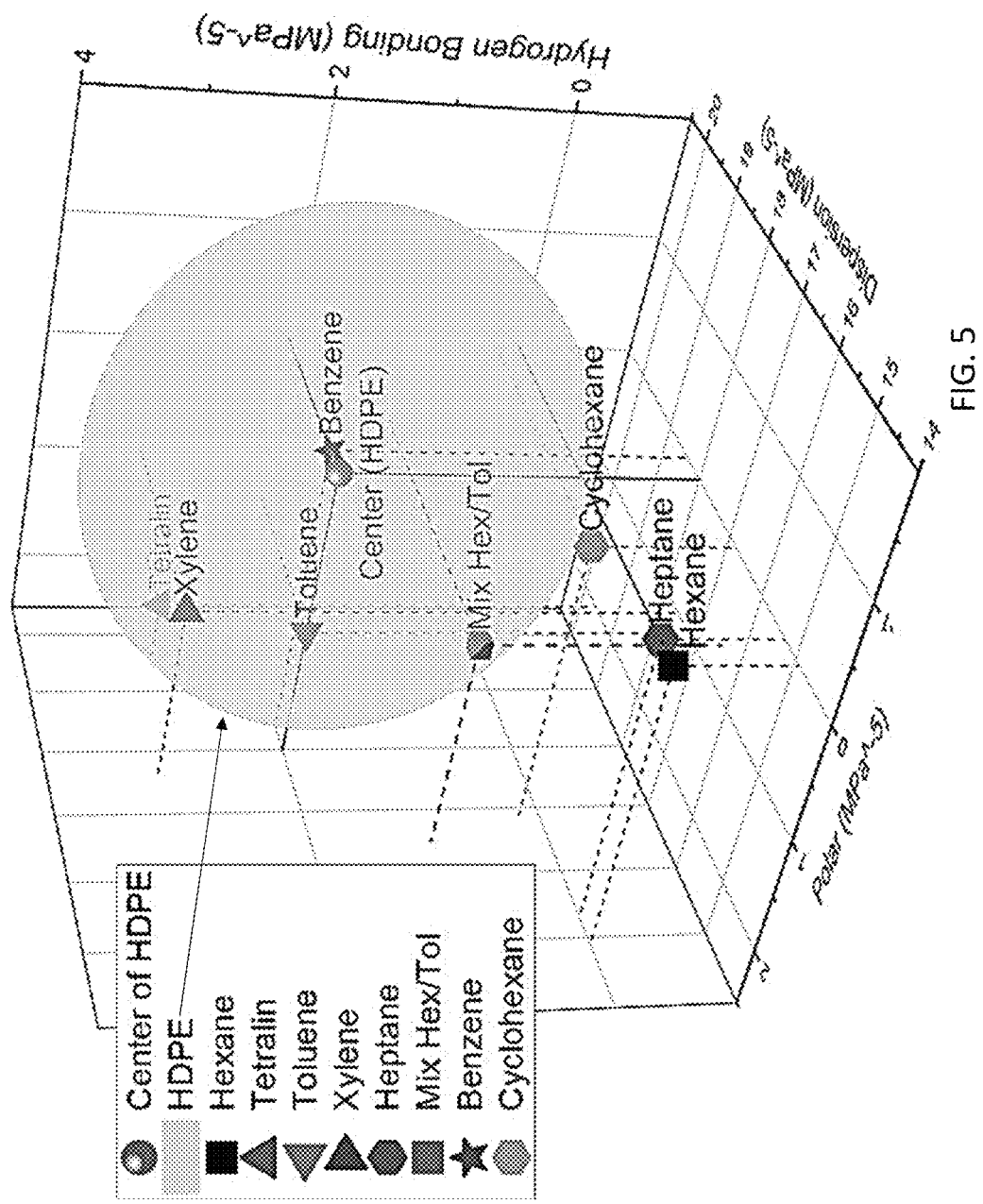
FIG. 5 is another 3-dimensional Hansen sphere for high density polyethylene (HDPE).
Figure 6:
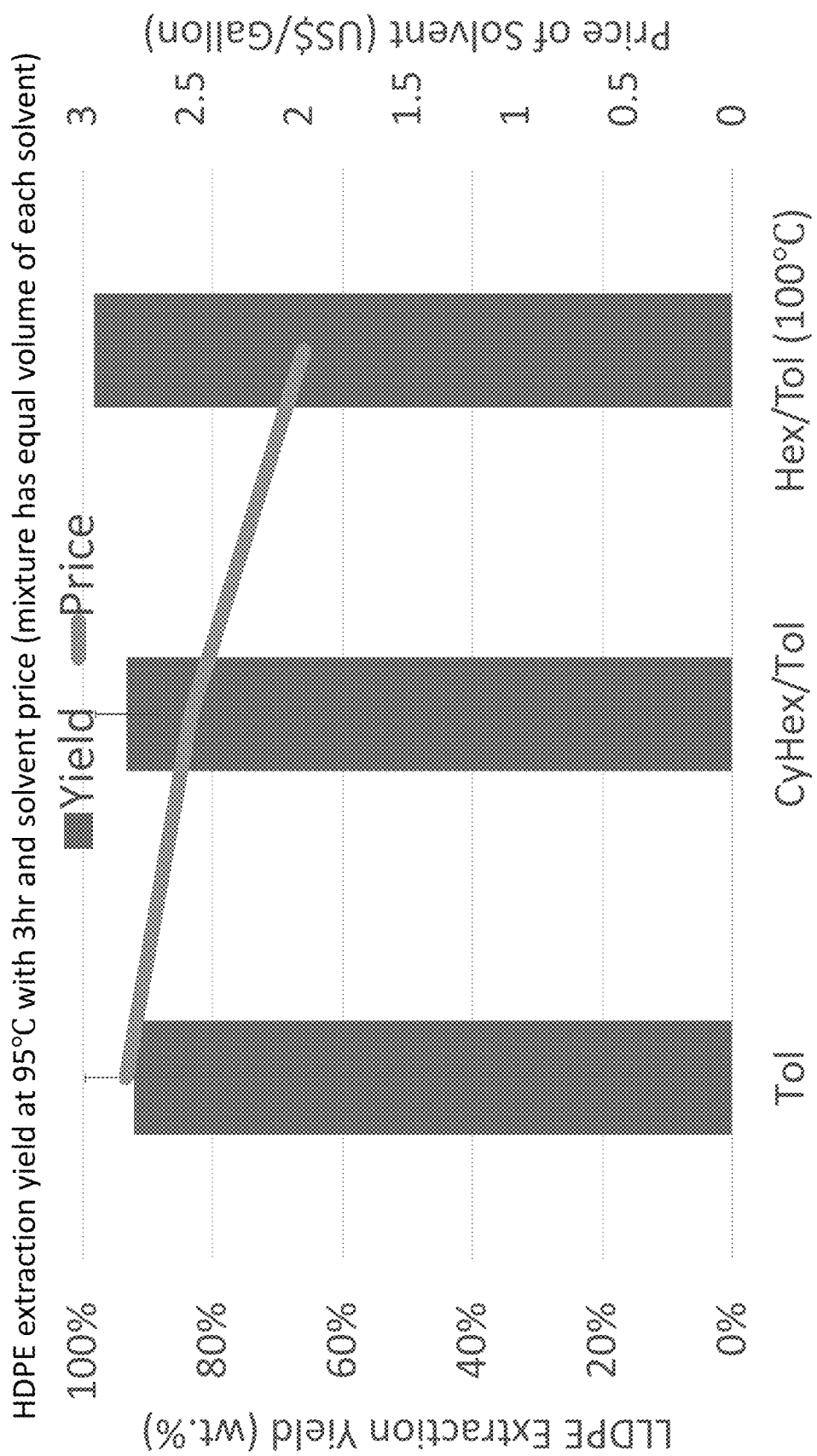
FIG. 6 is a bar graph of extraction yield vs. solvent for HDPE, also showing relative solvent pricing.

Further, we have also successfully identified appropriate solvents to selectively dissolve HDPE by using the Hansen solubility parameters as shown in FIG. 5, which shows the Hansen Sphere of high-density polyethylene (HDPE) and Hansen solubility of selected organic solvents. This prediction was also proved in the actual reduction to practice as provided in FIG. 6. Referring to FIG. 6, which shows a graph of dissolution yield of HDPE in different solvents, the graph shows that a mixture of toluene and cyclohexane can dissolve similar amounts of HDPE as compared to use toluene alone. In addition, a 50:50 vol. % mixture of toluene and hexane also can dissolve HDPE at slightly higher temperature (see FIG. 6).

The actual reduction to practice also showed that PS and plastic additives (e.g., flame retardants) can dissolve in 50:50 vol. % toluene and hexane mixture at room temperature. The preliminary results indicate that a proposed scheme as shown in FIGS. 7a-7d which is a schematic of steps of SSEA has the potential to recover pristine PS (Type 6) and LDPE (Type 4) from a plastic mixture of Types 2, 4, 5, and 6. Initially, the mixture will be treated with a solvent mixture of 50:50 vol. % of toluene and hexane at room temperature. FIGS. 7a-7d progressively add more complexity to the SSEA process.

For example, in FIG. 7a, a method of recovery of pristine polymers from a sorted waste feedstock free of organic additive is disclosed. The method begins by selecting a first solvent (S1), wherein the S1 is within a Hansen's sphere with respect to the sorted waste feedstock and wherein the S1 is in a predetermined list of solvents. The method then provides for inputting the S1 into an extractor as well as inputting the feedstock into the extractor, thereby generating a mixture (M). The method then provides for heating the M to a temperature ranging from 5° C. to 180° C. and waiting a predetermined amount of time, thereby forming a polymer solution (PS1). The method then provides for separating insolubles from the PS1, forming a pristine polymer solution (PPS). Thereafter, the method provides for separating the pristine polymer (PrP) from the PPS and finally collecting the separated PrP. According to one embodiment, the method makes a special case wherein the step of separating the PrP from the PPS is by evaporating the S1. According to one embodiment, the method makes a special case of recycling the S1. The method further makes a special case wherein the step of separating the PrP from the PPS is by adding a second solvent (S2), wherein Hansen parameters of the mixture of the S1 and S2 are outside the Hansen's sphere for the PrP.

According to another example, in FIG. 7b, a method of recovery of pristine polymers from a sorted waste feedstock containing organic additives is disclosed. The method begins by selecting a first solvent (S1), wherein the S1 is within a Hansen's sphere with respect to the sorted waste feedstock and wherein the S1 is in a predetermined list of solvents. The method then provides for inputting the S1 into an extractor, inputting the feedstock into the extractor, thereby generating a mixture M. The method then describes heating the M to a temperature ranging from 5° C. to 180° C. and waiting a predetermined amount of time, thereby forming a polymer solution containing the organic additives (PS1O). Thereafter the method provides separating insolubles from the PS1O, thereby forming a pristine polymer solution with organic additives (PPS1O). Then the method describes adsorbing the PPS1O using one or more adsorbents for the organic additives to thereby remove organic additives forming a pristine polymer solution (PPS). Next, the method provides for separating the pristine polymer (PrP) from the PPS, and then collecting the separated PrP. The method provides a special case wherein the adsorption step is by using a stirred tank for mixing the adsorbents with the polymer solution, and the adsorption step further includes separating the one or more adsorbents from output of the stirred tank prior to forming the PPS. On one case the adsorption step is by using a single packed bed of adsorbent particles which have strong affinity and adsorption capacity for the organic additives. In another case, the adsorption step is by using a carrousel, which consists of a series of packed beds. On yet another case, the adsorption step is by using a simulated moving bed (SMB), which separates the organic additives from the polymer solution. The method described with respect to FIG. 7b, further provides for a special case, wherein the step of separating the PrP from the PPS is by evaporating the S1. On that special case, the method further includes recycling the S1. In one special case with respect to the method described with respect to FIG. 7b, the step of separating the PrP from the PPS is by adding a second solvent (S2), wherein Hansen parameters of the mixture of the S1 and S2 are outside the Hansen's sphere for the PrP.

With respect to FIG. 7c, a method of recovery of pristine polymers from a mixture of a plurality of waste feedstock of different types of plastics (mixture of plastics) each free of organic additives is also disclosed. The method includes (1) inputting the mixture of the plurality of waste feedstock into an extractor, (2) selecting a solvent mixture (SMi) from a plurality of solvents, wherein Hansen parameters of the selected solvent mixture are within the Hansen's sphere of a target plastic of the mixture of plastics, and (3) inputting the selected SMi into the extractor generating a mixture ($M_i$). The method also provides selectively heating the $M_i$ to a temperature ranging from 5° C. to 180° C. corresponding to a schedule of temperature vs. known type of plastic, and waiting a predetermined amount of time, thereby forming a polymer solution ($PSl_i$) containing a mixture of solvents and polymers. The method also describes separating insolubles from the $PSl_i$, forming a pristine polymer solution ($PPS_i$), wherein the insolubles are provided to the extractor during a next cycle (i+1). The method also provides, separating the pristine polymer (PrPi) from the PPSi and collecting the separated PrPi. The method is then repeated for each type of target plastic where the index i corresponds to the number of plastic types in the mixture of plastics, where i=1, . . . M and K corresponds to the number of target plastics, where K≤M. The method then provides a special case wherein the step of separating the PrPi from the PPSi is by evaporating the SMi. In that special case, the method further includes recycling the SMi. The method then provides another special case, wherein the step of separating the PrPi from the PPSi is by adding an anti-solvent or a separation solvent (SSi), wherein Hansen parameters of the mixture of the SMi and SSi are outside the Hansen's sphere for the PrPi.

With respect to FIG. 7d, a method of recovery of pristine polymers from a mixture of a plurality of waste feedstock of different types of plastics (mixture of plastics), each containing organic additives is also disclosed. The method includes (1) inputting the mixture of the plurality of waste feedstock into an extractor, (2) selecting a solvent mixture (SMi) from a plurality of solvents, wherein Hansen parameters of the selected solvent mixture are within the Hansen's sphere of a target plastic of the mixture of plastics, and (3) inputting the selected SMi into the extractor generating a mixture ($M_i$). Each solvent of the plurality is in a predetermined list of solvents; and inputting the selected SMi into the extractor, generates a mixture ($M_i$). The method then provides selectively heating the $M_i$ to a temperature ranging from 5° C. to 180° C. corresponding to a schedule of temperature vs. known type of plastic, and waiting a predetermined amount of time, thereby forming a polymer solution containing the organic additives (PSlOi). The method includes separating insolubles from the PSlOi, forming a pristine polymer solution with organic additives (PPSlOi), treating the PPSlOi using one or more adsorbents for the organic additives to thereby remove organic additives forming a pristine polymer solution (PPSi), and separating the pristine polymer (PrPi) from the PPSi. The method finally includes collecting the separated PrPi, and repeating the aforementioned steps for each type of target plastic where the index i corresponds to the number of plastic types in the mixture of plastics, where i=1, . . . M and K corresponds to the number of target plastics, where K≤M. The method according to FIG. 7d includes a special case, wherein the adsorption step is by a stirred tank, and the adsorption step further includes separating the one or more adsorbents from output of the stirred tank prior to forming the PPSi. The method according to FIG. 7d includes another special case, wherein the adsorption step is by a single bed (SBi). The method according to FIG. 7d includes yet another special case, wherein the adsorption step is by a carrousel (CARi). The method according to FIG. 7d includes yet another special case, wherein the adsorption step is by a simulated moving bed (SMBi). The method according to FIG. 7d includes another special case, wherein the step of separating the PrPi from the PPSi is by evaporating the SMi. In the latter special case, the step further includes recycling the SMi. The method according to FIG. 7d includes another embodiment wherein the step of separating the PrPi from the PPSi is by adding a separation solvent (SSi), wherein Hansen parameters of the mixture of the SMi and SSi are outside the Hansen's sphere for the PrPi. Where there are multiple species of plastic, for example LDPE, in the second extraction step, a higher temperature (75° C.) will be used for the solvent mixture to dissolve LDPE. In the third extraction step, even higher temperature (80° C.) will be used to dissolve LLDPE. HDPE, PP will remain undissolved and will be removed for further HTP processing.

FIG. 7e-7f show the HTP process in detail. Referring to FIG. 7e, a process flow is shown for a method of recovery of hydrocarbon mixtures from a sorted waste feedstock free of organic additives. The method includes inputting a predetermined volume of a hydrothermal solvent into a reactor, where the hydrothermal solvent includes $H_2O$. The method also includes inputting the feedstock into the reactor, heating the reactor to a temperature ranging from 200° C. to 550° C., forming subcritical or supercritical $H_2O$ within the reactor, and waiting a predetermined amount of time, to allow thermal depolymerization of polymers in the feedstock to produce a slurry. The method next includes cooling the reactor to a predetermined recovery temperature, thereby forming a mixture of gas, hydrocarbons, and water mixture, followed by venting the gas forming a hydrocarbon-water mixture. The method then provides for separating the hydrocarbon mixture from the hydrocarbon-water mixture. According to one embodiment, after the venting step, the method forms a hydrocarbon-water-insolubles mixture, and thus the method further includes separating insolubles from the hydrocarbon-water-insolubles mixture, thereby forming the hydrocarbon-water mixture. According to one embodiment of the aforementioned method, the step of separating the hydrocarbon mixture from the hydrocarbon-water mixture includes a distillation separation. According to another embodiment of the aforementioned method, the step of separating the hydrocarbon mixture from the hydrocarbon-water mixture includes a gravity separation or centrifugation separation.

Referring to FIG. 7f, a flow process of a method of recovery of hydrocarbon mixtures from a sorted waste feedstock containing organic additives is provided. The method includes inputting a predetermined volume of a hydrothermal solvent into a reactor, where the hydrothermal solvent comprising $H_2O$, inputting the feedstock into the reactor, heating the reactor to a temperature ranging from 200° C. to 550° C., forming subcritical or supercritical $H_2O$ within the reactor, and waiting a predetermined amount of time, to allow thermal depolymerization of polymers in the feedstock, thereby forming a slurry. Next, the method includes cooling the reactor to a predetermined recovery temperature, thereby forming a mixture of gas, hydrocarbons, additives, water, and solids. Thereafter, the method includes venting the gas (the gas is a mixture of different gases—a majority is propane or propene) forming a hydrocarbon-water-additives mixture, treating the hydrocarbon-water-additives mixture using one or more adsorbents for the organic additives to thereby remove organic additives and thereby forming a hydrocarbon-water mixture. Finally, the method includes separating the hydrocarbon mixture from the hydrocarbon-water mixture. According to one embodiment, after the venting step in the aforementioned method, the method forms a hydrocarbon-water-additives-insolubles mixture. In this embodiment, the method further includes separating insolubles from the hydrocarbon-water-additives-insolubles mixture, thereby forming the hydrocarbon-water-additives mixture. In one case, the step of separating the hydrocarbon mixture from the hydrocarbon-water mixture includes a distillation separation. In another case, the step of separating the hydrocarbon mixture from the hydrocarbon-water mixture includes a centrifugation separation or gravity separation. According to one embodiment, the adsorption step is by a stirred tank, and the step further includes separating the one or more adsorbents from output of the stirred tank prior to forming the hydrocarbon-water mixture. According to another embodiment, the adsorption step is by a single bed. According to yet another embodiment, the adsorption step is by a carrousel. Still yet according to another embodiment, the adsorption step is by a simulated moving bed (SMB).

Figure 7G:
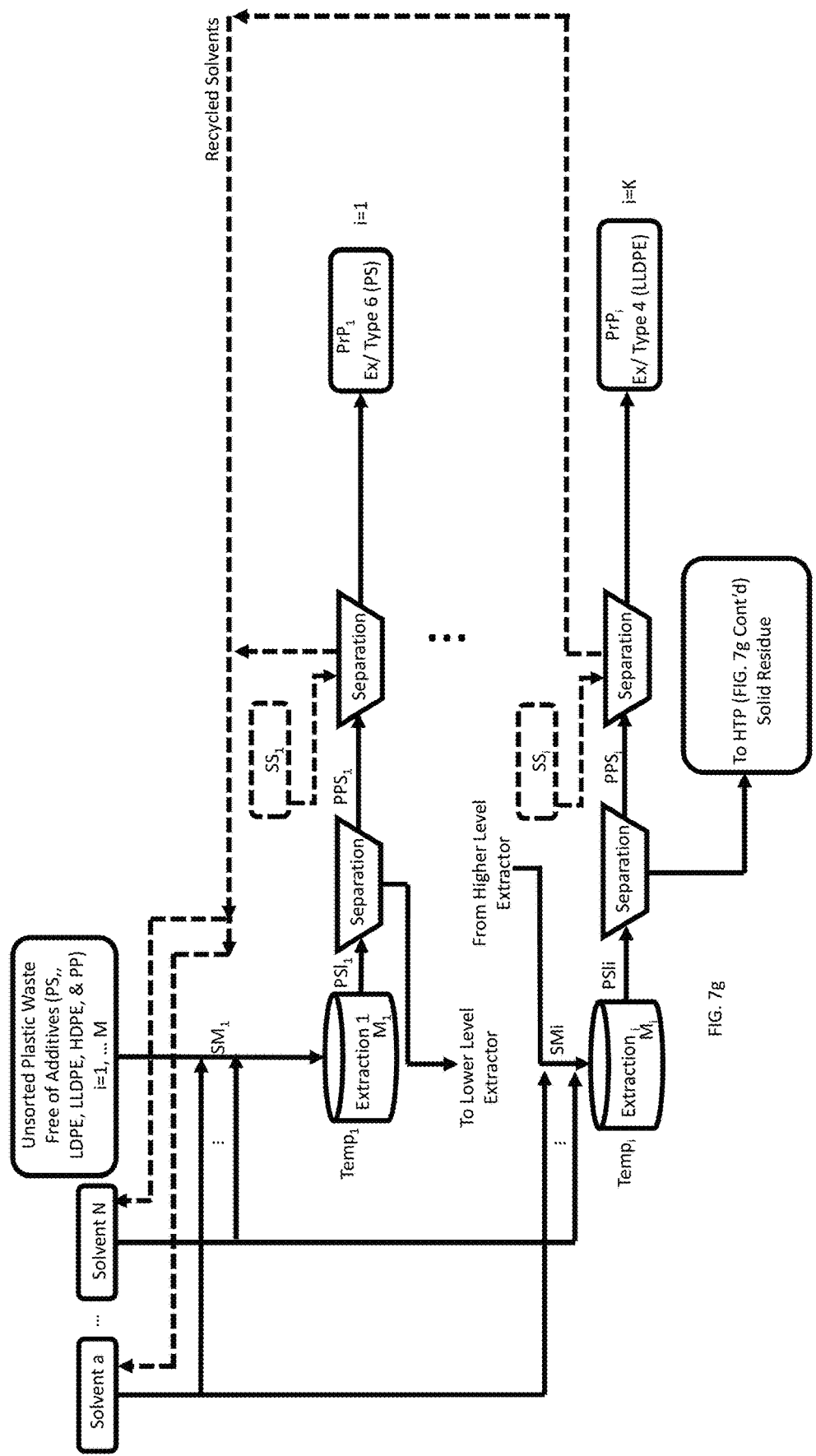
FIG. 7*g* is a process flow showing a method of recovery of pristine polymers and hydrocarbon mixtures from a mixture of a plurality of waste feedstock of different types of plastics each containing organic additives, including Selective Sequential Extraction and Adsorption (SSEA) steps and Hydrothermal Processing (HTP) steps.
Figure 7H:
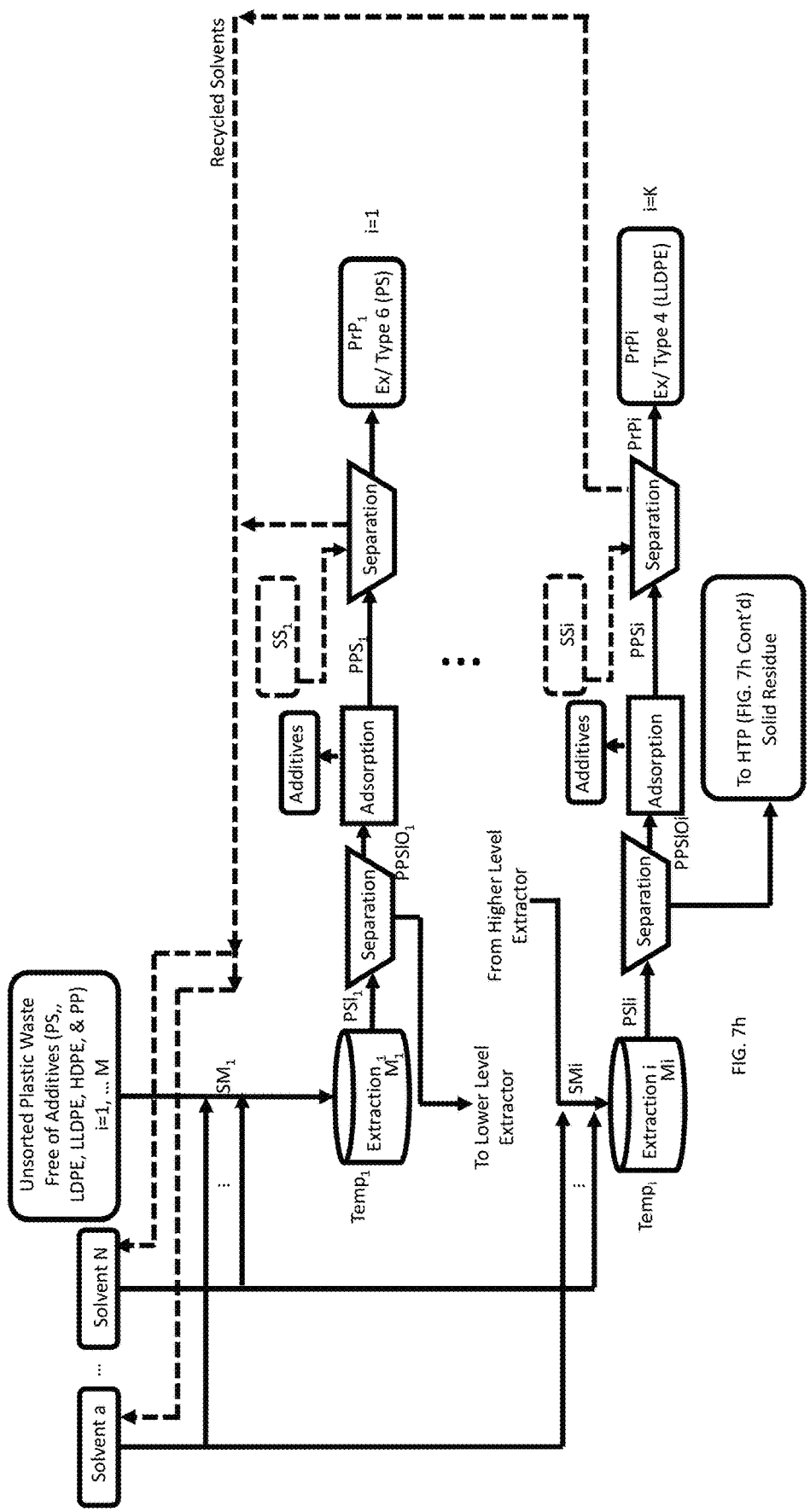
FIG. 7*h* is a process flow showing a method of recovery of pristine polymers and hydrocarbon mixtures from a mixture of a plurality of waste feedstock of different types of plastics each containing organic additives, including Selective Sequential Extraction and Adsorption (SSEA) steps and Hydrothermal Processing (HTP) steps.
Figure 7H:
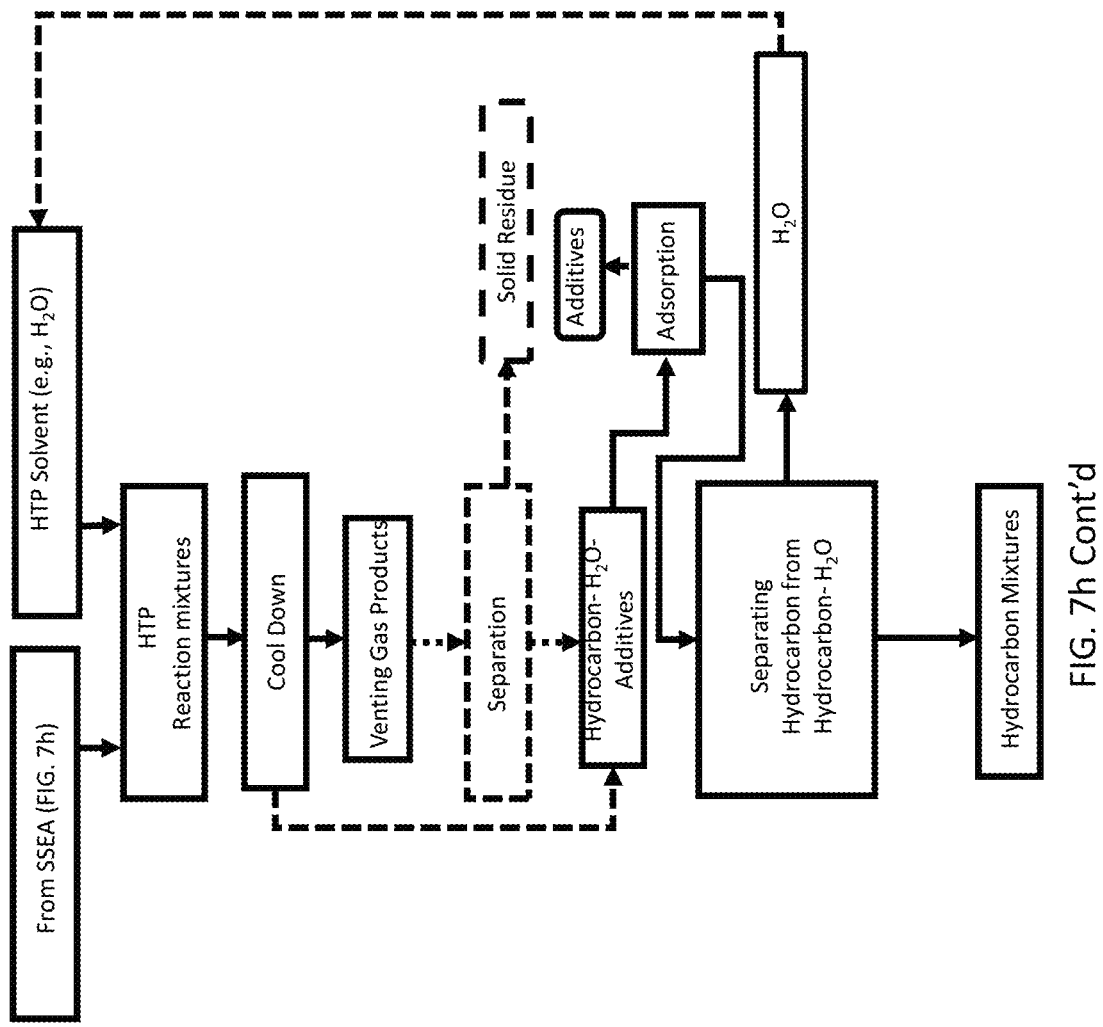

FIGS. 7g and 7h depict hybrid SSEA-HTP processes. Referring to FIG. 7g and FIG. 7h (split between two pages), a process flow of a combination of SSEA and HTP processes is shown. The method is directed to recovery of pristine polymers and hydrocarbon mixtures from a mixture of a plurality of waste feedstock of different types of plastics (mixture of plastics) each free of organic additives. The method initially describes the SSEA process steps. This method includes inputting the mixture of plastics into an extractor. The method further includes selecting a solvent mixture (SMi) from a plurality of solvents. Hansen parameters of the selected solvent mixture are within the Hansen's sphere of a target plastic of the mixture of plastics. Each solvent of the plurality is in a predetermined list of solvents. The method also includes inputting the selected SMi into the extractor, thereby generating a mixture ($M_i$). The method also includes selectively heating the $M_i$ to a temperature ranging from 5° C. to 180° C. corresponding to a schedule of temperature vs. known type of plastic, and waiting a predetermined amount of time, thereby forming a polymer solution (PSli) containing a mixture of solvents and polymers. The method of FIG. 7g also describes separating insolubles from the PSli, forming a pristine polymer solution (PPSi), wherein the insolubles are provided to the extractor during a next cycle (i+1), and separating the pristine polymer (PrPi) from the PPSi, followed by collecting the separated PrPi. The aforementioned steps for each type of target plastic where the index i corresponds to the number of plastic types in the mixture of plastics, where i=1, . . . M and K corresponds to the number of target plastics, where K≤M, wherein the insolubles from the last iteration of the loop of steps b through h is provided into a reactor. The method then begins the HTP processing by inputting a predetermined volume of a hydrothermal solvent into the reactor, the hydrothermal solvent includes $H_2O$. The method also includes heating the reactor to a temperature ranging from 200° C. to 550° C., forming subcritical or supercritical $H_2O$ within the reactor, waiting a predetermined amount of time, to allow thermal depolymerization of polymers in the feedstock to produce a mixture of hydrocarbons, and cooling the reactor to a predetermined recovery temperature, thereby forming a mixture of gas, hydrocarbons, and water mixture. The method also includes venting the gas forming a hydrocarbon-water mixture, and finally separating the hydrocarbon mixture from the hydrocarbon-water mixture. The method then provides a special case wherein the step of separating the PrPi from the PPSi is by evaporating the SMi. In that special case, the method further includes recycling the SMi. The method then provides another special case, wherein the step of separating the PrPi from the PPSi is by adding a separation solvent (SSi), wherein Hansen parameters of the mixture of the SMi and SSi are outside the Hansen's sphere for the PrPi. According to one embodiment, after the venting step, the method forms a hydrocarbon-water-insolubles mixture, and thus the method further includes separating insolubles from the hydrocarbon-water-insolubles mixture, thereby forming the hydrocarbon-water mixture. According to one embodiment of the aforementioned method, the step of separating the hydrocarbon mixture from the hydrocarbon-water mixture includes a distillation separation. According to another embodiment of the aforementioned method, the step of separating the hydrocarbon mixture from the hydrocarbon-water mixture includes a centrifugation separation or gravity separation.

Referring to FIG. 7h, (split between two pages), another process flow of a combination of SSEA and HTP processes is shown. The method is directed to recovery of pristine polymers and hydrocarbon mixtures from a mixture of a plurality of waste feedstock of different types of plastics (mixture of plastics) each containing organic additives. The method initially describes the SSEA process steps. This method includes inputting the mixture of plastics into an extractor. The method further includes selecting a solvent mixture (SMi) from a plurality of solvents. Hansen parameters of the selected solvent mixture are within the Hansen's sphere of a target plastic of the mixture of plastics. Each solvent of the plurality is in a predetermined list of solvents. The method also includes inputting the selected SMi into the extractor, thereby generating a mixture ($M_i$). The method then provides selectively heating the $M_i$ to a temperature ranging from 5° C. to 180° C. corresponding to a schedule of temperature vs. known type of plastic, and waiting a predetermined amount of time, thereby forming a polymer solution containing the organic additives (PSlOi). The method includes separating insolubles from the PSlOi, forming a pristine polymer solution with organic additives (PPSlOi), treating the PPSlOi using one or more adsorbents for the organic additives to thereby remove organic additives forming a pristine polymer solution (PPSi), and separating the pristine polymer (PrPi) from the PPSi. The method finally includes collecting the separated PrPi, and repeating the aforementioned steps for each type of target plastic where the index i corresponds to the number of plastic types in the mixture of plastics, where i=1, . . . M and K corresponds to the number of target plastics, where K≤M, wherein the insolubles from the last iteration is fed into a reactor as HTP feedstock. The method then moves to HTP. The method includes inputting a predetermined volume of a hydrothermal solvent into the reactor, where the hydrothermal solvent comprising $H_2O$, heating the reactor to a temperature ranging from 200° C. to 550° C., forming subcritical or supercritical $H_2O$ within the reactor, and waiting a predetermined amount of time, to allow thermal depolymerization of polymers in the HTP feedstock, thereby forming a slurry. Next, the method includes cooling the reactor to a predetermined recovery temperature, thereby forming a mixture of gas, hydrocarbons, additives, and water. Thereafter, the method includes venting the gas forming a hydrocarbon-water-additives mixture, treating the hydrocarbon-water-additives mixture using one or more adsorbents for the organic additives to thereby remove organic additives and thereby forming a hydrocarbon-water mixture. Finally, the method includes separating the hydrocarbon mixture from the hydrocarbon-water mixture. The method according to FIG. 7h includes a special case, wherein the adsorption step is by a stirred tank, and the adsorption step further includes separating the one or more adsorbents from output of the stirred tank prior to forming the PPSi. The method according to FIG. 7h includes another special case, wherein the adsorption step in the SSEA portion is by a single bed (SBi). The method according to FIG. 7h includes yet another special case, wherein the adsorption step in the SSEA portion is by a carrousel (CARi). The method according to FIG. 7h includes yet another special case, wherein the adsorption step in the SSEA portion is by a simulated moving bed (SMBi). The method according to FIG. 7h includes another special case, wherein the step of separating the PrPi from the PPSi is by evaporating the SMi. In the latter special case, the step further includes recycling the SMi. The method according to FIG. 7h includes another embodiment wherein the step of separating the PrPi from the PPSi is by adding a separation solvent (SSi), wherein Hansen parameters of the mixture of the SMi and SSi are outside the Hansen's sphere for the PrPi. According to one embodiment corresponding to FIG. 7h, after the venting step in the aforementioned method, the method forms a hydrocarbon-water-additives-insolubles mixture. In this embodiment, the method further includes separating insolubles from the hydrocarbon-water-additives-insolubles mixture, thereby forming the hydrocarbon-water-additives mixture. In one case, the step of separating the hydrocarbon mixture from the hydrocarbon-water mixture includes a distillation separation. In another case, the step of separating the hydrocarbon mixture from the hydrocarbon-water mixture includes a centrifugation separation or gravity separation. According to one embodiment, the adsorption step in the HTP is by a stirred tank, and the step further includes separating the one or more adsorbents from output of the stirred tank prior to forming the hydrocarbon-water mixture. According to another embodiment, the adsorption step in the HTP is by a single bed. According to yet another embodiment, the adsorption step in the HTP is by a carrousel. Still yet according to another embodiment, the adsorption step in the HTP is by a simulated moving bed (SMB).

It should be appreciated that additives can be classified into two types, inorganic and organic additives. Referring to Table 3, an exemplary list of such additives is provided. For SSEA, inorganic additives will not dissolve in organic solvents and will be separated from the polymer solution in the separation step immediately after the extraction step (see, e.g., FIGS. 7a, 7b, 7c, 7d, 7g, and 7h), or alternatively together with the adsorbents after the adsorption step (e.g., FIGS. 7b, 7d, and 7h). Most of the organic additives can dissolve in the organic solvents in the extraction step and they will adsorb on the adsorbents and be separated from the polymer in the adsorption step. They can be separated from the polymer solution by using (1) a stirred tank adsorption, followed by filtration or centrifugal separation, (2) passing the polymer solution with dissolved organic additives through a packed bed of adsorbent to obtain a polymer solution free of organic additives, or (3) passing the polymer solution containing dissolved organic additives in a series of packed beds (carousel) to obtain a solution of polymer without organic additives; or (4) separating the polymer from the organic additives using a simulated moving bed (which includes of a series of packed beds of adsorbents). In HTP process alone, the inorganic additives will not be converted and will be removed as solid residue (e.g., as seen in FIGS. 7e and 7f)

For SSEA plus HTP processes, the inorganic additives will be recovered together with the insoluble polymers in SSEA. The inorganic additives will not be converted in HTP and will be removed as solid residue as shown in FIGS. 7g and 7h.

TABLE 3

| Organic and Inorganic Additives in Plastics | | |
|---|---|---|
| Applications | Organic Additives | Inorganic Additives |
| Antioxidants and heat stabilizers | Phenol antioxidants; Vitamin E; Tris(nonylphenyl) phosphite | |
| UV light stabilizers | Benzophenones; Benzotriazoles; Triazines | Carbon black, Titanium dioxide, Zinc oxide, Iron(III) oxide |
| Flame retardants | Organophosphates; Chlorinated paraffins; Decabromodiphenyl ether | Aluminium hydroxide, Magnesium hydroxide |
| Electrical property modifying additives | Glycerol esters; Ethoxylated amines | |
| Fillers and reinforcing fibers | | Calcium carbonate; Talc, Mg3Si4O10(OH)2; Wollastonite; Mica; Silica; Glass Flour and Spheres |
| Nucleation and clarity | Sodium Benzoate; Trisamide; Nonitol; DMDBS | Fine talc or other Fine mineral fillers; |

TABLE 3-continued

Organic and Inorganic Additives in Plastics

| Applications | Organic Additives | Inorganic Additives |
| --- | --- | --- |
| Processing aids | Ethylene bis(stearamide); Fatty amides or acids; Low molecular weight esters; | Metal stearates |
| Foams | Azodicarbonamide | Talc; Carbon dioxide; |
| Coupling and compatibilizing agents | Maleic anhydride | Aluminium hydroxide |
| Cross-linking | | Peroxide-Based; Silane-Based |
| Sterilization and radiation resistance | Hindered amine Light stabilizers (HALS) | |
| Surface aesthetics | Polydimethylsiloxane | Talc |
| Gas barrier | Ethylene vinyl alcohol, Polyamide, or polyvinylidene chloride layers | |
| Colorants | Azo/diazo, Quinacridone, Phthalocyanine green, Phthalocyanine blue, Quinacridone | Titanium dioxide, Zinc sulfide, Barium sulfate, Carbon black, Channel blacks, Mixed metal oxides such as copper chromate, Iron oxides, Cadmium sulfoselenide, Cadmium sulfide, lead chromate, Chrome (III) oxide, Cobalt aluminate, Ultramarine violet, Aluminum flake, Brass, Coated mica flakes |

The relationship between temperature, time, solvents, and the type of plastics is shown in Tables 4 and 5 for SSEA and HTP, respectively.

The material provided in Tables 4 and 5 show relationships between plastic type, temperature, time and solvent-type for SSEA and HTP, respectively.

TABLE 4

Relationship between plastic type, temperature, time and solvent-type for SSEA

| SSEA | Type 6 PS | Type 4 LDPE (includes LLDPE) | Type 2 HDPE | Type 5 PP |
| --- | --- | --- | --- | --- |
| Temp. (° C.) | 20-30° C. | 60-80° C. | 80-110° C. | 110-150° C. |
| Time (hr) | 0.5-2 | 0.5-4 | 0.5-6 | 0.5-6 |
| Solvent | Toluene; Xylene; Hexane & Toluene; Hexane & Xylene; Heptane & Toluene; Heptane & Xylene; Cyclohexane & Toluene; Cyclohexane & Xylene | Toluene; Xylene; Hexane & Toluene; Hexane & Xylene; Heptane & Toluene; Heptane & Xylene; Cyclohexane & Toluene; Cyclohexane & Xylene Petroleum Ether & Toluene; Petroleum Ether & Toluene; | Toluene; Xylene; Hexane & Toluene; Hexane & Xylene; Heptane & Toluene; Heptane & Xylene; Cyclohexane & Toluene; Cyclohexane & Xylene | Toluene; Xylene; Hexane & Toluene; Hexane & Xylene; Heptane & Toluene; Heptane & Xylene; Cyclohexane & Toluene; Cyclohexane & Xylene |

TABLE 5

Relationship between plastic type, temperature, time and solvent-type for HTP

| HTP | Type 6 PS | Type 4 LDPE (includes LLDPE) | Type 2 HDPE | Type 5 PP |
| --- | --- | --- | --- | --- |
| Temp. (° C.) | about 374-382° C. | 400-475° C. | 400-475° C. | 380-450° C. |
| Time (hr) | 0.5-6 | 0.5-6 | 0.5-6 | 0.5-6 |
| Solvent | | Water | | |

Figure 8A:
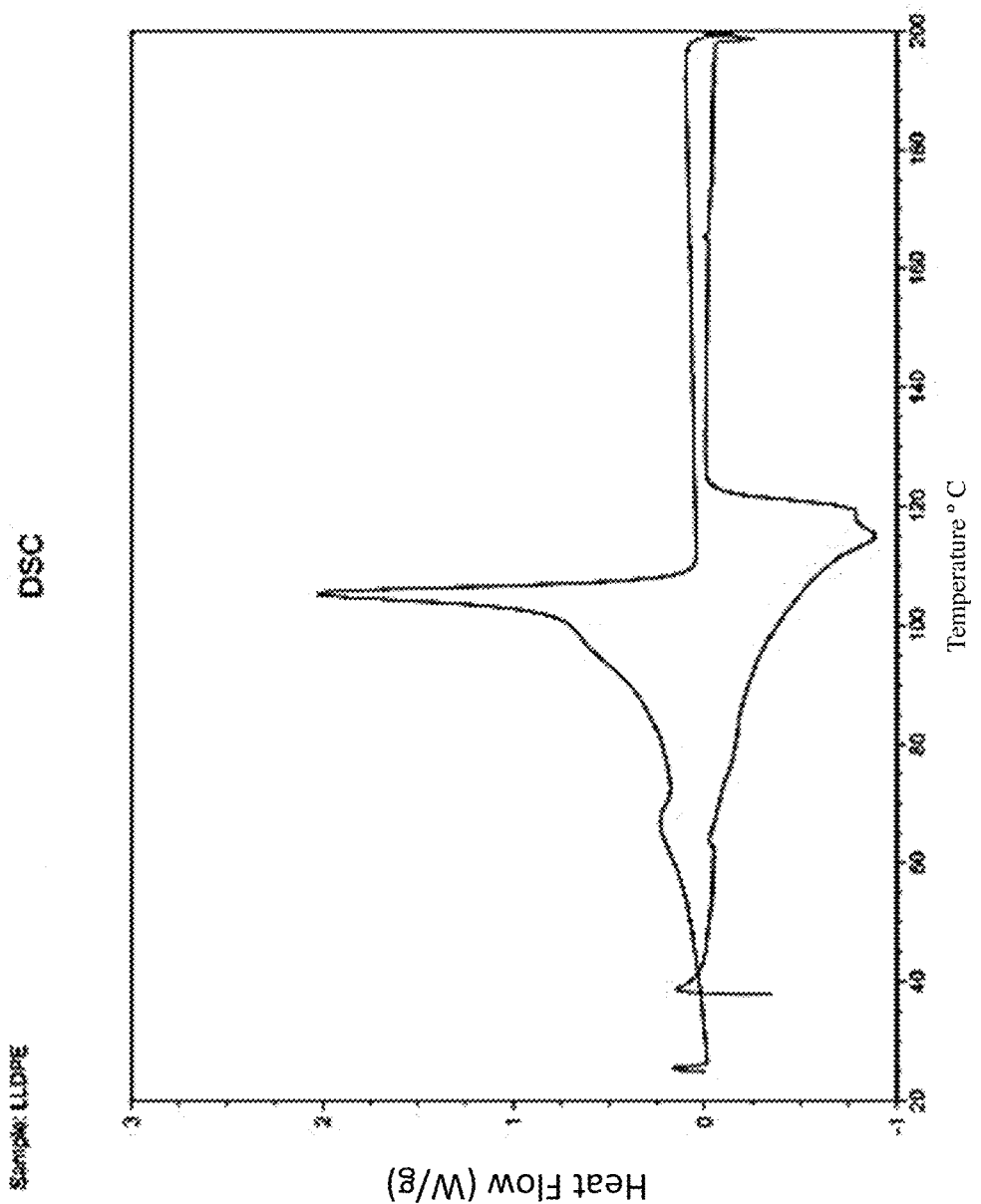
FIG. 8*a* is a graph of heat flow vs. temperature for DSC (Differential Scanning Calorimetry) analysis of a LLDPE sample.
Figure 8B:
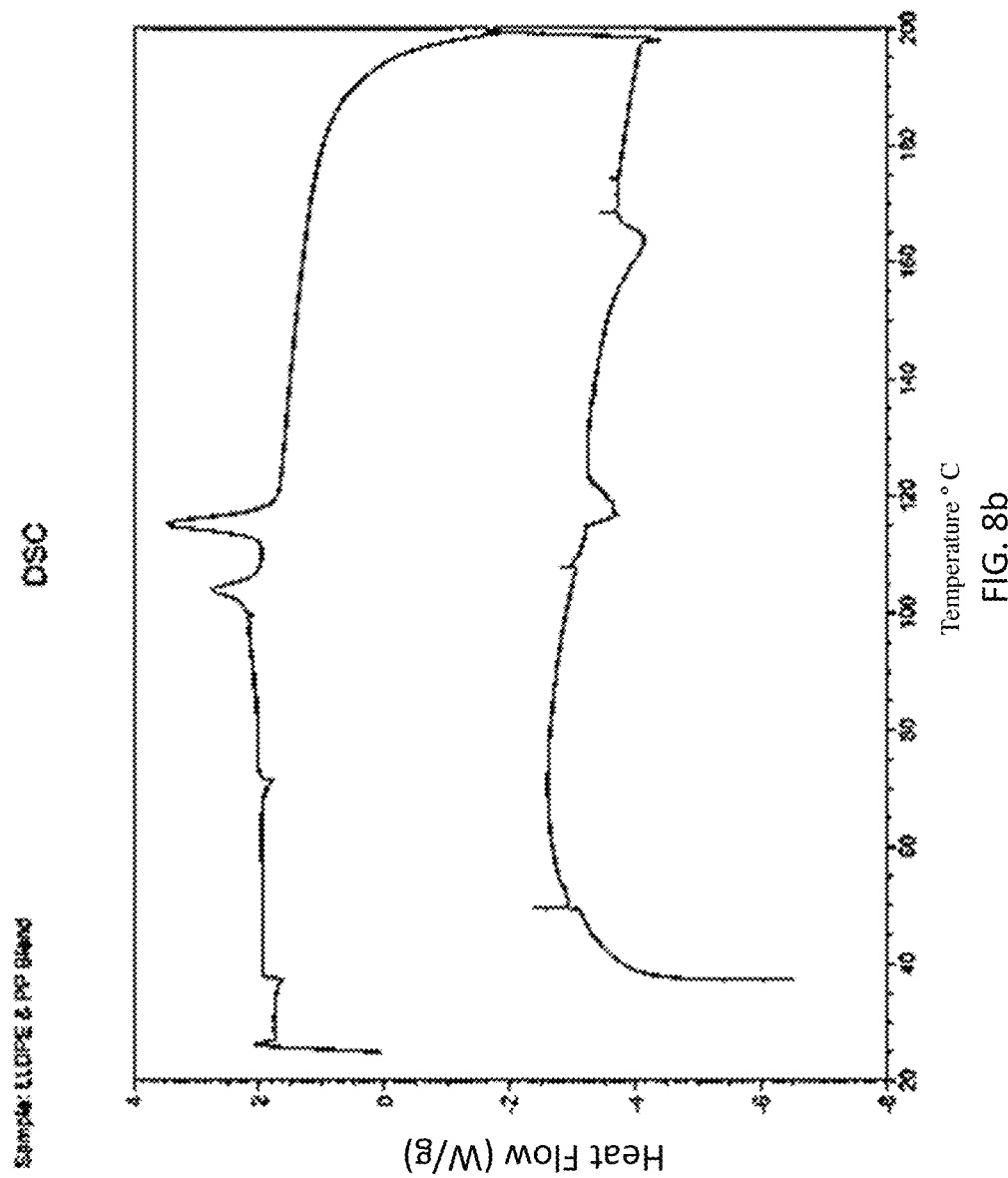
FIG. 8*b* is a graph of heat flow vs. temperature for DSC analysis of a blend of LLDPE and PP sample.
Figure 8C:
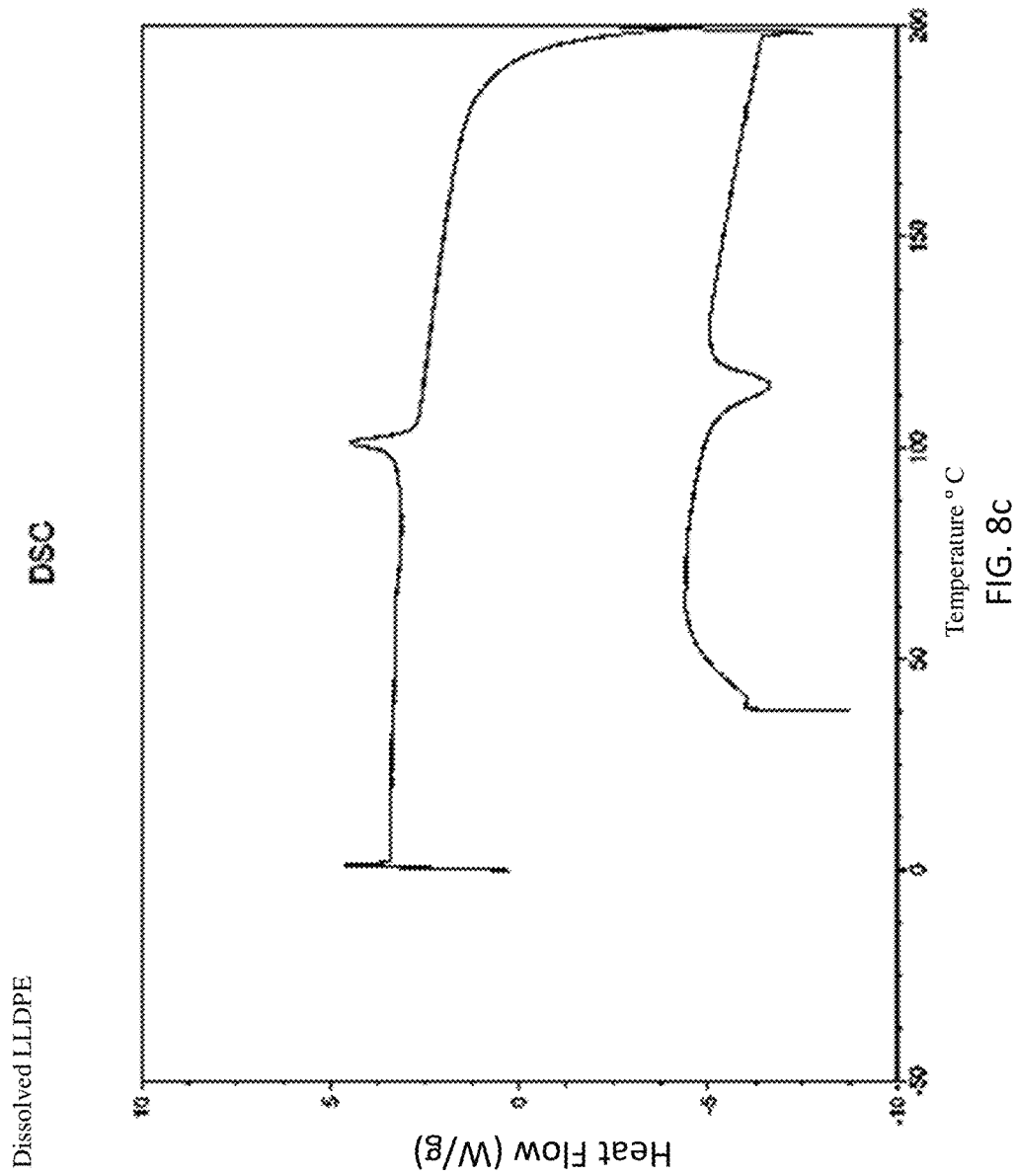
FIG. 8*c* is a graph of heat flow vs. temperature for DSC analysis of a LLDPE product sample recovered from the LLDPE and PP blend using SSEA.
Figure 9A:
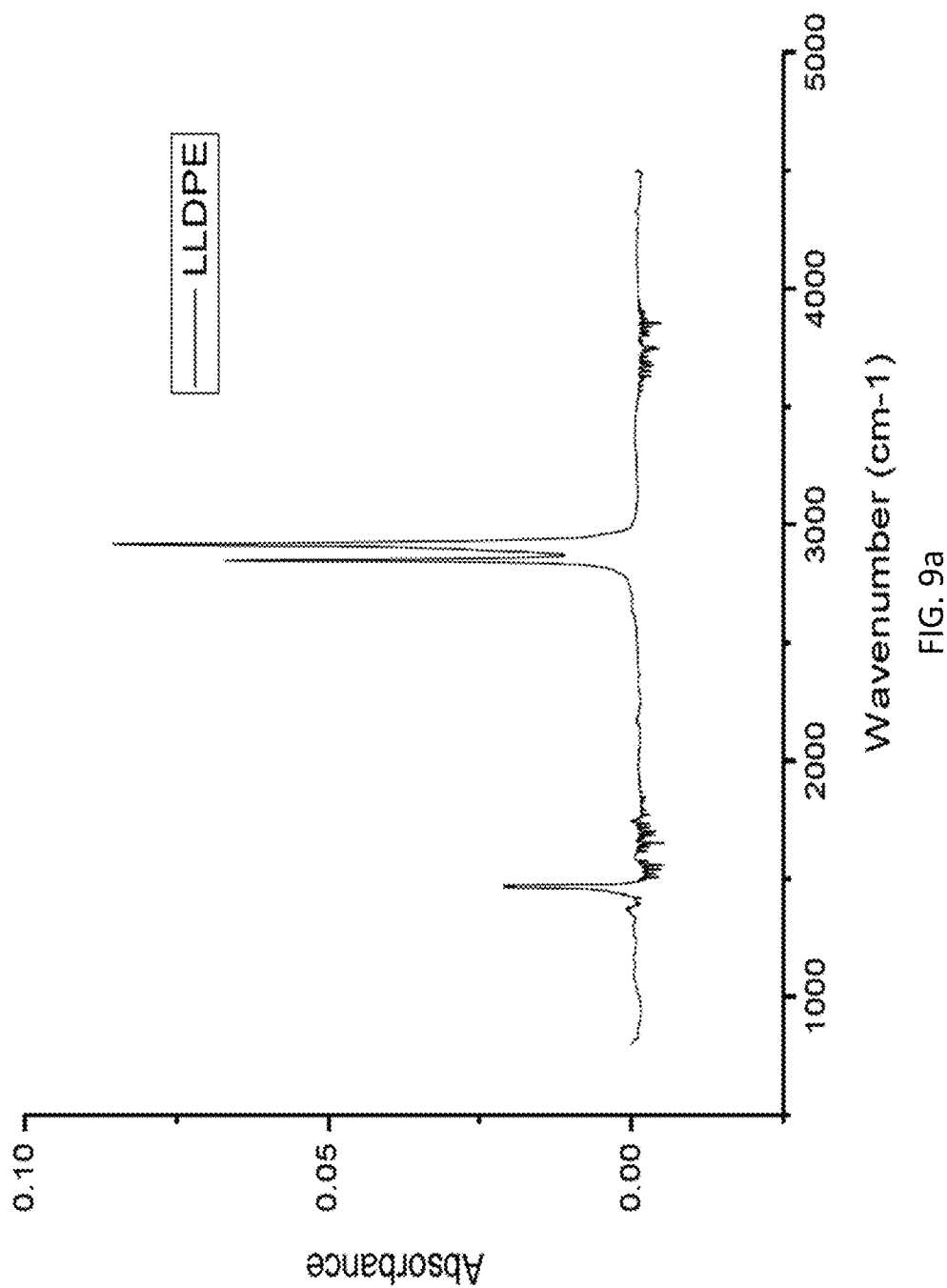
FIG. 9*a* is a graph of absorbance vs. wavenumber in FTIR analysis of a LLDPE sample.
Figure 9B:
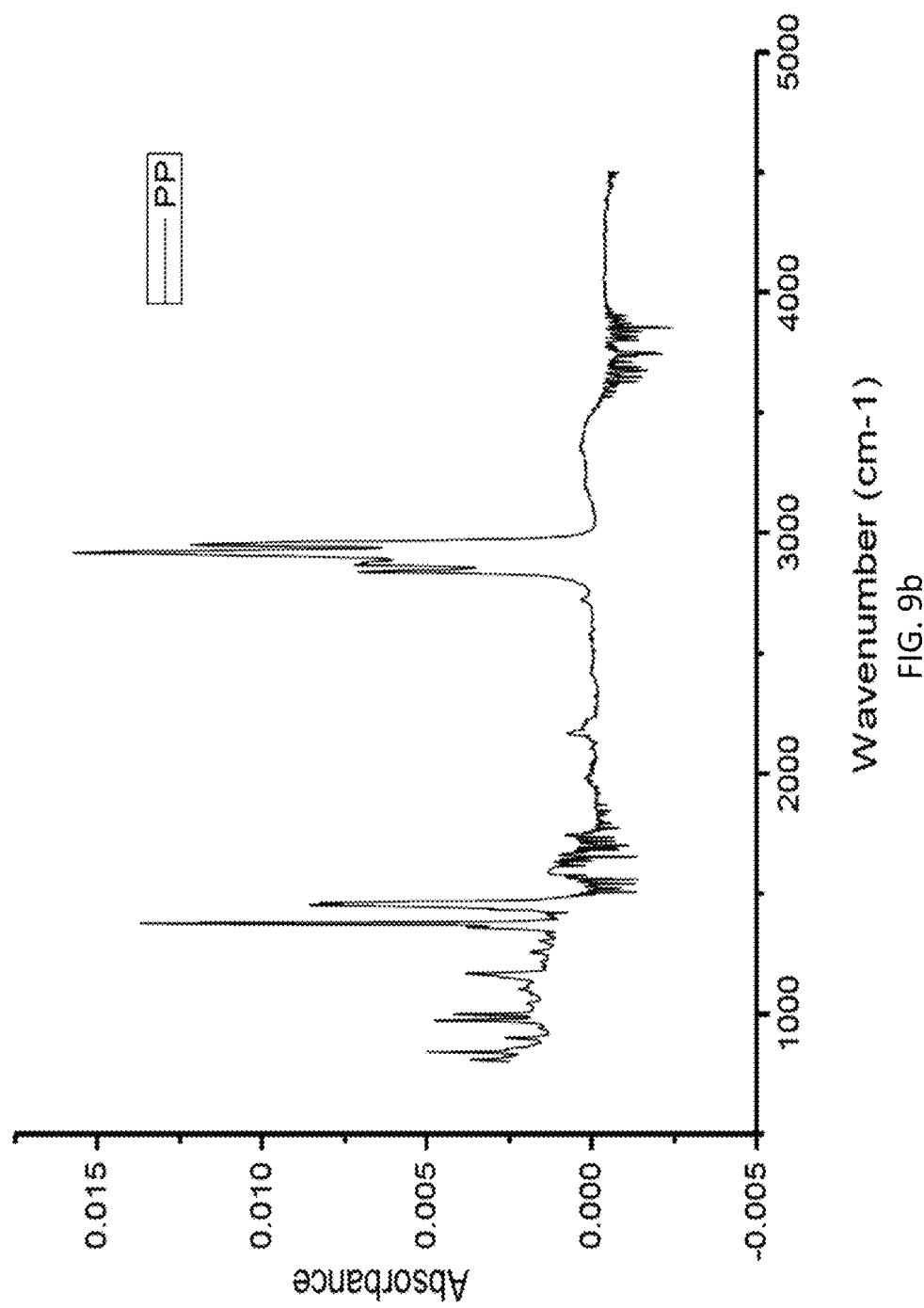
FIG. 9*b* is a graph of absorbance vs. wavenumber in FTIR analysis of a PP sample.
Figure 9C:
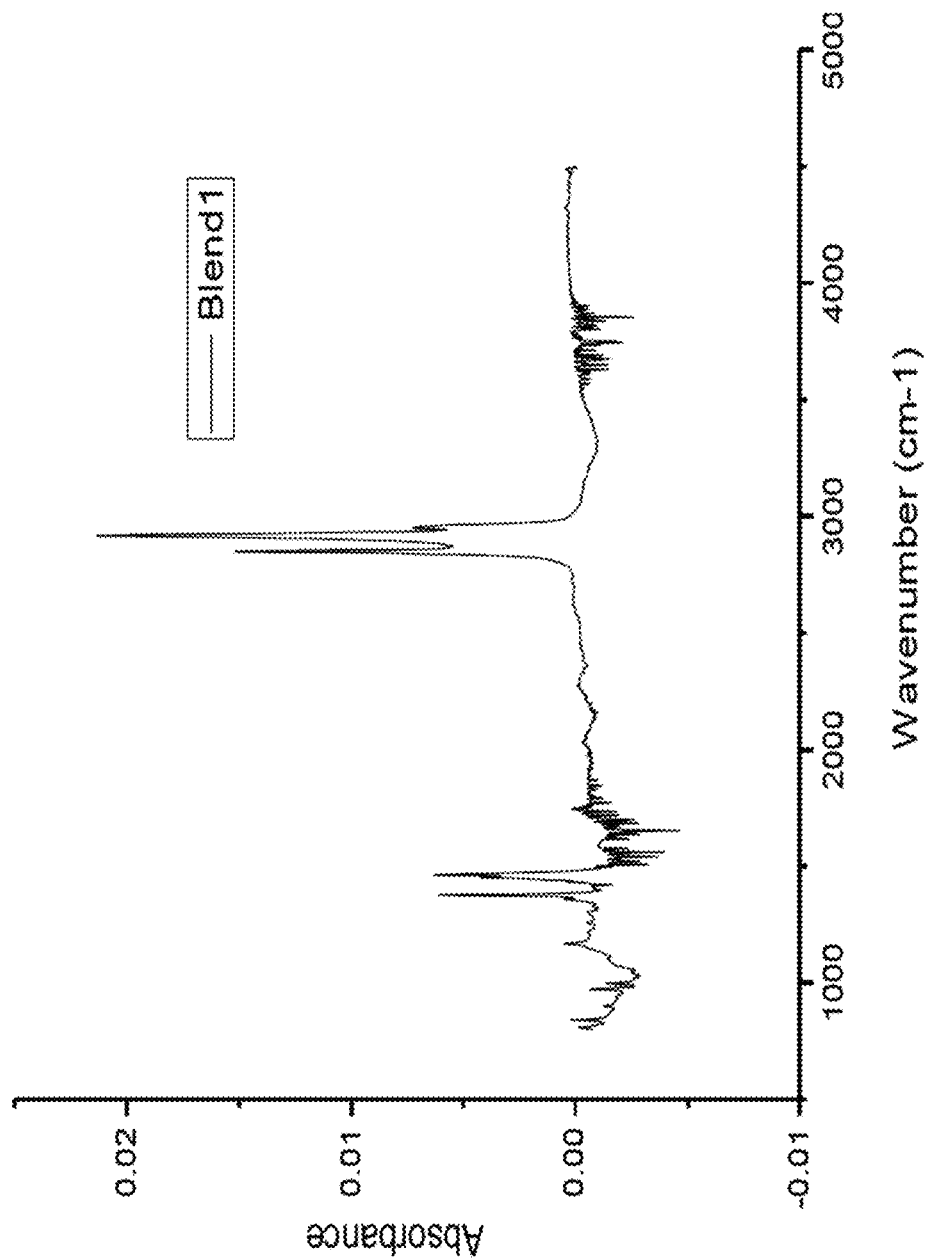
FIG. 9c is a graph of absorbance vs. wavenumber for a blend sample of LLDPE and PP.
Figure 9D:
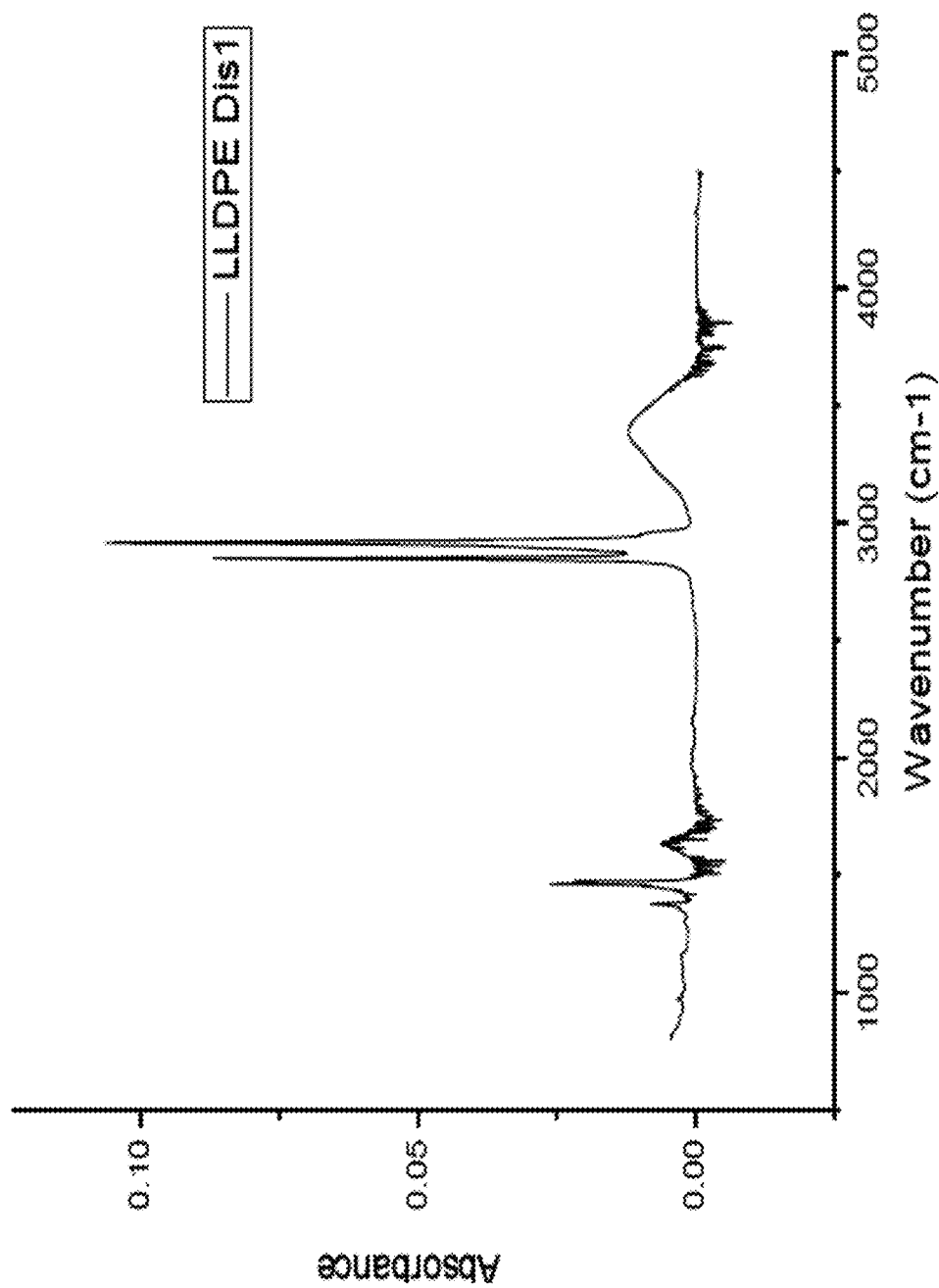
FIG. 9d is a graph of absorbance vs. wavenumber for a LLDPE product sample from SSEA.

To characterize the results, we used two techniques: differential scanning calorimetry (DSC) and Fourier-transform infrared (FTIR). Both of these techniques allowed us to confirm that our findings were consistent with what was expected. DSC measures the difference in the amount of heat needed to increase the temperature of a given polymer sample. This sample is compared to an empty reference sample. For our analysis, a PERKIN ELMER Differential Scanning Calorimeter was used. These two samples were heated at a rate of 10° C./min to 200° C., kept isothermal for 5-10 minutes, and then cooled back down at a rate of 10° C./min to 0° C. The data received from this tool could show us the melting point peaks to verify which polymers were being tested. If there was more than one melting peak present, then there would be more than one polymer present. For example the PP/LLDPE blend, the DSC results could confirm if there was PP mixed with separated LLDPE. To confirm if LLDPE is successfully separated from LLDPE/PP blend, we compared the DSC results of separated LLDPE, shown in FIG. 8c to those of pure LLDPE, pure PP, and LLDPE/PP blend shown in FIGS. 8a-8b. As FIG. 8c shows, there is a single peak present, showing that there is only one polymer that melted in the sample. Also, the polymer melted at a temperature of about 115° C., which is in the range for the melting point of LLDPE, confirming that the dissolved portion contains solely LLDPE.

FTIR analyzes the absorption/emission of light that passes through the polymer. The resulting spectrum can be used to characterize the polymer by comparing functional groups and peaks characteristic to the standard polymer. In our analysis, a Thermo Nicolet Nexus FTIR was used. To further verify that the dissolved portion of the blended polymer was solely LLDPE, FTIR analysis of three types of pellets and separated LLDPE was conducted, results provided in FIGS. 9a-9d. The LLDPE and PP spectrums match those of the commercial results for the polymers. The blend spectrum shares characteristics of both polymer's spectrums, with a medium fingerprint region and a mix of the C—C stretching peaks. With the bottom right spectrum, we used the dissolved portion of one of our runs with toluene and heptane. The results from this portion are almost identical to the top left LLDPE spectrum, aside from a small peak in the fingerprint region and a wide —OH peak, from the methanol (anti-solvent).

Figure 10A:
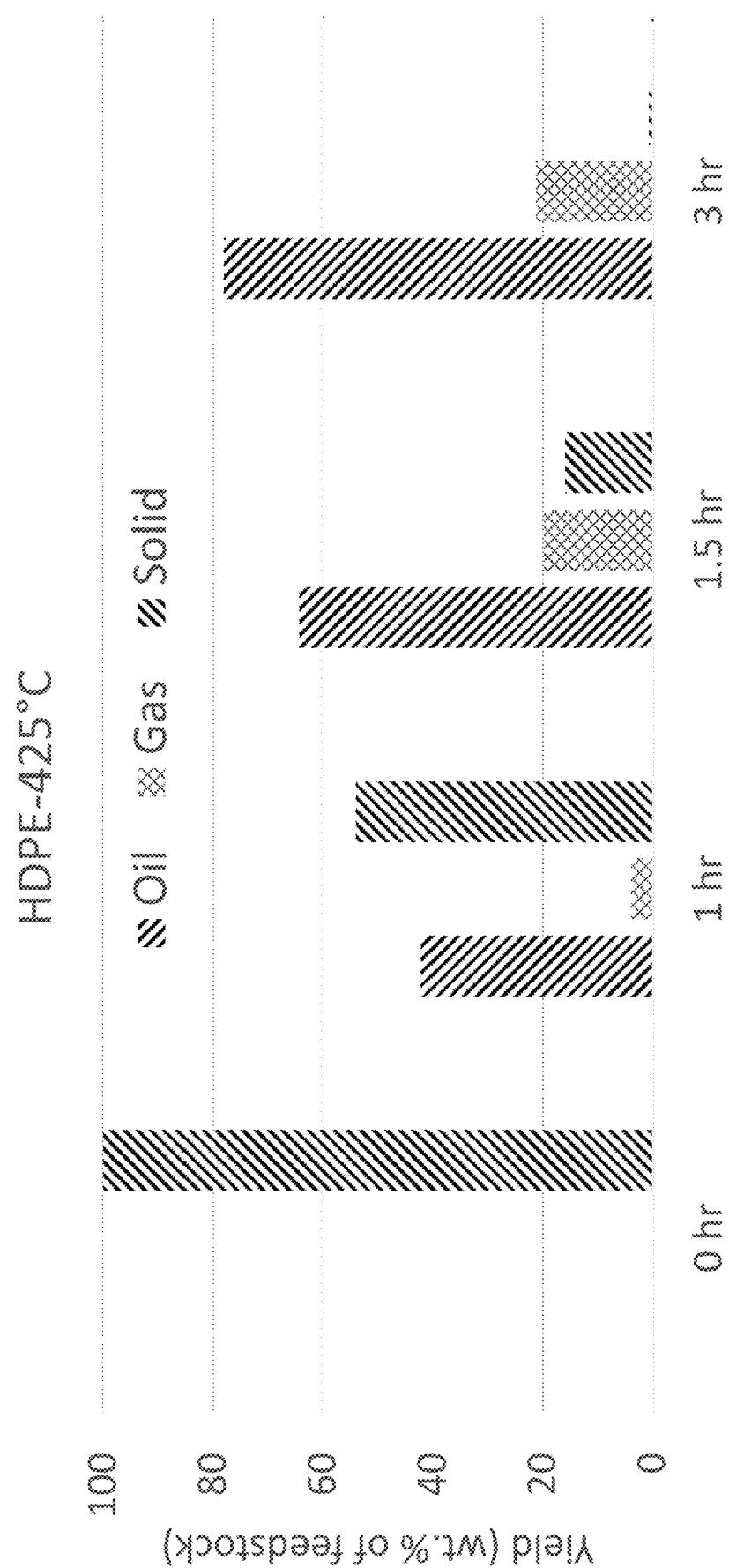
FIG. 10a is a bar graph of yield of oil, gas, or solids vs. time for HDPE using HTP at 425° C.
Figure 10B:
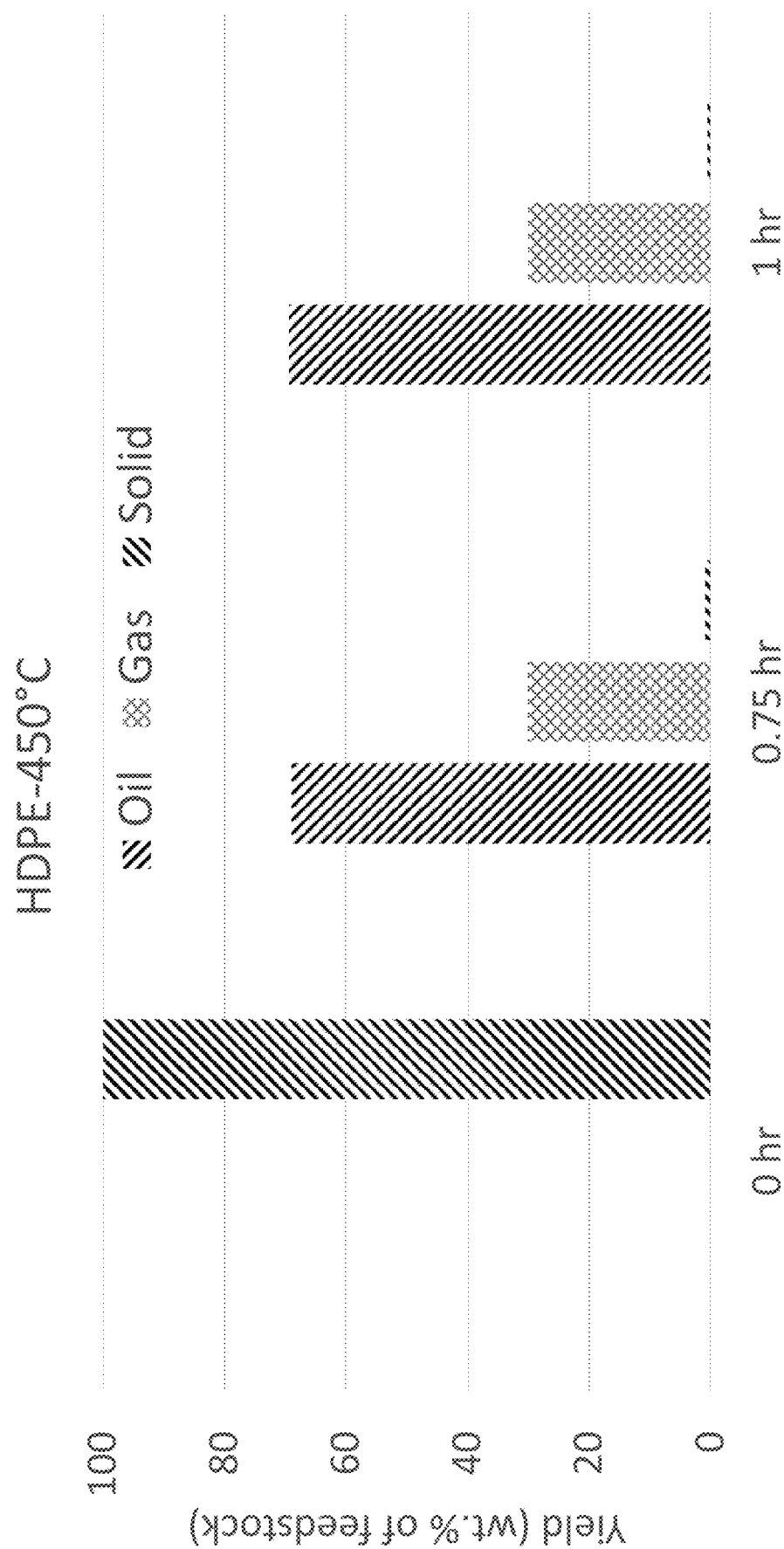
FIG. 10b is a bar graph of yield of oil, gas, or solids vs. time for HDPE using HTP at 450° C.
Figure 10C:
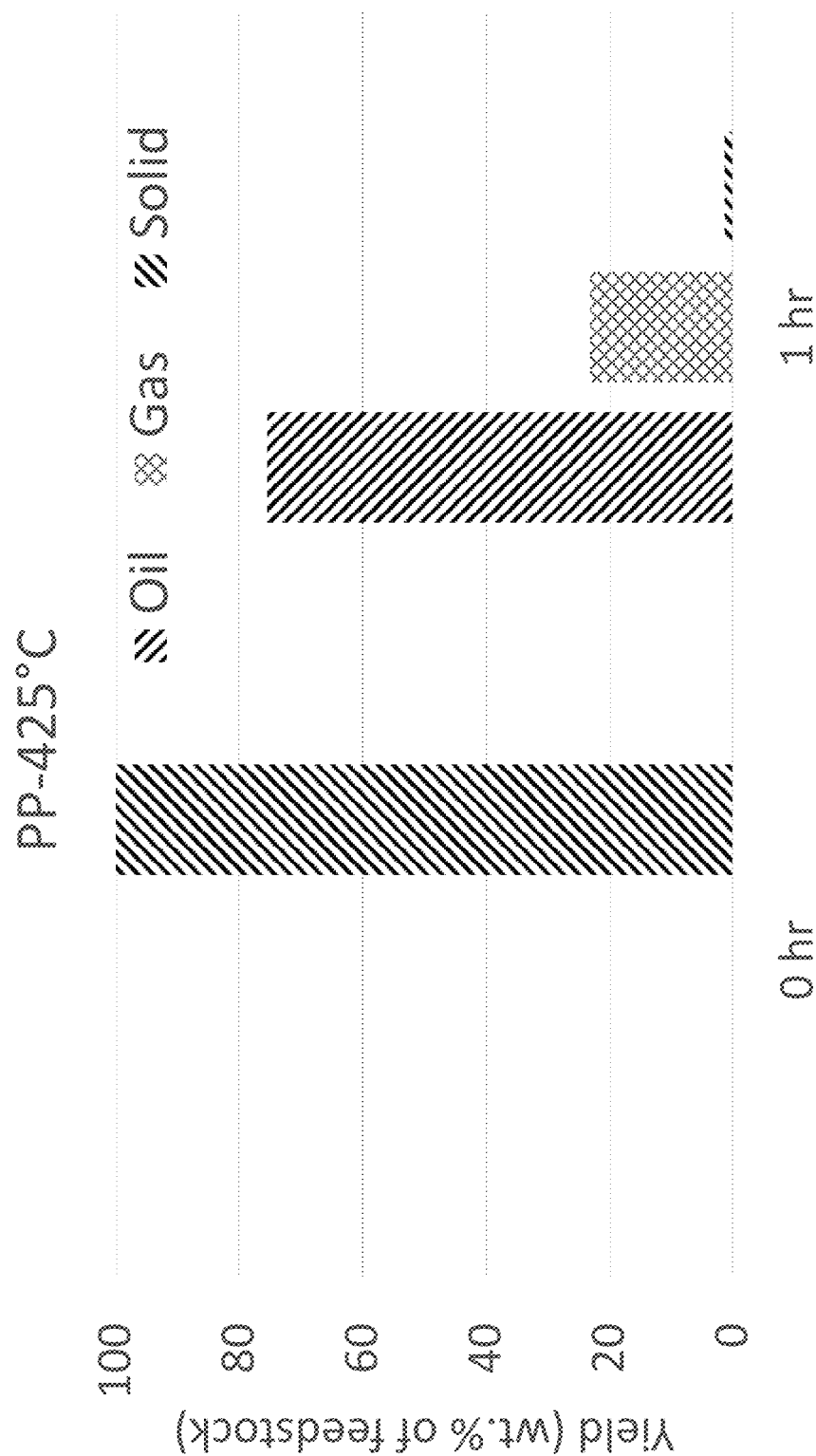
FIG. 10c is a bar graph of yield of oil, gas, and solids vs. time for PP using HTP at 425° C.

In addition, we have also converted pure polyethylene (PP, MW weight averaged molecular weight of about 300,000 g/mo) and high-density polyethylene (HDPE, MW weight averaged molecular weight of about 200,000) to hydrocarbon mixtures at 350-450° C. for 0.5-4 hr using the HTP process. Results are shown in FIGS. 10a-10c (which are graphs of conversion yield provide results of converting PP and HDPE into gas and oil at 350-450° C. for 0-3 hr via HTP (FIG. 10a); One can see that 46 to 99% of polyolefins can be converted into oil and gas in supercritical water (SC-H$_2$O).

Figure 11A:
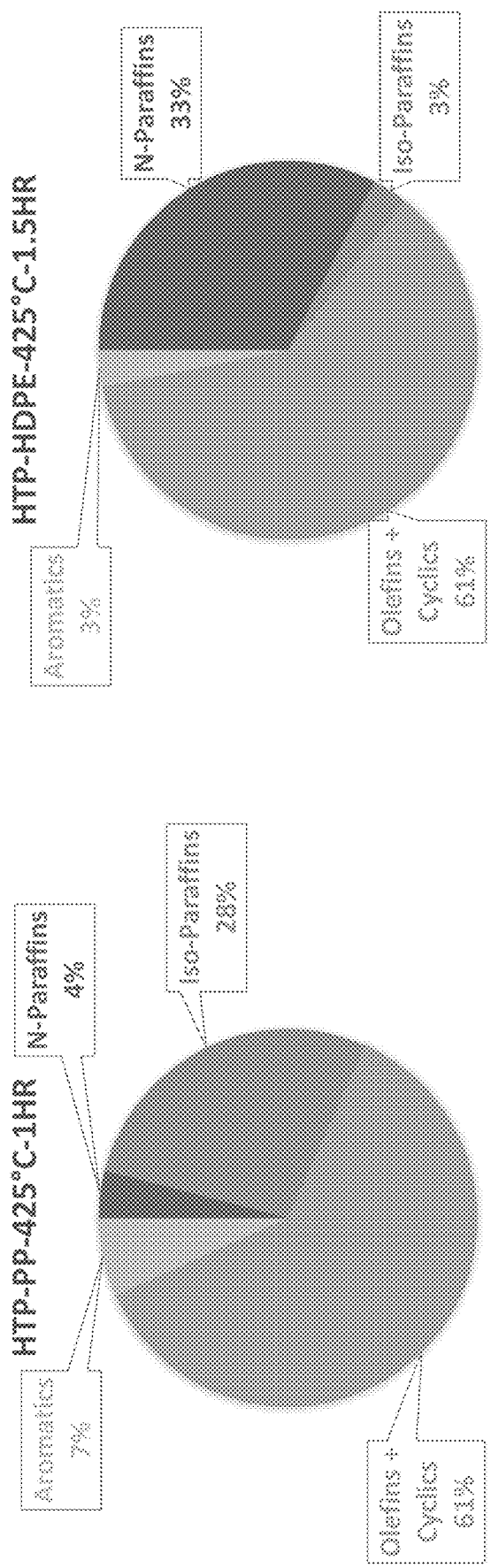
FIG. 11a is a pie-chart graph of the HTP for PP and HDPE at 425° C. showing various products.
Figure 11B:
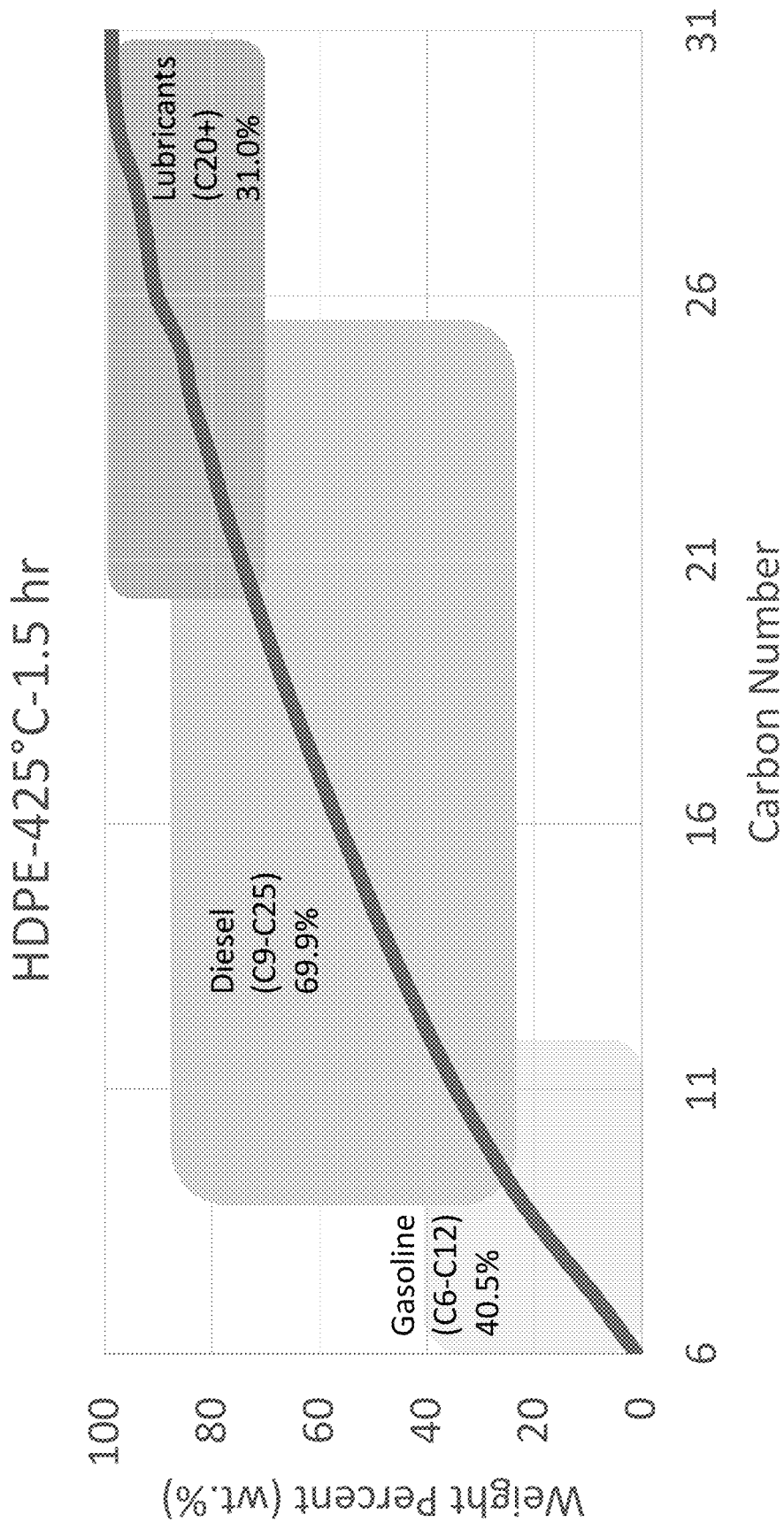
FIG. 11b is a percent weight vs. carbon number for different fuel products from HDPE.
Figure 11C:
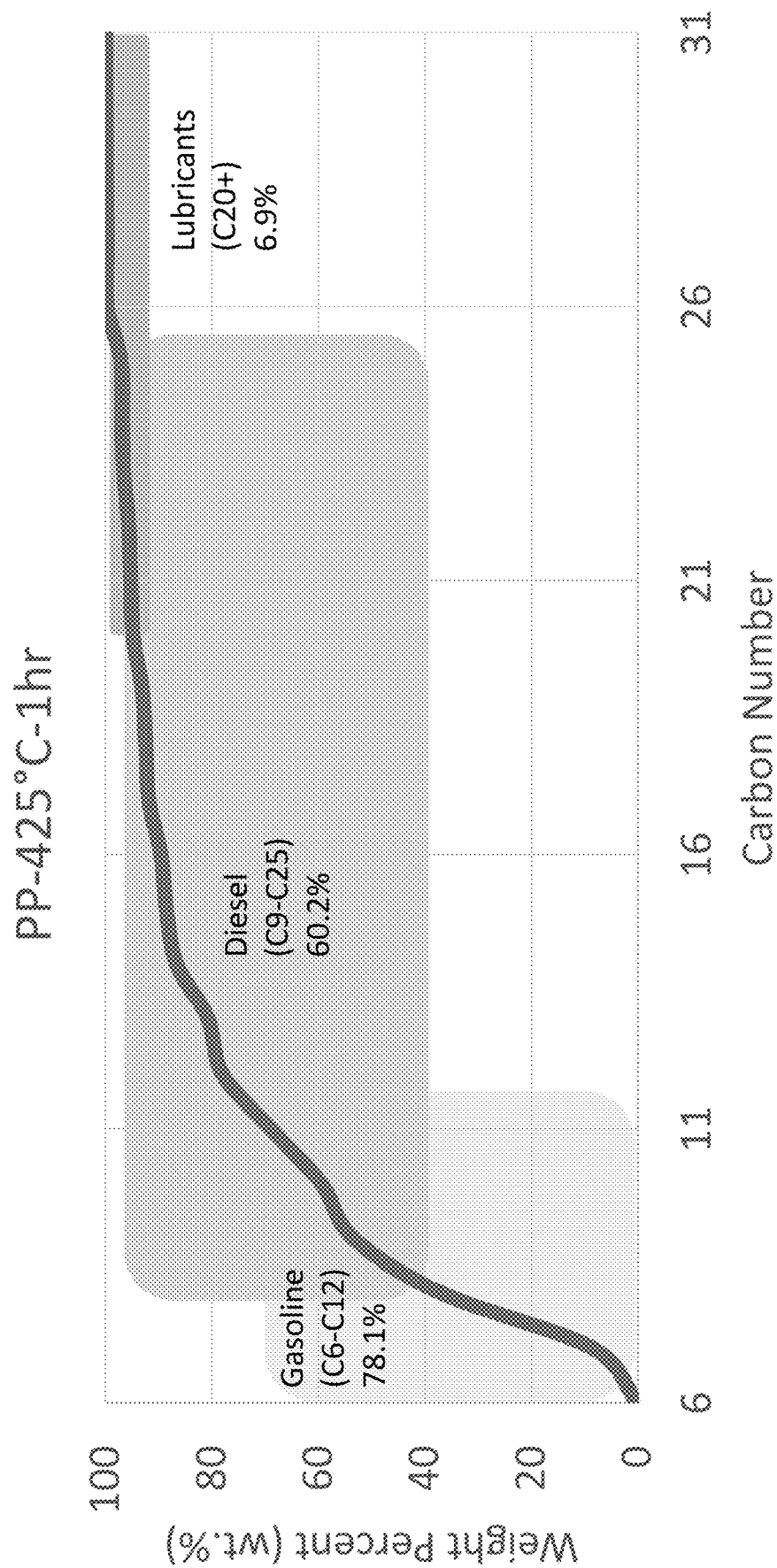
FIG. 11c is a percent weight vs. carbon number for different fuel products from PP.

The oil produced from PP and LDPE under HTP was composed of paraffins, olefins, cyclics, and aromatics as shown in FIG. 11a. Furthermore, GC×GC-FID shows that 40.5 wt. %, 69.9 wt. %, and 31.0 wt. % the oil converted from HDPE via HTP (at 425° C. for 1.5 hr) can be used as gasoline, diesel, and lubricant, respectively as shown in FIG. 11b. And 78.1 wt. %, 60.2 wt. %, and 6.9 wt. % the oil converted from HDPE via HTP (at 425° C. for 1 hr) can be used as gasoline, diesel, and lubricant, respectively as shown in FIG. 11c.

Figure 12A:
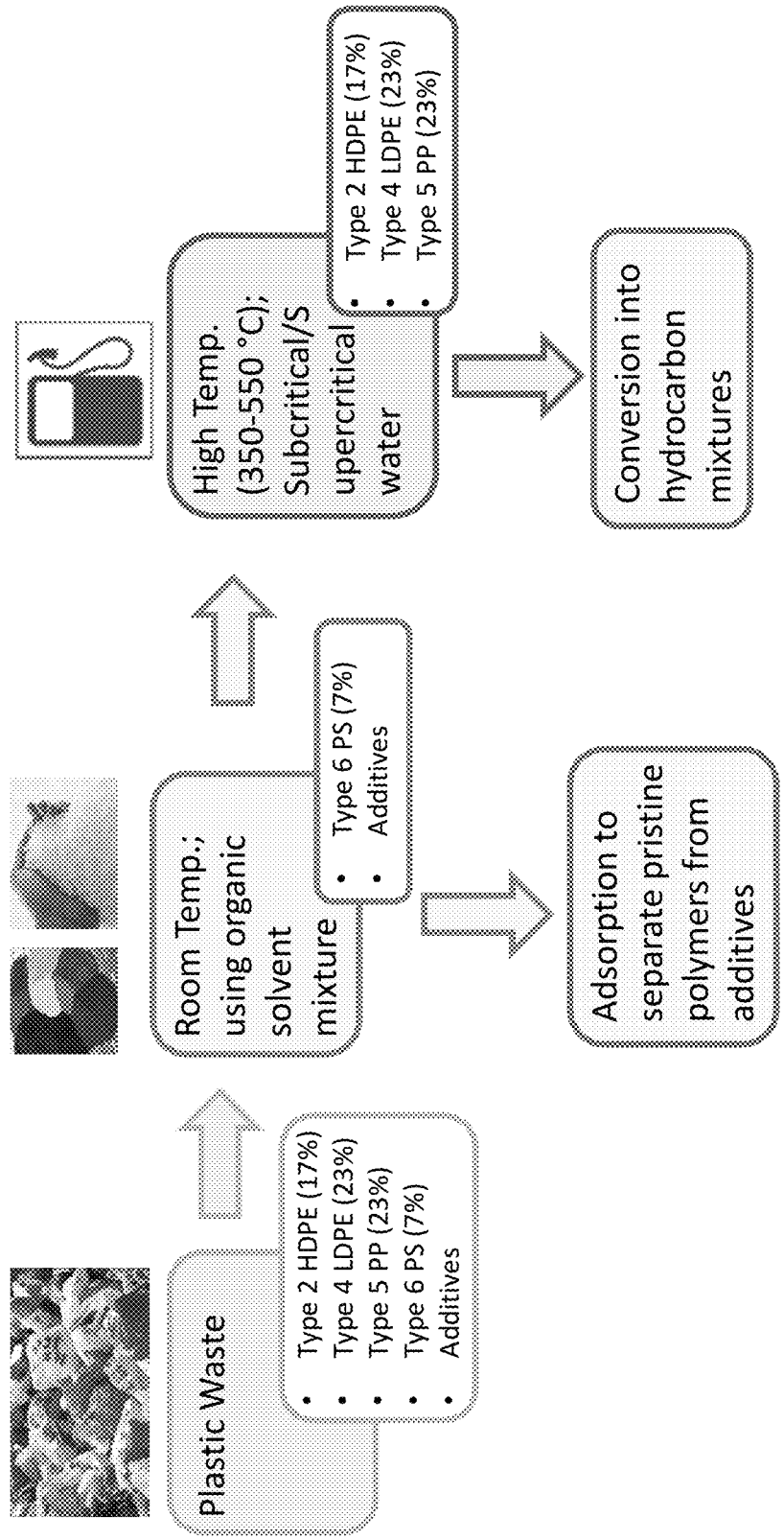
FIG. 12a is a schematic of plastic waste being used to generate various products using SSEA and HTP processes.
Figure 12B:
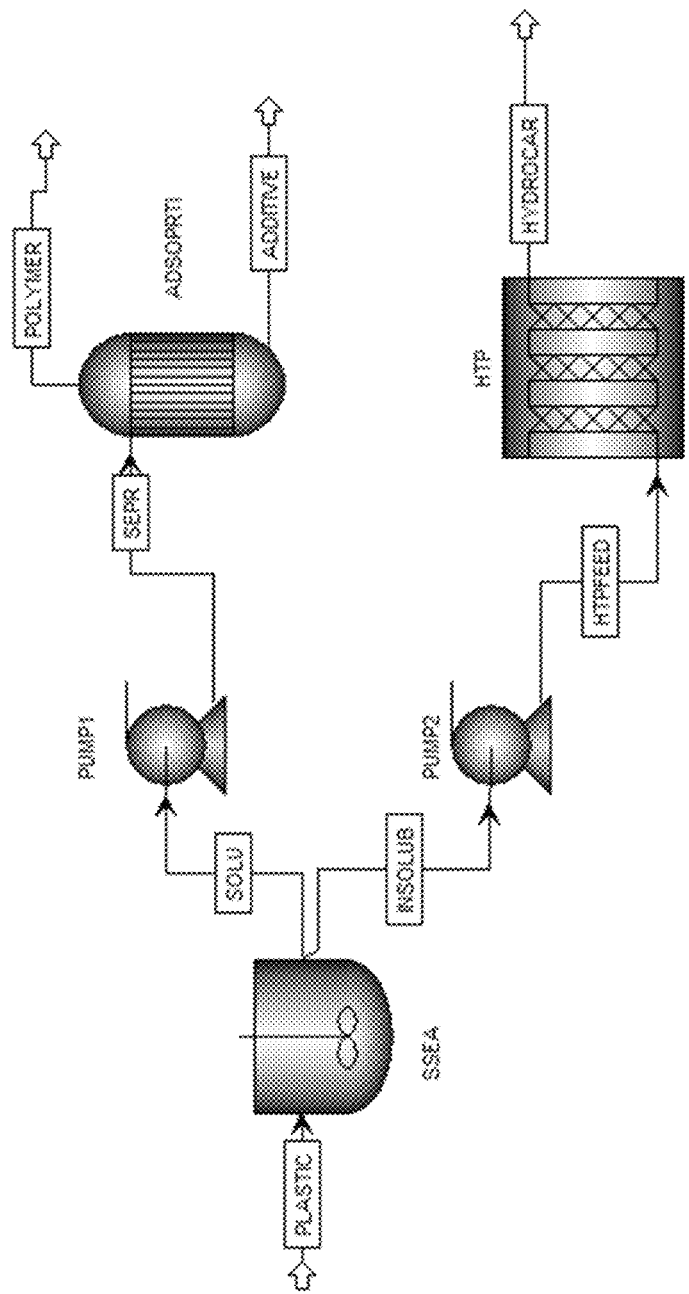
FIG. 12b is a graph of process flow plastics used feedstock and based on both SSEA and HTP processes.

Yet another approach is to use a combination of SSEA and HTP to convert a mixed plastic waste into pure polymers and clean fuels, as shown in FIGS. 12a and 12b where a schematic of conversion topology according to this embodiment is shown. The PS and low molecular additives can be dissolved at room temperature in a mixed solvent of 50:50 vol. % toluene and hexane. The residual solid (LDPE, HDPE, PP) are removed using filtration for further HTP processing. The solution of PS and low-molecular weight additives are then separated using an adsorption step.

Those having ordinary skill in the art will recognize that numerous modifications can be made to the specific implementations described above. The implementations should not be limited to the particular limitations described. Other implementations may be possible.

The invention claimed is:

1. A method of recovery of pristine polymers frog a sorted waste feedstock free of organic additive, comprising:
   a. selecting a first solvent (S1), wherein the S1 is within a Hansen's sphere with respect to the sorted waste feedstock and wherein the S1 is in a predetermined list of solvents;
   b. inputting the S1 into an extractor;
   c. inputting the feedstock into the extractor, thereby generating a mixture (M);
   d. heating the M to a temperature ranging from 5° C. to 180° C.;
   e. waiting a predetermined amount of time, thereby forming a polymer solution (PS1);
   f. separating insolubles from the PS1, forming a pristine polymer solution (PSS);
   g. separating the pristine polymer (PrP) from the PPS; and
   h. collecting the separated PrP.

2. The method of claim 1, wherein the step of separating the PrP from the PPS is by evaporating the S1.

3. The method of claim 1, further comprising: recycling the S1.

4. The method of claim 1, wherein the step of separating the PrP from the PPS is by adding a second solvent (S2), wherein Hansen parameters of the mixture of the S1 and S2 are outside the Hansen's sphere for the PrP.

5. A method of recovery of pristine polymers from a sorted waste feedstock containing organic additives, comprising:
   a. selecting a first solvent (S1), wherein the S1 is within a Hansen's sphere with respect to the sorted waste feedstock and wherein the S1 is in a predetermined list of solvents;
   b. inputting the S1 into an extractor;
   c. inputting e feedstock into the extractor, thereby generating a mixture (M);
   d. heating the M to a temperature ranging from 5° C. to 180° C.;
   e. waiting a predetermined amount of time, thereby forming a polymer solution containing the organic additives (PSlO);
   f. separating insolubles from the PSlO, forming a pristine polymer solution with organic additives (PPSlO);
   g. adsorbing the PPSlO using one or more adsorbents for the organic additives to thereby remove organic additives forming a pristine polymer solution (PPS);
   h. separating the pristine polymer (PrP) from the PPS; and
   i. collecting the separated PrP.

6. The method of claim 5, wherein the adsorption step is by a stirred tank, and the step further includes separating the one or more adsorbents from output of the stirred tank prior to forming the PPS.

7. The method of claim 5, wherein the adsorption step is by a single bed.

8. The method of claim 5, wherein the adsorption step is by a carrousel.

9. The method of claim 5, wherein the adsorption step is by a simulated moving bed (SMB).

10. The method of claim 4, wherein the step of separating the PrP from the PPS is by evaporating the S1.

11. The method of claim 10, further comprising: recycling the S1.

12. The method of claim 4, wherein the step of separating the PrP from the PPS is by adding a second solvent (S2), wherein Hansen parameters of the mixture of the S1 and S2 are outside the Hansen's sphere for the PrP.

13. A method of recovery of pristine polymers from a mixture of a plurality of waste feedstock of different types of plastics (mixture of plastics) each free of organic additives, comprising:
  a. inputting the mixture of plastics into an extractor;
  b. selecting a solvent mixture (SMi) from a plurality of solvents, Hansen parameters of the selected solvent mixture are within the Hansen's sphere of a target plastic of the mixture of plastics and where each solvent of the plurality is in a predetermined list of solvents;
  c. inputting the selected SMi into the extractor, thereby generating a mixture ($M_i$);
  d. selectively heating the $M_i$ to a temperature ranging 5° C. to 180° C. corresponding to a schedule of temperature vs. known type of plastic;
  e. waiting a predetermined amount of time, thereby forming a polymer solution ($PSl_i$) containing a mixture of solvents and polymers;
  f. separating insolubles from the $PSl_i$, forming a pristine polymer solution ($PPS_i$), wherein the insolubles are provided to the extractor during a next cycle (i+1);
  g. separating the pristine polymer (PrPi) frog the PPSi;
  h. collecting the separated PrPi; and
  i. repeating steps b through h for each type of target plastic where the index i corresponds to the number of plastic types in the mixture of plastics, where i=1, ... M and K corresponds to the number of target plastics, where K≤M.

14. The method of claim 13, wherein the step of separating the PrPi from the PPSi is by evaporating the SMi.

15. The method of claim 14, further comprising:
recycling the SMi.

16. The method of claim 13, wherein the step of separating the PrPi from the PPSi is by adding a separation solvent (SSi), wherein Hansen parameters of the mixture of the SMi and SSi are outside the Hansen's sphere for the PrPi.

17. A method of recovery of pristine polymers from a mixture of a plurality of waste feedstock of different types of plastics (mixture of plastics) each containing organic additives, comprising:
  a. inputting the mixture of the plurality of waste feedstock into an extractor;
  b. selecting a solvent mixture (SMi) from a plurality of solvents, where each solvent of the plurality is in a predetermined list of solvents, Hansen parameters of the selected solvent mixture are within the Hansen's sphere of a target plastic of the mixture of plastics; and
  c. inputting the selected SMi into the extractor, thereby generating a mixture ($M_i$);
  d. selectively heating the $M_i$ to a temperature ranging from 5° C. to 180° C. corresponding to a schedule of temperatures vs. known type of plastic;
  e. waiting a predetermined amount of time, thereby forming a polymer solution containing the organic additives (PSlOi);
  f. separating insolubles from the PSlOi, forming a pristine polymer solution with organic additives (PPSlOi);
  g. adsorbing the PPSlOi using one or more adsorbents for the organic additives to thereby remove organic additives forming a pristine polymer solution (PPSi);
  h. separating the pristine polymer (PrPi) from the PPSi; and
  i. collecting the separated PrPi; and
  j. repeating steps b through i for each type of target plastic where the index i corresponds to the number of plastic types in the mixture of plastics, where i=1, ... M and K corresponds to the number of target plastics, where K≤M.

18. The method of claim 17, wherein the adsorption step is by a stirred tank, and the step further includes separating the one or more adsorbents from output of the stirred tank prior to forming the PPSi.

19. The method of claim 17, wherein the adsorption step is by a single bed (SBi).

20. The method of claim 17, wherein the adsorption step is by a carrousel (CARi).

21. The method of claim 17, wherein the adsorption step is by a simulated moving bed (SMBi).

22. The method of claim 17, wherein the step of separating the PrPi from the PPSi is by evaporating the SMi.

23. The method of claim 22, further comprising:
recycling the SMi.

24. The method of claim 17, wherein the step of separating the PrPi from the PPSi is by adding a separation solvent (SSi), wherein Hansen parameters of the mixture of the SMi and SSi are outside the Hansen's sphere for the PrPi.

25. A method of recovery of hydrocarbon mixtures from a sorted waste feedstock free of organic additives, comprising:
  a. inputting a predetermined volume of a hydrothermal solvent into a reactor, the hydrothermal solvent comprising $H_2O$;
  b. inputting the feedstock into the reactor;
  c. heating the reactor to a temperature ranging from 200° C. to 550° C., forming subcritical or supercritical $H_2O$ within the reactor;
  d. waiting a predetermined amount of time, to allow thermal depolymerization of polymers in the feedstock to produce a slurry;
  e. cooling the reactor to a predetermined recovery temperature, thereby forming a mixture of gas, hydrocarbons, and water mixture;
  f. venting the gas forming a hydrocarbon-water mixture; and
  g. separating the hydrocarbon mixture from the hydrocarbon-water mixture.

26. The method of claim 25, wherein after the venting step, the method forms a hydrocarbon-water-insolubles mixture, further comprising:
separating insolubles from the hydrocarbon-water-insolubles mixture, thereby forming the hydrocarbon-water mixture.

27. The method of claim 26, wherein the step of separating the hydrocarbon mixture from the hydrocarbon-water mixture includes a distillation separation.

28. The method of claim 26, wherein the step of separating the hydrocarbon mixture from the hydrocarbon-water mixture includes a centrifugation separation or a gravity separation.

29. A method of recovery of hydrocarbon mixtures from a sorted waste feedstock containing organic additives, comprising:
  a. inputting a predetermined volume of a hydrothermal solvent into a reactor, the hydrothermal solvent comprising $H_2O$;
  b. inputting the feedstock into the reactor;
  c. heating the reactor to a temperature ranging from 200° C. to 550° C., forming subcritical or supercritical $H_2O$ within the reactor;
  d. waiting a predetermined amount of time, to allow thermal depolymerization of polymers in the feedstock;

e. cooling the reactor to a predetermined recovery temperature, thereby forming a mixture of gas, hydrocarbons, additives, and water;

f. venting the gas forming a hydrocarbon-water-additives mixture;

g. adsorbing the hydrocarbon-water-additives mixture using one or more adsorbents for the organic additives to thereby remove organic additives thereby forming a hydrocarbon-water mixture; and h. separating the hydrocarbon mixture from the hydrocarbon-water mixture.

30. The method of claim 29, wherein after the venting step, the method forms a hydrocarbon-water-additives-insolubles mixture, further comprising:

separating insolubles from the hydrocarbon-water-additives-insolubles mixture, thereby forming the hydrocarbon-water-additives mixture.

31. The method of claim 29, wherein the step of separating the hydrocarbon mixture from the hydrocarbon-water mixture includes a distillation separation.

32. The method of claim 29, wherein the step of separating the hydrocarbon mixture from the hydrocarbon-water mixture includes a centrifugation separation or a gravity separation.

33. The method of claim 29, wherein the adsorption step is by a stirred tank, and the step further includes separating the one or more adsorbents from output of the stirred tank prior to forming the hydrocarbon-water mixture.

34. The method of claim 29, wherein the adsorption step is by a single bed.

35. The method of claim 29, wherein the adsorption step is by a carrousel.

36. The method of claim 29, wherein the adsorption step is by a simulated moving bed (SMB).

37. A method of recovery of pristine polymers and hydrocarbon mixtures from a mixture of a plurality of waste feedstock of different types of plastics (mixture of plastics) each free of organic additives, comprising:

a. inputting the mixture of the plurality of waste feedstock into an extractor;

b. selecting a solvent mixture (SMi) from a plurality of solvents, Hansen parameters of the selected solvent mixture are within the Hansen's sphere of a target plastic of the mixture of plastics and where each solvent of the plurality is in a predetermined list of solvents;

c. inputting the selected SMi into the extractor, thereby generating a mixture (Mi);

d. selectively heating the Mi to a temperature ranging from 5° C. to 180° C. corresponding to a schedule of temperature vs. known type of plastic;

e. waiting a predetermined amount of time, thereby forming a polymer solution (PSli) containing a mixture of solvents and polymers;

f. separating insolubles from the PSli, forming a pristine polymer solution (PPSi), wherein the insolubles are provided to the extractor during a next cycle (i+1);

g. separating the pristine polymer (PrPi) from the PPSi;

h. collecting the separated PrPi;

i. repeating steps b through h for each type of target plastic where the index i corresponds to the number of plastic types in the mixture of plastics, where i=1, . . . M and K corresponds to the number of target plastics, where K≤M, wherein the insolubles from the last iteration of the loop of steps b through h is provided into a reactor;

j. inputting a predetermined volume of hydrothermal solvent into the reactor, the hydrothermal solvent comprising $H_2O$;

k. heating the reactor to a temperature ranging from 200° C. to 550° C., forming subcritical or supercritical $H_2O$ within the reactor;

l. waiting a predetermined amount of time, to allow thermal depolymerization of polymers in the feedstock to produce a slurry;

m. cooling the reactor to a predetermined recovery temperature, thereby forming a mixture of gas, hydrocarbons, and water mixture;

n. venting the gas forming a hydrocarbon-water mixture; and o. separating the hydrocarbon mixture from the hydrocarbon-water mixture.

38. The method of claim 37, wherein the step of separating the PrPi from the PPSi is by evaporating the SMi.

39. The method of claim 38, further comprising:
recycling the SMi.

40. The method of claim 37, wherein the step of separating the PrPi from the PPSi is by adding a separation solvent (SSi), wherein Hansen parameters of the mixture of the SMi and SSi are outside the Hansen's sphere for the PrPi.

41. The method of claim 37, wherein after the venting step, the method forms a hydrocarbon-water-insolubles mixture, further comprising:

separating insolubles from the hydrocarbon-water-insolubles mixture, thereby forming the hydrocarbon-water mixture.

42. The method of claim 37, wherein the step of separating the hydrocarbon mixture from the hydrocarbon-water mixture includes a distillation separation.

43. The method of claim 37, wherein the step of separating the hydrocarbon mixture from the hydrocarbon-water mixture includes a centrifugation separation or a gravity separation.

44. A method of recovery of pristine polymers and hydrocarbon mixtures from a mixture of a plurality of waste feedstock of different types of plastics (mixture of plastics) each containing organic additives, including Selective Sequential Extraction and Adsorption (SSEA) steps:

a. inputting the mixture of the plurality of waste feedstock into an extractor;

b. selecting a solvent mixture (SMi) from a plurality of solvents, where each solvent of the plurality is in a predetermined list of solvents; Hansen parameters of the solvent mixture are within the Hansen's sphere of a target plastic of the mixture of plastics, and c. inputting the selected SMi into the extractor, thereby generating a mixture ($M_i$);

d. selectively heating the $M_i$ to a temperature ranging from 5° C. to 180° C. corresponding to a schedule of temperature vs. known type of plastic;

e. waiting a predetermined amount of time, thereby forming a polymer solution containing the organic additives (PSlOi);

f. separating insolubles from the PSlOi, forming a pristine polymer solution with organic additives (PPSlOi);

g. treating the PPSlOi using one or more adsorbents for the organic additives to thereby remove organ additives forming a pristine polymer solution (PPSi);

h. separating the pristine polymer (PrPi) from the PPSi; and i. collecting the separated PrPi;

j. repeating steps b through i for each type of target plastic where the index i corresponds to the number of plastic types in the mixture of plastics, where i=1, ... M and K corresponds to the number of target plastics, where K≤M, wherein the insolubles from the last ration of the loop of steps b through i is provided into a reactor where a Hydrothermal Processing (HTP) steps includes:

k. inputting a predetermined volume of a hydrothermal solvent into the reactor, the hydrothermal solvent comprising $H_2O$;

l. heating the reactor to a temperature ranging from 200° C. to 550° C., forming subcritical or supercritical $H_2O$ within the reactor;

m. waiting a predetermined amount of time, to allow thermal depolymerization of polymers in the feedstock;

n. cooling the reactor to a predetermined recovery temperature, thereby forming a mixture of gas, hydrocarbons, additives, and water;

o. venting the gas forming a hydrocarbon-water-additives mixture;

p. treating the hydrocarbon-water-additives mixture using one or more adsorbents for the organic additives to thereby remove organic additives, thereby forming a hydrocarbon-water mixture; and q. separating the hydrocarbon mixture from the hydrocarbon-water mixture.

45. The method of claim 44, wherein the SSEA adsorption step is by a stirred tank, and the step further includes separating the one or more adsorbents from output of the stirred tank prior to forming the PPSi.

46. The method of claim 44, wherein the SSEA adsorption step is by a single bed (SBi).

47. The method of claim 44, wherein the SSEA adsorption step is by a carrousel (CARi).

48. The method of claim 44, wherein the SSEA adsorption step is by a simulated moving bed (SMBi).

49. The method of claim 44, wherein the step of separating the PrPi from the PPSi is by evaporating the SMi.

50. The method of claim 49, further comprising:
recycling the SMi.

51. The method of claim 44, wherein the step of separating the PrPi from the PPSi is by adding a separation solvent (SSi), wherein Hansen parameters of the mixture of the SMi and SSi are outside the Hansen's sphere for the PrPi.

52. The method of claim 44, wherein after the venting step, the method forms a hydrocarbon-water-additives-insolubles mixture, further comprising:
separating insolubles from the hydrocarbon-water-additives-insolubles mixture, thereby forming the hydrocarbon-water-additives mixture.

53. The method of claim 44, wherein the step of separating the hydrocarbon mixture from the hydrocarbon-water mixture includes a distillation separation.

54. The method of claim 44, wherein the step of separating the hydrocarbon mixture from the hydrocarbon-water mixture includes a centrifugation separation.

55. The method of claim 44, wherein the HTP adsorption step is by a stirred tank, and the step further includes separating the one or more adsorbents from output of the stirred tank prior to forming the hydrocarbon-water mixture.

56. The method of claim 44, wherein the HTP adsorption step is by a single bed.

57. The method of claim 44, wherein the HTP adsorption step is by a carrousel.

58. The method of claim 44, wherein the HTP adsorption step is by a simulated moving bed (SMB).

* * * * *